(12) United States Patent
Desmarais et al.

(10) Patent No.: US 6,348,572 B1
(45) Date of Patent: *Feb. 19, 2002

(54) LIGANDS FOR PHOSPHATASE BINDING ASSAY

(75) Inventors: Sylvie Desmarais, Lachine; Robert Zamboni, Pointe Claire; Richard Friesen, Dollard des Ormeaux; Yves LeBlanc, Kirkland; Claude Dufresne, Dollard des Ormeaux; Robert N. Young, Senneville; Patrick Roy, Dollard des Ormeaux, all of (CA)

(73) Assignee: Merck Frosst Canada & Co., Kirkland (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/069,138

(22) Filed: Apr. 29, 1998

Related U.S. Application Data

(63) Continuation-in-part of application No. 08/964,308, filed on Nov. 4, 1997, now Pat. No. 6,066,715.
(60) Provisional application No. 60/030,141, filed on Nov. 12, 1996.

(51) Int. Cl.$^7$ ................................................. C07K 5/08
(52) U.S. Cl. ............................ 530/331; 514/18; 514/19
(58) Field of Search ........................... 530/331; 514/18, 514/19

(56) References Cited

U.S. PATENT DOCUMENTS 5,501,969 A    3/1996    Hastings et al. ....... 435/252.33

OTHER PUBLICATIONS

R.H. Skinner et al., "Direct Measurement of Binding of RAS to Neurofibtromin Using Scintillation Proximity Assay," Anal. Biochem., vol. 223, pp. 259–265 (1994).
J. A. Patcher et al., "Scintillation Proximity Assay to Measure Binding of Soluble Fibronectin to Antibody–Captured alpha5Ba Integrin," Anal. Biochem., vol. 230, pp. 101–107 (1995).
N. A. Tonks et al., "Characterization of the Major Protein–tyrosine–phosphatases of Human Placenta," JBC, pp. 6731–6737 (1988a).
H. Charbonneau et al., "The leukocyte common antigen (CD45): A putative receptor–linked protein tyrosine phophatase," PNAS 85, pp. 7182–7186, (1998).
N. K. Tonks et al., "Demonstration That the Leukocyte Common Antigen CD45 is a Protein Tyrosine Phosphatase," Biochemistry 27, pp. 8695–8701, (1988b).
M. Streuli et al., "A Family of receptor–linked protein tyrosine phosphatases in humans and Drosophila," Proc. Nat'l Acad USA, vol. 86, pp. 8698–7602, Nov. 1989.
J. Chernoff et al., "Cloning of a cDNA for a major human protein–tyrosine phosphatase," Proc. Nat'l Acad Sci. USA, vol. 87, pp. 2735–2739, Apr. 1990.
D. Bromme et al., "Human Cathepsin O2, a Novel Cysteine Protease Highly Expressed in Osteoclastomas and Ovary Molecular Cloning, Sequencing and Tissue Distribution," Biol. Chem. Hoppe–Seyler, vol. 376, pp. 379–384, Jun. 1995.
F. Drake et al., "Cathepsin K, but not Cathespin B, L, or S, is Abundantly Expressed in Human Ostheoclasts," J. Biol. Chem. vol. 271, No. 21, pp. 12511–12516, (1996).
T. Burke et al., "Potent Inhibition of Insulin Receptor Dephorylation by a Hexamer Peptide Containing the Phosphotyrosyl Mimetic F2Pmp," Biochem. Biophys. Res. Comm., vol. 204, pp. 129–134, (1994).
R. Singh & G.M. Whitesides, "A Reagent for Reduction of Disulfide Bonds in Proteins that Reduces Disulfide Bonds Faster Than Does Dithiothreitol," J. Org. Chem. 56, pp. 2323–2337, (1991).

*Primary Examiner*—Christopher S. F. Low
*Assistant Examiner*—David Lukton
(74) *Attorney, Agent, or Firm*—Philippe L. Durette; Melvin Winokur; Carol S. Quagliato

(57) ABSTRACT

Disclosed are new ligands for use in a binding assay for proteases and phosphatases, which contain cysteine in their binding sites or as a necessary structural component for enzymatic binding. The sulfhydryl group of cysteine is the nucleophilic group in the enzyme's mechanistic proteolytic and hydrolytic properties. The assay can be used to determine the ability of new, unknown ligands and mixtures of compounds to competitively bind with the enzyme versus a known binding agent for the enzyme, e.g., a known enzyme inhibitor. By the use of a mutant form of the natural or native wild-type enzyme, in which serine, or another amino acid, e.g., alanine, replaces cysteine, the problem of interference from extraneous oxidizing and alkylating agents in the assay procedure is overcome. The interference arises because of oxidation or alkylation of the sulfhydryl, —SH (or —S$^-$), in the cysteine, which then adversely affects the binding ability of the enzyme. Specifically disclosed is an assay for tyrosine phosphatases and cysteine proteases, including caspases and cathepsins, e.g., Cathepsin K(O2), utilizing scintillation proximity assay (SPA) technology. The assay has important applications in the discovery of compounds for the treatment and study of, for example, diabetes, immunosuppression, cancer, Alzheimer's disease and osteoporosis. The novel feature of the use of a mutant enzyme can be extended to its use in a wide variety of conventional colorimetric, photometric, spectrophotometric, radioimmunoassay and ligand-binding competitive assays.

5 Claims, 9 Drawing Sheets

```
     ATGGAGATGGAAAAGGAGTTCGAGCAGATCGACAAGTCCGGGAGCTGGGCGGCCATTTAC
  1  ---------+---------+---------+---------+---------+---------+   60
     TACCTCTACCTTTTCCTCAAGCTCGTCTAGCTGTTCAGGCCCTCGACCCGCCGGTAAATG
  1  MetGluMetGluLysGluPheGluGlnIleAspLysSerGlySerTrpAlaAlaIleTyr   20

CAGGATATCCGACATGAAGCCAGTGACTTCCCATGTAGAGTGGCCAAGCTTCCTAAGAAC
 61  ---------+---------+---------+---------+---------+---------+  120
     GTCCTATAGGCTGTACTTCGGTCACTGAAGGGTACATCTCACCGGTTCGAAGGATTCTTG
 21  GlnAspIleArgHisGluAlaSerAspPheProCysArgValAlaLysLeuProLysAsn   40

AAAAACCGAAATAGGTACAGAGACGTCAGTCCCTTTGACCATAGTCGGATTAAACTACAT
121  ---------+---------+---------+---------+---------+---------+  180
     TTTTTGGCTTTATCCATGTCTCTGCAGTCAGGGAAACTGGTATCAGCCTAATTTGATGTA
 41  LysAsnArgAsnArgTyrArgAspValSerProPheAspHisSerArgIleLysLeuHis   60

CAAGAAGATAATGACTATATCAACGCTAGTTTGATAAAAATGGAAGAAGCCCAAAGGAGT
181  ---------+---------+---------+---------+---------+---------+  240
     GTTCTTCTATTACTGATATAGTTGCGATCAAACTATTTTTACCTTCTTCGGGTTTCCTCA
 61  GlnGluAspAsnAspTyrIleAsnAlaSerLeuIleLysMetGluGluAlaGlnArgSer   80

TACATTCTTACCCAGGGCCCTTTGCCTAACACATGCGGTCACTTTTGGGAGATGGTGTGG
241  ---------+---------+---------+---------+---------+---------+  300
     ATGTAAGAATGGGTCCCGGGAAACGGATTGTGTACGCCAGTGAAAACCCTCTACCACACC
 81  TyrIleLeuThrGlnGlyProLeuProAsnThrCysGlyHisPheTrpGluMetValTrp  100

GAGCAGAAAAGCAGGGGTGTCGTCATGCTCAACAGAGTGATGGAGAAAGGTTCGTTAAAA
301  ---------+---------+---------+---------+---------+---------+  360
     CTCGTCTTTTCGTCCCCACAGCAGTACGAGTTGTCTCACTACCTCTTTCCAAGCAATTTT
101  GluGlnLysSerArgGlyValValMetLeuAsnArgValMetGluLysGlySerLeuLys  120

TGCGCACAATACTGGCCACAAAAAGAAGAAAAAGAGATGATCTTTGAAGACACAAATTTG
361  ---------+---------+---------+---------+---------+---------+  420
     ACGCGTGTTATGACCGGTGTTTTTCTTCTTTTTCTCTACTAGAAACTTCTGTGTTTAAAC
121  CysAlaGlnTyrTrpProGlnLysGluGluLysGluMetIlePheGluAspThrAsnLeu  140

AAATTAACATTGATCTCTGAAGATATCAAGTCATATTATACAGTGCGACAGCTAGAATTG
421  ---------+---------+---------+---------+---------+---------+  480
     TTTAATTGTAACTAGAGACTTCTATAGTTCAGTATAATATGTCACGCTGTCGATCTTAAC
141  LysLeuThrLeuIleSerGluAspIleLysSerTyrTyrThrValArgGlnLeuGluLeu  160

GAAAACCTTACAACCCAAGAAACTCGAGAGATCTTACATTTCCACTATACCACATGGCCT
481  ---------+---------+---------+---------+---------+---------+  540
     CTTTTGGAATGTTGGGTTCTTTGAGCTCTCTAGAATGTAAAGGTGATATGGTGTACCGGA
161  GluAsnLeuThrThrGlnGluThrArgGluIleLeuHisPheHisTyrThrThrTrpPro  180
```

FIGURE 2A

```
            GACTTTGGAGTCCCTGAATCACCAGCCTCATTCTTGAACTTTCTTTTCAAAGTCCGAGAG
541         ---------+---------+---------+---------+---------+---------+    600
            CTGAAACCTCAGGGACTTAGTGGTCGGAGTAAGAACTTGAAAGAAAAGTTTCAGGCTCTC
181         AspPheGlyValProGluSerProAlaSerPheLeuAsnPheLeuPheLysValArgGlu    200

TCAGGGTCACTCAGCCCGGAGCACGGGCCCGTTGTGGTGCACTGCAGTGCAGGCATCGGC
601         ---------+---------+---------+---------+---------+---------+    660
            AGTCCCAGTGAGTCGGGCCTCGTGCCCGGGCAACACCACGTGACGTCACGTCCGTAGCCG
201         SerGlySerLeuSerProGluHisGlyProValValValHisCysSerAlaGlyIleGly    220

AGGTCTGGAACCTTCTGTCTGGCTGATACCTGCCTCCTGCTGATGGACAAGAGGAAAGAC
661         ---------+---------+---------+---------+---------+---------+    720
            TCCAGACCTTGGAAGACAGACCGACTATGGACGGAGGACGACTACCTGTTCTCCTTTCTG
221         ArgSerGlyThrPheCysLeuAlaAspThrCysLeuLeuLeuMetAspLysArgLysAsp    240

CCTTCTTCCGTTGATATCAAGAAAGTGCTGTTAGAAATGAGGAAGTTTCGGATGGGGTTG
721         ---------+---------+---------+---------+---------+---------+    780
            GGAAGAAGGCAACTATAGTTCTTTCACGACAATCTTTACTCCTTCAAAGCCTACCCCAAC
241         ProSerSerValAspIleLysLysValLeuLeuGluMetArgLysPheArgMetGlyLeu    260

ATCCAGACAGCCGACCAGCTGCGCTTCTCCTACCTGGCTGTGATCGAAGGTGCCAAATTC
781         ---------+---------+---------+---------+---------+---------+    840
            TAGGTCTGTCGGCTGGTCGACGCGAAGAGGATGGACCGACACTAGCTTCCACGGTTTAAG
261         IleGlnThrAlaAspGlnLeuArgPheSerTyrLeuAlaValIleGluGlyAlaLysPhe    280

ATCATGGGGGACTCTTCCGTGCAGGATCAGTGGAAGGAGCTTTCCCACGAGGACCTGGAG
841         ---------+---------+---------+---------+---------+---------+    900
            TAGTACCCCCTGAGAAGGCACGTCCTAGTCACCTTCCTCGAAAGGGTGCTCCTGGACCTC
281         IleMetGlyAspSerSerValGlnAspGlnTrpLysGluLeuSerHisGluAspLeuGlu    300

CCCCCACCCGAGCATATCCCCCCACCTCCCCGGCCACCCAAACGAATCCTGGAGCCACACTGA
901         ---------+---------+---------+---------+---------+---------+---    960
            GGGGGTGGGCTCGTATAGGGGGGTGGAGGGGCCGGTGGGTTTGCTTAGGACCTCGGTGTGACT
301         ProProProGluHisIleProProProProArgProProLysArgIleLeuGluProHisEnd    320
```

FIGURE 2B

```
         GAAACAAGCACTGGATTCCATATCCCACTGCCAAAACCGCATGGTTCAGATTATCGCTAT
  1      ---------+---------+---------+---------+---------+---------+    60
         CTTTGTTCGTGACCTAAGGTATAGGGTGACGGTTTTGGCGTACCAAGTCTAATAGCGATA

TGCAGCTTTCATCATAATACACACCTTTGCTGCCGAAACGAAGCCAGACAACAGATTTCC
  61     ---------+---------+---------+---------+---------+---------+   120
         ACGTCGAAAGTAGTATTATGTGTGGAAACGACGGCTTTGCTTCGGTCTGTTGTCTAAAGG

ATCAGCAGGATGTGGGGGCTCAAGGTTCTGCTGCTACCTGTGGTGAGCTTTGCTCTGTAC
 121     ---------+---------+---------+---------+---------+---------+   180
         TAGTCGTCCTACACCCCCGAGTTCCAAGACGACGATGGACACCACTCGAAACGAGACATG
                     MetTrpGlyLeuLysValLeuLeuLeuProValValSerPheAlaLeuTyr

CCTGAGGAGATACTGGACACCCACTGGGAGCTATGGAAGAAGACCCACAGGAAGCAATAT
 181     ---------+---------+---------+---------+---------+---------+   240
         GGACTCCTCTATGACCTGTGGGTGACCCTCGATACCTTCTTCTGGGTGTCCTTCGTTATA
         ProGluGluIleLeuAspThrHisTrpGluLeuTrpLysLysThrHisArgLysGlnTyr

AACAACAAGGTGGATGAAATCTCTCGGCGTTTAATTTGGGAAAAAAACCTGAAGTATATT
 241     ---------+---------+---------+---------+---------+---------+   300
         TTGTTGTTCCACCTACTTTAGAGAGCCGCAAATTAAACCCTTTTTTTGGACTTCATATAA
         AsnAsnLysValAspGluIleSerArgArgLeuIleTrpGluLysAsnLeuLysTyrIle

TCCATCCATAACCTTGAGGCTTCTCTTGGTGTCCATACATATGAACTGGCTATGAACCAC
 301     ---------+---------+---------+---------+---------+---------+   360
         AGGTAGGTATTGGAACTCCGAAGAGAACCACAGGTATGTATACTTGACCGATACTTGGTG
         SerIleHisAsnLeuGluAlaSerLeuGlyValHisThrTyrGluLeuAlaMetAsnHis

CTGGGGGACATGACCAGTGAAGAGGTGGTTCAGAAGATGACTGGACTCAAAGTACCCCTG
 361     ---------+---------+---------+---------+---------+---------+   420
         GACCCCCTGTACTGGTCACTTCTCCACCAAGTCTTCTACTGACCTGAGTTTCATGGGGAC
         LeuGlyAspMetThrSerGluGluValValGlnLysMetThrGlyLeuLysValProLeu

TCTCATTCCCGCAGTAATGACACCCTTTATATCCCAGAATGGGAAGGTAGAGCCCCAGAC
 421     ---------+---------+---------+---------+---------+---------+   480
         AGAGTAAGGGCGTCATTACTGTGGGAAATATAGGGTCTTACCCTTCCATCTCGGGGTCTG
         SerHisSerArgSerAsnAspThrLeuTyrIleProGluTrpGluGlyArgAlaProAsp

TCTGTCGACTATCGAAAGAAAGGATATGTTACTCCTGTCAAAAATCAGGGTCAGTGTGGT
 481     ---------+---------+---------+---------+---------+---------+   540
         AGACAGCTGATAGCTTTCTTTCCTATACAATGAGGACAGTTTTTAGTCCCAGTCACACCA
         SerValAspTyrArgLysLysGlyTyrValThrProValLysAsnGlnGlyGlnCysGly
```

FIGURE 3A

```
              TCCTGTTGGGCTTTTAGCTCTGTGGGTGCCCTGGAGGGCCAACTCAAGAAGAAAACTGGC
541           ---------+---------+---------+---------+---------+---------+    600
              AGGACAACCCGAAAATCGAGACACCCACGGGACCTCCCGGTTGAGTTCTTCTTTTGACCG
              SerCysTrpAlaPheSerSerValGlyAlaLeuGluGlyGlnLeuLysLysLysThrGly
                 139

AAACTCTTAAATCTGAGTCCCCAGAACCTAGTGGATTGTGTGTCTGAGAATGATGGCTGT
601           ---------+---------+---------+---------+---------+---------+    660
              TTTGAGAATTTAGACTCAGGGGTCTTGGATCACCTAACACACAGACTCTTACTACCGACA
              LysLeuLeuAsnLeuSerProGlnAsnLeuValAspCysValSerGluAsnAspGlyCys

GGAGGGGGCTACATGACCAATGCCTTCCAATATGTGCAGAAGAACCGGGGTATTGACTCT
661           ---------+---------+---------+---------+---------+---------+    720
              CCTCCCCCGATGTACTGGTTACGGAAGGTTATACACGTCTTCTTGGCCCCATAACTGAGA
              GlyGlyGlyTyrMetThrAsnAlaPheGlnTyrValGlnLysAsnArgGlyIleAspSer

GAAGATGCCTACCCATATGTGGGACAGGAAGAGAGTTGTATGTACAACCCAACAGGCAAG
721           ---------+---------+---------+---------+---------+---------+    780
              CTTCTACGGATGGGTATACACCCTGTCCTTCTCTCAACATACATGTTGGGTTGTCCGTTC
              GluAspAlaTyrProTyrValGlyGlnGluGluSerCysMetTyrAsnProThrGlyLys

GCAGCTAAATGCAGAGGGTACAGAGAGATCCCCGAGGGGAATGAGAAAGCCCTGAAGAGG
781           ---------+---------+---------+---------+---------+---------+    840
              CGTCGATTTACGTCTCCCATGTCTCTCTAGGGGCTCCCCTTACTCTTTCGGGACTTCTCC
              AlaAlaLysCysArgGlyTyrArgGluIleProGluGlyAsnGluLysAlaLeuLysArg

GCAGTGGCCCGAGTGGGACCTGTCTCTGTGGCCATTGATGCAAGCCTGACCTCCTTCCAG
841           ---------+---------+---------+---------+---------+---------+    900
              CGTCACCGGGCTCACCCTGGACAGAGACACCGGTAACTACGTTCGGACTGGAGGAAGGTC
              AlaValAlaArgValGlyProValSerValAlaIleAspAlaSerLeuThrSerPheGln

TTTTACAGCAAAGGTGTGTATTATGATGAAAGCTGCAATAGCGATAATCTGAACCATGCG
901           ---------+---------+---------+---------+---------+---------+    960
              AAAATGTCGTTTCCACACATAATACTACTTTCGACGTTATCGCTATTAGACTTGGTACGC
              PheTyrSerLysGlyValTyrTyrAspGluSerCysAsnSerAspAsnLeuAsnHisAla

GTTTTGGCAGTGGGATATGGAATCCAGAAGGGAAACAAGCACTGGATAATTAAAAACAGC
961           ---------+---------+---------+---------+---------+---------+    1020
              CAAAACCGTCACCCTATACCTTAGGTCTTCCCTTTGTTCGTGACCTATTAATTTTTGTCG
              ValLeuAlaValGlyTyrGlyIleGlnLysGlyAsnLysHisTrpIleIleLysAsnSer

TGGGGAGAAAACTGGGGAAACAAAGGATATATCCTCATGGCTCGAAATAAGAACAACGCC
1021          ---------+---------+---------+---------+---------+---------+    1080
              ACCCCTCTTTTGACCCCTTTGTTTCCTATATAGGAGTACCGAGCTTTATTCTTGTTGCGG
              TrpGlyGluAsnTrpGlyAsnLysGlyTyrIleLeuMetAlaArgAsnLysAsnAsnAla
```

FIGURE 3B

```
        TGTGGCATTGCCAACCTGGCCAGCTTCCCCAAGATGTGACTCCAGCCAGCCAAATCCATC
1081    ---------+---------+---------+---------+---------+---------+    1140
        ACACCGTAACGGTTGGACCGGTCGAAGGGGTTCTACACTGAGGTCGGTCGGTTTAGGTAG
        CysGlyIleAlaAsnLeuAlaSerPheProLysMetEnd

CTGCTCTTCCATTTCTTCCACGATGGTGCAGTGTAACGATGCACTTTGGAAGGGAGTTGG
1141    ---------+---------+---------+---------+---------+---------+    1200
        GACGAGAAGGTAAAGAAGGTGCTACCACGTCACATTGCTACGTGAAACCTTCCCTCAACC

TGTGCTATTTTTGAAGCAGATGTGGTGATACTGAGATTGTCTGTTCAGTTTCCCCATTTG
1201    ---------+---------+---------+---------+---------+---------+    1260
        ACACGATAAAAACTTCGTCTACACCACTATGACTCTAACAGACAAGTCAAAGGGGTAAAC

TTTGTGCTTCAAATGATCCTTCCTACTTTGCTTCTCTCCACCCATGACCTTTTTCACTGT
1261    ---------+---------+---------+---------+---------+---------+    1320
        AAACACGAAGTTTACTAGGAAGGATGAAACGAAGAGAGGTGGGTACTGGAAAAAGTGACA

GGCCATCAGGACTTTCCCTGACAGCTGTGTACTCTTAGGCTAAGAGATGTGACTACAGCC
1321    ---------+---------+---------+---------+---------+---------+    1380
        CCGGTAGTCCTGAAAGGGACTGTCGACACATGAGAATCCGATTCTCTACACTGATGTCGG

TGCCCCTGACTGTGTTGTCCCAGGGCTGATGCTGTACAGGTACAGGCTGGAGATTTTCAC
1381    ---------+---------+---------+---------+---------+---------+    1440
        ACGGGGACTGACACAACAGGGTCCCGACTACGACATGTCCATGTCCGACCTCTAAAAGTG

ATAGGTTAGATTCTCATTCACGGGACTAGTTAGCTTTAAGCACCCTAGAGGACTAGGGTA
1441    ---------+---------+---------+---------+---------+---------+    1500
        TATCCAATCTAAGAGTAAGTGCCCTGATCAATCGAAATTCGTGGGATCTCCTGATCCCAT

ATCTGACTTCTCACTTCCTAAGTTCCCTTCTATATCCTCAAGGTAGAAATGTCTATGTTT
1501    ---------+---------+---------+---------+---------+---------+    1560
        TAGACTGAAGAGTGAAGGATTCAAGGGAAGATATAGGAGTTCCATCTTTACAGATACAAA

TCTACTCCAATTCATAAATCTATTCATAAGTCTTTGGTACAAGTTTACATGATAAAAAGA
1561    ---------+---------+---------+---------+---------+---------+    1620
        AGATGAGGTTAAGTATTTAGATAAGTATTCAGAAACCATGTTCAAATGTACTATTTTTCT

AATGTGATTTGTCTTCCCTTCTTTGCACTTTTGAAATAAAGTATTTATC
1621    ---------+---------+---------+---------+---------         1669
        TTACACTAAACAGAAGGGAAGAAACGTGAAAACTTTATTTCATAAATAG
```

FIGURE 3C

```
      CTGCAGGAATTCGGCACGAGGGGTGCTATTGTGAGGCGGTTGTAGAAGTTAATAAAGGTA
  1   ---------+---------+---------+---------+---------+---------+   60
      GACGTCCTTAAGCCGTGCTCCCCACGATAACACTCCGCCAACATCTTCAATTATTTCCAT

TCCATGGAGAACACTGAAAACTCAGTGGATTCAAAATCCATTAAAAATTTGGAACCAAAG
 61   ---------+---------+---------+---------+---------+---------+  120
      AGGTACCTCTTGTGACTTTTGAGTCACCTAAGTTTTAGGTAATTTTTAAACCTTGGTTTC
          MetGluAsnThrGluAsnSerValAspSerLysSerIleLysAsnLeuGluProLys

ATCATACATGGAAGCGAATCAATGGACTCTGGAATATCCCTGGACAACAGTTATAAAATG
121   ---------+---------+---------+---------+---------+---------+  180
      TAGTATGTACCTTCGCTTAGTTACCTGAGACCTTATAGGGACCTGTTGTCAATATTTTAC
      IleIleHisGlySerGluSerMetAspSerGlyIleSerLeuAspAsnSerTyrLysMet

GATTATCCTGAGATGGGTTTATGTATAATAATTAATAATAAGAATTTTCATAAGAGCACT
181   ---------+---------+---------+---------+---------+---------+  240
      CTAATAGGACTCTACCCAAATACATATTATTAATTATTATTCTTAAAAGTATTCTCGTGA
      AspTyrProGluMetGlyLeuCysIleIleIleAsnAsnLysAsnPheHisLysSerThr

GGAATGACATCTCGGTCTGGTACAGATGTCGATGCAGCAAACCTCAGGGAAACATTCAGA
241   ---------+---------+---------+---------+---------+---------+  300
      CCTTACTGTAGAGCCAGACCATGTCTACAGCTACGTCGTTTGGAGTCCCTTTGTAAGTCT
      GlyMetThrSerArgSerGlyThrAspValAspAlaAlaAsnLeuArgGluThrPheArg

AACTTGAAATATGAAGTCAGGAATAAAAATGATCTTACACGTGAAGAAATTGTGGAATTG
301   ---------+---------+---------+---------+---------+---------+  360
      TTGAACTTTATACTTCAGTCCTTATTTTTACTAGAATGTGCACTTCTTTAACACCTTAAC
      AsnLeuLysTyrGluValArgAsnLysAsnAspLeuThrArgGluGluIleValGluLeu

ATGCGTGATGTTTCTAAAGAAGATCACAGCAAAAGGAGCAGTTTTGTTTGTGTGCTTCTG
361   ---------+---------+---------+---------+---------+---------+  420
      TACGCACTACAAAGATTTCTTCTAGTGTCGTTTTCCTCGTCAAAACAAACACACGAAGAC
      MetArgAspValSerLysGluAspHisSerLysArgSerSerPheValCysValLeuLeu

AGCCATGGTGAAGAAGGAATAATTTTTGGAACAAATGGACCTGTTGACCTGAAAAAAATA
421   ---------+---------+---------+---------+---------+---------+  480
      TCGGTACCACTTCTTCCTTATTAAAAACCTTGTTTACCTGGACAACTGGACTTTTTTTAT
      SerHisGlyGluGluGlyIleIlePheGlyThrAsnGlyProValAspLeuLysLysIle

ACAAACTTTTTCAGAGGGGATCGTTGTAGAAGTCTAACTGGAAAACCCAAACTTTTCATT
481   ---------+---------+---------+---------+---------+---------+  540
      TGTTTGAAAAAGTCTCCCCTAGCAACATCTTCAGATTGACCTTTTGGGTTTGAAAAGTAA
      ThrAsnPhePheArgGlyAspArgCysArgSerLeuThrGlyLysProLysLeuPheIle
```

FIGURE 4A

```
       ATTCAGGCCTGCCGTGGTACAGAACTGGACTGTGGCATTGAGACAGACAGTGGTGTTGAT
541    ---------+---------+---------+---------+---------+---------+    600
       TAAGTCCGGACGGCACCATGTCTTGACCTGACACCGTAACTCTGTCTGTCACCACAACTA
       IleGlnAlaCysArgGlyThrGluLeuAspCysGlyIleGluThrAspSerGlyValAsp
                 163

GATGACATGGCGTGTCATAAAATACCAGTGGAGGCCGACTTCTTGTATGCATACTCCACA
601    ---------+---------+---------+---------+---------+---------+    660
       CTACTGTACCGCACAGTATTTTATGGTCACCTCCGGCTGAAGAACATACGTATGAGGTGT
       AspAspMetAlaCysHisLysIleProValGluAlaAspPheLeuTyrAlaTyrSerThr

GCACCTGGTTATTATTCTTGGCGAAATTCAAAGGATGGCTCCTGGTTCATCCAGTCGCTT
661    ---------+---------+---------+---------+---------+---------+    720
       CGTGGACCAATAATAAGAACCGCTTTAAGTTTCCTACCGAGGACCAAGTAGGTCAGCGAA
       AlaProGlyTyrTyrSerTrpArgAsnSerLysAspGlySerTrpPheIleGlnSerLeu

TGTGCCATGCTGAAACAGTATGCCGACAAGCTTGAATTTATGCACATTCTTACCCGGGTT
721    ---------+---------+---------+---------+---------+---------+    780
       ACACGGTACGACTTTGTCATACGGCTGTTCGAACTTAAATACGTGTAAGAATGGGCCCAA
       CysAlaMetLeuLysGlnTyrAlaAspLysLeuGluPheMetHisIleLeuThrArgVal

AACCGAAAGGTGGCAACAGAATTTGAGTCCTTTTCCTTTGACGCTACTTTTCATGCAAAG
781    ---------+---------+---------+---------+---------+---------+    840
       TTGGCTTTCCACCGTTGTCTTAAACTCAGGAAAAGGAAACTGCGATGAAAAGTACGTTTC
       AsnArgLysValAlaThrGluPheGluSerPheSerPheAspAlaThrPheHisAlaLys

AAACAGATTCCATGTATTGTTTCCATGCTCACAAAAGAACTCTATTTTTATCACTAAAGA
841    ---------+---------+---------+---------+---------+---------+    900
       TTTGTCTAAGGTACATAACAAAGGTACGAGTGTTTTCTTGAGATAAAAATAGTGATTTCT
       LysGlnIleProCysIleValSerMetLeuThrLysGluLeuTyrPheTyrHisEnd

AATGGTTGGTTGGTGGTTTTTTTTAGTTTGTATGCCAAGTGAGAAGATGGTATATTTGGT
901    ---------+---------+---------+---------+---------+---------+    960
       TTACCAACCAACCACCAAAAAAAATCAAACATACGGTTCACTCTTCTACCATATAAACCA

ACTGTATTTCCCTCTCATTTTGACCTACTCTCATGCTGCAG
961    ---------+---------+---------+---------+-   1001
       TGACATAAAGGGAGAGTAAAACTGGATGAGAGTACGACGTC
```

FIGURE 4B

LIGANDS FOR PHOSPHATASE BINDING ASSAY

CROSS-REFERENCE TO RELATED APPLICATIONS

This is a continuation-in-part of application Ser. No. 08/964,308 filed Nov. 4, 1997 now U.S. Pat. No. 6,066,715 which is based on Provisional application No. 60/030,141, filed Nov. 12, 1996.

FIELD OF THE INVENTION

This invention relates to the use of mutant phosphatase and protease enzymes in a competitive binding assay. Specific examples are the enzymes, tyrosine phosphatase and cysteine protease, e.g. Cathepsin K, and the assay specifically described is a scintillation proximity assay using a radioactive inhibitor to induce scintillation.

BACKGROUND OF THE INVENTION

The use of the scintillation proximity assay (SPA) to study enzyme binding and interactions is a new type of radioimmunoassay and is well known in the art. The advantage of SPA technology over more conventional radioimmunoassay or ligand-binding assays, is that it eliminates the need to separate unbound ligand from bound ligand prior to ligand measurement. See for example, *Nature*, Vol, 341, pp. 167–178 entitled "Scintillation Proximity Assay " by N. Bosworth and P. Towers, *Anal. Biochem*. Vol. 217, pp. 139–147 (1994) entitled "Biotinylated and Cysteine-Modified Peptides as Useful Reagents For Studying the Inhibition of Cathepsin G" by A. M. Brown, et al., *Anal. Biochem*. Vol. 223, pp. 259–265 (1994) entitled "Direct Measurement of the Binding of RAS to Neurofibromin Using Scintillation Proximity Assay" by R. H. Skinner et al. and *Anal. Biochem*. Vol. 230, pp. 101–107(1995) entitled "Scintillation Proximity Assay to Measure Binding of Soluble Fibronectin to Antibody-Captured alpha$_5\beta_1$ Integrin" by J. A. Pachter et al.

The basic principle of the assay lies in the use of a solid support containing a scintillation agent, wherein a target enzyme is attached to the support through, e.g., a second enzyme-antienzyme linkage. A known tritiated or $I^{125}$ iodinated binding agent, i.e., radioligand inhibitor ligand for the target enzyme is utilized as a control, which when bound to the active site in the target enzyme, is in close proximity to the scintillation agent to induce a scintillation signal, e.g., photon emission, which can be measured by conventional scintillation/radiographic techniques. The unbound tritiated (hot) ligand is too far removed from the scintillation agent to cause an interfering measurable scintillation signal and therefore does not need to be separated, e.g., filtration, as in conventional ligand-binding assays.

The binding of an unknown or potential new ligand (cold, being non-radioactive) can then be determined in a competitive assay versus the known radioligand, by measuring the resulting change in the scintillation signal which will significantly decrease when the unknown ligand also possesses good binding properties.

However, a problem arises when utilizing a target enzyme containing a cysteine group, having a free thiol linkage, —SH, (or present as —S⁻) which is in the active site region or is closely associated with the active site and is important for enzyme-ligand binding. If the unknown ligand or mixture, e.g. natural product extracts, human body fluids, cellular fluids, etc. contain reagents which can alkylate, oxidize or chemically interfere with the cysteine thiol group such that normal enzyme-ligand binding is disrupted, then false readings will occur in the assay.

What is needed in the art is a method to circumvent and avoid the problem of cysteine interference in the scintillation proximity assay (SPA) procedure in enzyme binding studies.

An inhibitor of PTP 1B has the potential to improve insulin-sensitivity and will have utility in preventing or treating Type 1 and Type 2 diabetes, to improve glucose tolerance, to improve insulin-sensitivity when there is insulin-resistance and to treat or prevent obesity. In addition, it may be of use to treat or prevent cancer, neurodegenerative diseases etc.

SUMMARY OF THE INVENTION

We have discovered that by substituting serine for cysteine in a target enzyme, where the cysteine plays an active role in the wild-type enzyme-natural ligand binding process, usually as the catalytic nucleophile in the active binding site, a mutant is formed which can be successfuly employed in a scintillation proximity assay without any active site cysteine interference.

This discovery can be utilized for any enzyme which contains cysteine groups important or essential for binding and/or catalytic activity as proteases or hydrolases and includes phosphatases, e.g., tyrosine phosphatases and proteases, e.g. cysteine proteases, including the cathepsins, i.e., Cathepsin K (O2) and the caspases.

Further, use of the mutant enzyme is not limited to the scintillation proximity assay, but can be used in a wide variety of known assays including colorimetric, spectrophotometric, ligand-binding assays, radioimmunoassays and the like.

We have furthermore discovered a new method of amplifying the effect of a binding agent ligand, e.g., radioactive inhibitor, useful in the assay by replacing two or more phosphotyrosine residues with 4-phosphono (difluoromethyl) phenylalanine ($F_2$Pmp) moieties. The resulting inhibitor exhibits a greater and more hydrolytically stable binding affinity for the target enzyme and a stronger scintillation signal.

By this invention there is provided a process for determining the binding ability of a ligand to a cysteine-containing wild-type enzyme comprising the steps of:

(a) contacting a complex with the ligand, the complex comprising a mutant form of the wild-type enzyme, in which cysteine, at the active site, is replaced with serine, in the presence of a known binding agent for the mutant enzyme, wherein the binding agent is capable of binding with the mutant enzyme to produce a measurable signal.

Further provided is a process for determining the binding ability of a ligand, preferably a non-radioactive (cold) ligand, to an active site cysteine-containing wild-type tyrosine phosphatase comprising the steps of:

(a) contacting a complex with the ligand, the complex comprising a mutant form of the wild-type enzyme, the mutant enzyme being PTP1B, containing the same amino acid sequence 1–320 as the wild type enzyme, except at position 215, in which cysteine is replaced with serine in the mutant enzyme, in the presence of a known radioligand binding agent for the mutant enzyme, wherein the binding agent is capable of binding with the mutant enzyme to produce a measurable beta radiation-induced scintillation signal.

Also provided is a new class of peptide binding agents selected from the group consisting of:

N-Benzoyl-L-glutamyl-[4-phosphono(difluoromethyl)]-L-phenylalanyl-[4-phosphono(difluoromethyl)]-L-phenylalanineamide (BzN-EJJ-CONH$_2$), where E is glutamic acid and J is 4-phosphono(difluoro-methyl)]-L-phenylalanyl;

N-Benzoyl-L-glutamyl-[4-phosphono(difluoromethyl)]-L-phenylalanyl-[4-phosphono(difluoromethyl)]-L-phenylalanine amide;

N-(3,5-Dibromo)benzoyl-L-glutamyl-[4-phosphono(difluoromethyl)]-L-phenylalanyl-[4-phosphono(difluoromethyl)]-L-phenylalanine amide;

N-Acetyl-L-glutamyl-[4-phosphono(difluoromethyl)]-L-phenylalanyl-[4-phosphono(difluoromethyl)]-L-phenylalanine amide;

L-Glutamyl-[4-phosphono(difluoromethyl)]-L-phenylalanyl-[4-phosphono(difluoromethyl)]-L-phenylalanine amide;

L-Lysinyl-[4-phosphono(difluoromethyl)]-L-phenylalanyl-[4-phosphono(difluoromethyl)]-L-phenylalanine amide;

L-Serinyl-[4-phosphono(difluoromethyl)]-L-phenylalanyl-[4-phosphono(difluoromethyl)]-L-phenylalanine amide;

L-Prolinyl-[4-phosphono(difluoromethyl)]-L-phenylalanyl-[4-phosphono-(difluoromethyl)]-L-phenylalanine amide; and L-Isoleucinyl-[4-phosphono(difluoromethyl)]-L-phenylalanyl-[4-phosphono(difluoromethyl)]-L-phenylalanine amide; and their tritiated and I$^{125}$ iodinated derivatives.

Also provided is a class of compounds represented by structure A which are peptide binding agents and inhibitors of the PTP 1B enzyme.

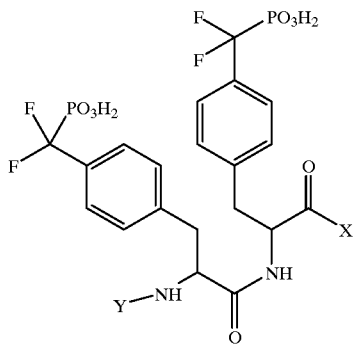

A

Further provided is a novel tritiated peptide, tritiated BzN-EJJ-CONH$_2$, being N-(3,5-Ditritio)benzoyl-L-glutamyl-[4-phosphono(difluoromethyl)]-L-phenylalanyl-[4-phosphono(difluoromethyl)]-L-phenylalanineamide, wherein E as used herein is glutamic acid and J, as used herein, is the (F$_2$Pmp) moiety, (4-phosphono(difluoromethyl)-phenylalanyl).

Furthermore there is provided a process for increasing the binding affinity of a ligand for a tyrosine phosphatase or cysteine protease comprising introducing into the ligand two or more 4-phosphono(difluoromethyl)-phenylalanine groups; also provided is the resulting disubstituted ligand.

In addition there is provided a complex comprised of:
(a) a mutant form of a wild-type enzyme, in which cysteine, necessary for activity in the active site, is replaced with serine and is attached to:
(b) a solid support.

BRIEF DESCRIPTION OF THE DRAWINGS

FIGS. 2(A and B) illustrates the DNA and amino acid sequences for PTP 1B tyrosine phosphatase enzyme, truncated to amino acid positions 1–320. (Active site cysteine at position 215 is in bold and underlined).

FIGS. 3(A, B and C) illustrates the DNA and amino acid sequences for Cathepsin K. The upper nucleotide sequence represents the cathepsin K cDNA sequence which encodes the cathepsin K preproenzyme (indicated by the corresponding three letter amino acid codes). Numbering indicates the cDNA nucleotide position. The underlined amino acid is the active site Cys$^{139}$ residue that was mutated to either Ser or Ala.

FIGS. 4(A and B) illustrates the DNA and amino acid sequences for the caspase, apopain. The upper nucleotide sequence represents the apopain (CPP32) cDNA sequence which encodes the apopain proenzyme (indicated by the corresponding three letter amino acid codes). Numbering indicates the cDNA nucleotide position. The underlined amino acid is the active site Cys$^{163}$ residue that was mutated to Ser.

DETAILED DESCRIPTION OF THE INVENTION

Figure 1:
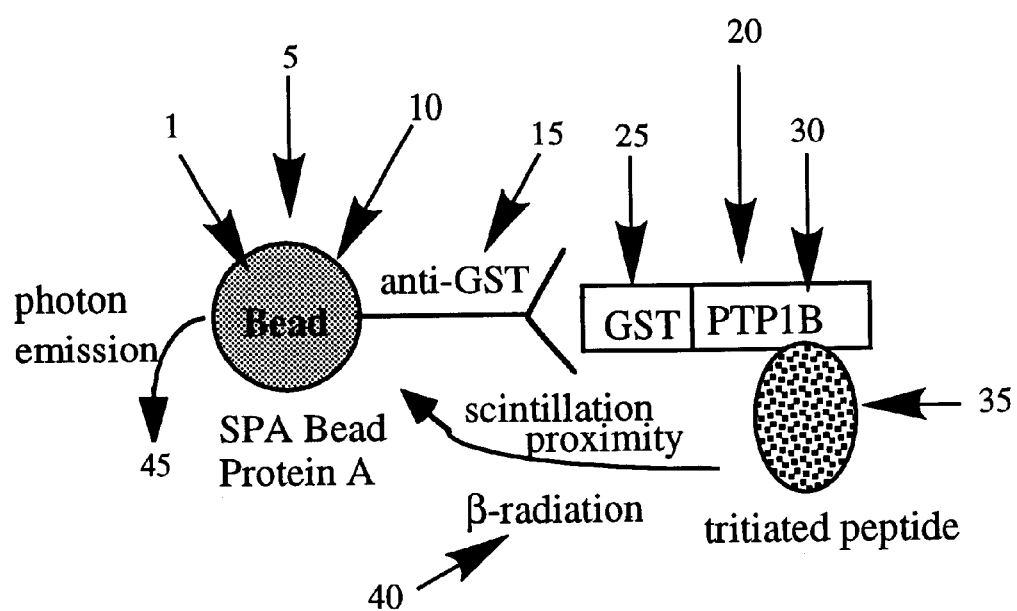
FIG. 1 illustrates the main elements of the invention including the scintillation agent 1, the supporting (fluoromicrosphere) bead 5, the surface binding Protein A 10, the linking anti-GST enzyme 15, the fused enzyme construct 20, the GST enzyme 25, the mutant enzyme 30, the tritiated peptide inhibitor 35, the beta radiation emission 40 from the radioactive peptide inhibitor 35 and the emitted light 45 from the induced scintillation.
Figure 5:
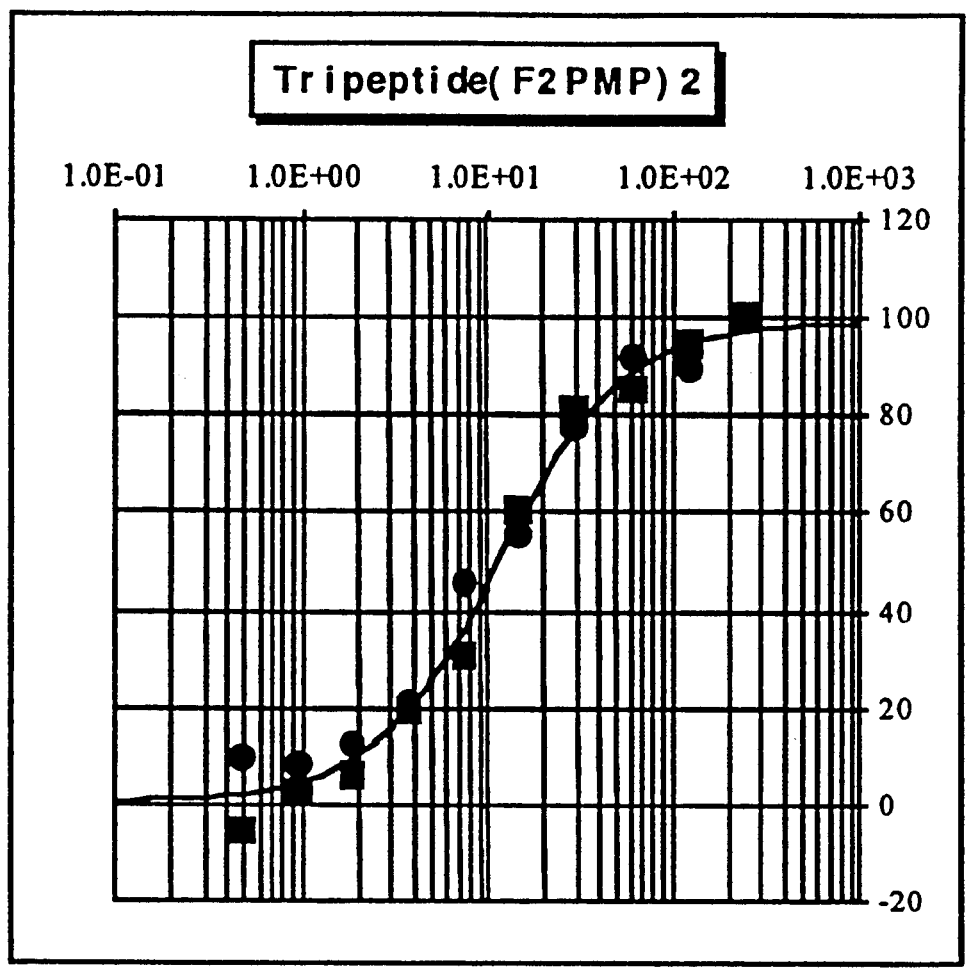
FIG. 5 shows the results of an experiment on the competitive inhibition of binding of the tripeptide (F$_2$PMP)$_2$.

The theory underlying the main embodiment of the invention can be readily seen and understood by reference to FIG. 1.

Scintillation agent 1 is incorporated into small (yttrium silicate or PVT fluoromicro-spheres, AMERSHAM) beads 5 that contain on their surface immunosorbent protein A 10. The protein A coated bead 5 binds the GST fused enzyme construct 20, containing GST enzyme 25 and PTP1B mutant enzyme 30, via anti-GST enzyme antibody 15. When the radioactive e.g., tritiated, peptide 35 is bound to the mutant phosphatase enzyme 30, it is in dose enough proximity to the bead 5 for its beta emission 40 (or Auger electron emission in the case of I$^{125}$) to stimulate the scintillation agent 1 to emit light (photon emission) 45. This light 45 is measured as counts in a beta plate counter. When the tritiated peptide 35 is unbound it is too distant from the scintillation agent 1 and the energy is dissipated before reaching the bead 5, resulting in low measured counts. Non-radioactive ligands which compete with the tritiated peptide 35 for the same binding site on the mutant phosphatase enzyme 30 will remove and/or replace the tritiated peptide 35 from the mutant enzyme 30 resulting in lower counts from the uncompeted peptide control. By varying the concentration of the unknown ligand and measuring the resulting lower counts, the inhibition at 50%(IC$_{50}$) for ligand binding to the mutant enzyme 30 can be obtained. This then is a measure of the binding ability of the ligand to the mutant enzyme and the wild-type enzyme.

The term "complex" as used herein refers to the assembly containing the mutant enzyme. In its simplest embodiment, the complex is a solid support with the mutant enzyme attached to the surface of the support. A linker can also be employed. As illustrated in FIG. 1, the complex can further comprise a bead (fluoropolymer), anti-enzyme GST/enzyme GST-mutant enzyme-PTP1 linking construct, immunosorbent protein A, and scintillation agent. In general, the complex requires a solid support (beads, immunoassay column of e.g., $Al_2O_3$, or silica gel) to which the mutant enzyme can be anchored or tethered by attachment through a suitable linker, e.g., an immunosorbent (e.g, Protein A, Protein G, anti-mouse, anti-rabbit, anti-sheep) and a linking assembly, including an enzyme/anti-enzyme construct attached to the solid support.

The term "cysteine-containing wild-type enzyme", as used herein, includes all native or natural enzymes, e.g., phosphatases, cysteine proteases, which contain cysteine in the active site as the active nucleophile, or contain cysteine clearly associated with the active site that is important in binding activity.

The term "binding agent" as used herein includes all ligands (compounds) which are known to be able to bind with the wild-type enzyme and usually act as enzyme inhibitors. The binding agent carries a signal producing agent, e.g., radionuclide, to initiate the measurable signal. In the SPA assay the binding agent is a radioligand.

The term "measurable signal" as used herein includes any type of generated signal, e.g., radioactive, colorimetric, photometric, spectrophotometric, scintillation, which is produced when binding of the radioligand binding agent to the mutant enzyme.

The present invention assay further overcomes problems encountered in the past, where compounds were evaluated by their ability to affect the reaction rate of the enzyme in the phosphatase activity assay. However this did not give direct evidence that compounds were actually binding at the active site of the enzyme. The herein described invention binding assay using a substrate analog can determine directly whether the mixtures of natural products can irreversibly modify the active site cysteine in the target enzyme resulting in inhibition of the enzymatic activity. To overcome inhibition by these contaminates in the phosphatase assay, a mutated Cys(215) to Ser(215) form of the tyrosine phosphatase PTP1B was cloned and expressed resulting in a catalytically inactive enzyme. In general, replacement of cysteine by serine will lead to a catalytically inactive or substantially reduced activity mutant enzyme.

PTP1B is the first protein tyrosine phosphatase to be purified to near homogeneity {Tonks et al. *JBC* 263, 6731–6737 (1988)} and sequenced by Charbonneau et al. *PNAS* 85, 7182–7186 (1988). The sequence of the enzyme showed substantial homology to a duplicated domain of an abundant protein present in hematopoietic cells variously referred to as LCA or CD45. This protein was shown to possess tyrosine phosphatase activity {Tonks et al. *Biochemistry* 27, 8695–8701 (1988)}. Protein tyrosine phosphatases have been known to be sensitive to thiol oxidizing agents and alignment of the sequence of PTP1B with subsequently cloned Drosophila and mammalian tyrosine phosphatases pointed to the conservation of a Cysteine residue {(M. Strueli et al. *Proc. Nat'l Acad USA*, Vol. 86, pp. 8698–7602 (1989)} which when mutated to Ser inactivated the catalytic activity of the enzymes. Guan et al. (1991) {J.B.C. Vol. 266, 17926–17030, 1991} cloned the rat homologue of PTP1B, expressed a truncated version of the protein in bacteria, purified and showed the Cys at position 215 is the active site residue. Mutation of the $Cys^{215}$ to $Ser^{215}$ resulted in loss of catalytic activity. Human PTP1B was cloned by Chernoff et al. Proc. Natl. Acad. Sci. USA 87, 2735–2739 (1990).

Work leading up to the development of the substrate analog $BzN-EJJ-CONH_2$ for PTP1B was published by T. Burke et al. *Biochem. Biophys. Res. Comm.* 205, pp. 129–134 (1994) with the synthesis of the hexamer peptide containing the phosphotyrosyl mimetic $F_2Pmp$. We have incorporated the ($F_2Pmp$) moiety (4-phosphono (difluoromethyl)phenylalanyl) into various peptides that led to the discovery of $BzN-EJJ-CONH_2$, (where E is glutamic acid and J as used herein is the $F_2Pmp$ moiety) an active (5 nM) inhibitor of PTP1B. This was subsequently tritiated giving the radioactive substrate analog required for the binding assay.

The mutated enzyme, as the truncated version, containing amino acids 1–320 (see FIG. 2), has been demonstrated to bind the substrate analog $Bz-NEJJ-CONH_2$ with high affinity for the first time. The mutated enzyme is less sensitive to oxidizing agents than the wild-type enzyme and provides an opportunity to identify novel inhibitors for this family of enzymes. The use of a mutated enzyme to eliminate interfering contaminates during drug screening is not restricted to the tyrosine phosphatases and can be used for other enzyme binding assays as well.

Other binding assays exist in the art in which the basic principle of this invention can be utilized, namely, using a mutant enzyme in which an important and reactive cysteine important for activity can modified to serine (or a less reactive amino acid) and render the enzyme more stable to cysteine modifying reagents, such as alkylating and oxidizing agents. These other ligand-binding assays include, for example, colorimetric and spectrophotometric assays, e.g. measurement of produced color or fluororescence, phosphorescence (e.g. ELISA, solid absorbant assays) and other radioimmunoassays in which short or long wave light radiation is produced, including ultraviolet and gamma radiation).

Further, the scintillation proximity assay can also be practiced without the fluoropolymer support beads (AMERSHAM as illustrated in FIG. 1. For example, Scintistrips® are commercially available (Wallac Oy, Finland) and can also be employed as the scintillant-containing solid support for the mutant enzyme complex as well as other solid supports which are conventional in the art.

The invention assay described herein is applicable to a variety of cysteine-containing enzymes including protein phosphatases, proteases, lipases, hydrolases, and the like.

The cysteine to serine transformation in the target enzyme can readily be accomplished by analogous use of the molecular cloning technique for $Cys^{215}$ to $Ser^{215}$ described in the below-cited reference by M. Strueli et al., for PTP1B and is hereby incorporated by reference for this particular purpose.

A particularly useful class of phosphatases is the tyrosine phosphatases since they are important in cell function. Examples of this class are: PTP1B, LCA, LAR, DLAR, DPTP(See Struel_ et al., below). Ligands discovered by this assay using, for example, PTP1B can be useful, for example, in the treatment of diabetes and immunosuppression.

A useful species is PTP1B, described in *Proc. Nat'l Acad USA*, Vol. 86, pp. 8698–7602 by M. Strueli et al. and *Proc. Nat'l Acad Sci. USA*, Vol 87, pp. 2735–2739 by J. Chernoff et al.

Another useful class of enzymes is the proteases, including cysteine proteases (thiol proteases), cathepsins and caspases.

The cathepsin class of cysteine proteases is important since Cathepsin K (also termed Cathepsin O2, see *Biol.*

*Chem. Hoppe-Seyler*, Vol. 376 pp. 379–384, June 1995 by D. Bromme et al.) is primarily expressed in human osteoclasts and therefore this invention assay is useful in the study and treatment of osteoporosis. See U.S. Pat. No. 5,501,969 (1996) to Human Genome Sciences for the sequence, cloning and isolation of Cathepsin K (O2). See also *J. Biol. Chem.* Vol. 271, No. 21, pp. 12511–12516 (1996) by F. Drake et al. and *Biol. Chem. Hoppe-Seyler*, Vol. 376, pp. 379–384(1985) by D. Bromme et al., supra.

Examples of the cathepsins include Cathepsin B, Cathepsin G, Cathepsin J, Cathepsin K(O2), Cathesin L, Cathepsin M, Cathepsin S.

The caspase family of cysteine proteases are other examples where the SPA technology and the use of mutated enzymes can be used to determine the ability of unknown compounds and mixtures of compounds to compete with a radioactive inhibitor of the enzyme. An active site mutant of Human Apopain CPP32 (caspase-3) has been prepared. The active site thiol mutated enzymes are less sensitive to oxidizing agents and provide an opportunity to identify novel inhibitors for this family of enzymes.

Examples of the caspase family include: caspase-1(ICE), caspase-2 (ICH-1), caspase-3 (CPP32, human apopain, Yama), caspase-4($ICE_{rel}$-11, TX, ICH-2), caspase-5($ICE_{rel}$-111, TY), caspase-6Mch2), caspase-7(Mch3, ICE-LAP3, CMH-1), caspase-8(FLICE, MACH, Mch5), caspase-9 (ICE-LAP6, Mch6) and caspase-10(Mch4).

Substitution of the cysteine by serine (or by any other amino acid which lowers the activity to oxidizing and alkylating agents, e.g., alanine) does not alter the binding ability of the mutant enzyme to natural ligands. The degree of binding, i.e., binding constant, may be increased or decreased. The catalytic activity of the mutant enzyme will, however, be substantially decreased or even completely eliminated. Thus, natural and synthetic ligands which bind to the natural wild-type enzyme will also bind to the mutant enzyme.

Substitution by serine for cysteine also leads to the mutant enzyme which has the same qualitative binding ability as the natural enzyme but is significantly reduced in catalytically activity. Thus, this invention assay is actually measuring the true binding ability of the test ligand.

The test ligand described herein is a new ligand potentially useful in drug screening purposes and its mode of action is to generally function as an inhibitor for the enzyme.

The binding agent usually is a known ligand used as a control and is capable of binding to the natural wild-type enzyme and the mutant enzyme employed in the assay and is usually chosen as a known peptide inhibitor for the enzyme.

The binding agent also contains a known signal-producing agent to cause or induce the signal in the assay and can be an agent inducing e.g., phosphorescence or fluororescence (ELISA), color reaction or a scintillation signal.

In the instant embodiment, where the assay is a scintillation assay, the signal agent is a radionuclide, i.e., tritium, $I^{125}$, which induces the scintillant in the solid support to emit measurable light radiation, i.e., photon emission, which can be measured by using conventional scintillation and beta radiation counters.

We have also discovered that introducing two or more 4-phosphonodifluoromethyl phenylalanine $F_2$Pmp) groups into a known binding agent greatly enhances the binding affinity of the binding agent to the enzyme and improves its stability by rendering the resulting complex less susceptible to hydrolytic cleavage.

Also provided is a class of compounds represented by structure A which are peptide binding agents and inhibitors of the PTP1B enzyme.

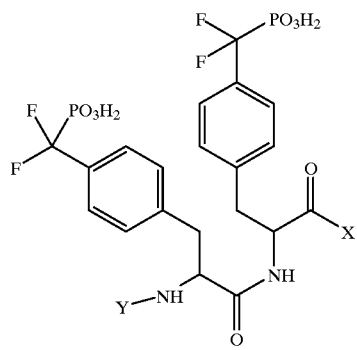

A wherein:

X is OH or $NH_2$;

Y is hydrogen, $C_{1-6}$ alkyl, $R^1Z$ CO—, $R^2$—, or $R^3S(O)_2$—;

Z is O, $NR^4$, $SCH_2$, $S(O)_2CH_2$, CH=CH or a bond;

$R^1$ is selected from the group consisting of
(a) $C_{1-10}$alkyl;
(b) $C_{1-6}$fluoroalkyl, optionally substituted with a hydroxy group;
(c) mono-, di- or tri-substituted aromatic hydrocarbon wherein the substituents are selected from the group consisting of

| | |
|---|---|
| (1) | hydrogen, |
| (2) | halo, |
| (3) | $NO_2$, |
| (4) | $N_3$, |
| (5) | OH, |
| (6) | CN, |
| (7) | $CONH_2$, |
| (8) | $CO_2H$, |
| (9) | $CO_2$—$C_{1-10}$alkyl, |
| (10) | $C_{1-10}$ alkyl, |
| (11) | $C_{1-6}$ fluoroalkyl, |
| (12) | $C_{1-10}$alkoxy, |
| (13) | $C_{1-10}$alkylthio, |
| (14) | $C_{1-10}$alkylsulfinyl, |
| (15) | $C_{1-10}$alkylsulfonyl, or |
| (16) | phenyl, |

(d) mono-, di- or tri-substituted heteroaryl wherein the heteroaryl is a monocyclic aromatic ring of 5 atoms, said ring having one hetero atom which is S, O, or N, and optionally 1, 2, or 3 additional N atoms; or the heteroaryl is a monocyclic ring of 6 atoms, said ring having one hetero atom which is N, and optionally 1, 2, or 3 additional N atoms, wherein the substituents are selected from the group consisting of

| | |
|---|---|
| (1) | hydrogen, |
| (2) | halo, |
| (3) | $NO_2$, |
| (4) | $N_3$, |

-continued

| | |
|---|---|
| (5) | OH (or the carbonyl tautomer thereof), |
| (6) | CN, |
| (7) | $CONH_2$, |
| (8) | $CO_2H$, |
| (9) | $CO_2$—$C_{1-10}$alkyl, |
| (10) | $C_{1-10}$ alkyl, |
| (11) | $C_{1-6}$ fluoroalkyl, |
| (12) | $C_{1-10}$alkoxy, |
| (13) | $C_{1-10}$alkylthio, |
| (14) | $C_{1-10}$alkylsulfinyl, or |
| (15) | $C_{1-10}$alkylsulfonyl; |

(e) a mono- or di-substituted benzoheterocycle in which the heterocycle is a 5, 6, or 7-membered ring which may contain 1 or 2 heteroatoms chosen independently from O, S, or N and which may contain a carbonyl group or a sulfonyl group; wherein the substituents are selected from the group consisting of

| | |
|---|---|
| (1) | hydrogen, |
| (2) | halo, |
| (3) | $NO_2$, |
| (4) | $N_3$, |
| (5) | OH, |
| (6) | CN, |
| (7) | $CONH_2$, |
| (8) | $CO_2H$, |
| (9) | $CO_2$—$C_{1-10}$alkyl, |
| (10) | $C_{1-10}$ alkyl, |
| (11) | $C_{1-6}$ fluoroalkyl, |
| (12) | $C_{1-10}$alkoxy, |
| (13) | $C_{1-10}$alkylthio, |
| (14) | $C_{1-10}$alkylsulfinyl, or |
| (15) | $C_{1-10}$alkylsulfonyl; |

(f) a heterocycloalkyl group of 5, 6 or 7 members which contains 1 or 2 heteroatoms chosen from O, S, or N and optionally contains a carbonyl group or a sulfonyl group;

(g) a mono- or di-substituted benzocarbocycle in which the carbocycle is a 5, 6, or 7-membered ring which optionally contains a carbonyl group, wherein the substituents are selected from the group consisting of

| | |
|---|---|
| (1) | hydrogen, |
| (2) | halo, |
| (3) | $NO_2$, |
| (4) | $N_3$, |
| (5) | OH, |
| (6) | CN, |
| (7) | $CONH_2$, |
| (8) | $CO_2H$, |
| (9) | $CO_2$—$C_{1-10}$alkyl, |
| (10) | $C_{1-10}$ alkyl, |
| (11) | $C_{1-6}$ fluoroalkyl, |
| (12) | $C_{1-10}$alkoxy, |
| (13) | $C_{1-10}$alkylthio, |
| (14) | $C_{1-10}$alkylsulfinyl, or |
| (15) | $C_{1-10}$alkylsulfonyl; |

(h) a mono- or di-substituted bicyclic heteroaryl of 8, 9, or 10 members, containing 1 to 5 heteroatoms chosen independently from O, S or N, wherein the substituents are selected from the group consisting of

| | |
|---|---|
| (1) | hydrogen; |
| (2) | halo, |
| (3) | $NO_2$, |
| (4) | $N_3$, |
| (5) | OH (or the carbonyl tantomes thereof) |
| (6) | CN, |
| (7) | $CONH_2$, |
| (8) | $CO_2H$, |
| (9) | $CO_2$—$C_{1-10}$alkyl, |
| (10) | $C_{1-10}$ alkyl, |
| (11) | $C_{1-6}$ fluoroalkyl, |
| (12) | $C_{1-10}$alkoxy, |
| (13) | $C_{1-10}$alkylthio, |
| (14) | $C_{1-10}$alkylsulfinyl, or |
| (15) | $C_{1-10}$alkylsulfonyl; or |

$R^2$ is the acyl residue of one of the amino acid described in this specification, the amino group of which may be optionally substituted by an acyl group of the structure $R^1ZCO$— or $C_{1-6}$ alkyl, and in the case of a dicarboxylic amino acid, the terminal carboxyl may optionally be in the form of a $C_{1-4}$ alkyl ester.

$R^3$ is selected from the group consisting of
(a) $C_{1-10}$alkyl,
(b) $C_{1-6}$fluoroalkyl,
(c) mono-, di- or tri-substituted aromatic hydrocarbon wherein the substituents are selected from the group consisting of

| | |
|---|---|
| (1) | hydrogen, |
| (2) | halo, |
| (3) | $NO_2$, |
| (4) | $N_3$, |
| (5) | OH, |
| (6) | CN, |
| (7) | $CO_{NH2}$, |
| (8) | $CO_2H$, |
| (9) | $CO_2$—$C_{1-10}$alkyl, |
| (10) | $C_{1-10}$ alkyl, |
| (11) | $C_{1-6}$ fluoroalkyl, |
| (12) | $C_{1-10}$alkoxy, |
| (13) | $C_{1-10}$alkylthio, |
| (14) | $C_{1-10}$alkylsulfinyl, or |
| (15) | $C_{1-10}$alkylsulfonyl. |

A preferred embodiment of structure A is that wherein both J's are of the L-configuration.

Another preferred embodiment of structure A is that wherein $R^2$ is of the L-configuration.

Another preferred embodiment of structure A is that wherein Z is a bond.

Another preferred embodiment of structure A is that wherein X is $NH_2$.

A method for introducing one $F_2Pmp$ moiety into a ligand is known in the art and is described in detail in *Biochem. Biophys. Res. Comm.* Vol. 204, pp. 129–134 (1994) hereby incorporated by reference for this particular purpose.

As a result of this technology we discovered a new class of ligands having extremely good binding affinity for PTP1B. These include:

N-Benzoyl-L-glutamyl-[4-phosphono(difluoromethyl)]-L-phenyl-alanyl-[4-phosphono(difluoromethyl)]-L-phenylalanine amide, N-(3,5-Dibromo)benzoyl-L-glutamyl-[4-phosphono(difluoromethyl)]-L-phenyl-alanyl-[4-phosphono(difluoromethyl)]-L-phenylalanine amide, N-Acetyl-L-glutamyl-[4-phosphono(difluoromethyl)]-L-phenylalanyl-[4- phosphono(difluoromethyl)]-L-phenylalanine amide, L-Glutamyl-[4-phosphono(difluoromethyl)]-L-phenylalanyl-[4-phosphono(difluoromethyl)]-L-phenylalanine amide, L-Lysinyl-[4-phosphono(difluoromethyl)]-L-phenylalanyl-[4-phosphono(difluoromethyl)]-L-phenylalanine amide, L-Serinyl-[4-phosphono(difluoromethyl)]-L-phenylalanyl-[4-phosphono(difluoromethyl)]-L-phenylalanine amide, L-Prolinyl-[4-phosphono(difluoromethyl)]-L-phenylalanyl-[4-phosphono(difluoromethyl)]-L-phenylalanine amide, L-Isoleucinyl-[4-phosphono(difluoromethyl)]-L-phenylalanyl-[4-phosphono(difluoromethyl)]-L-phenylalanine amide, N-Benzoyl-[4-phosphono(difluoromethyl)]-L-phenylalanyl-[4-phosphono(difluoromethyl)]-L-phenylalanine amide, N-Acetyl-L-phenylalanyl-[4-phosphono(difluoromethyl)]-L-phenylalanyl-[4-phosphono(difluoromethyl]-L-phenylalanine amide, N-Acetyl-L-2-naphthylalanyl-[4-phosphono(difluoromethyl)]-L-phenylalanyl-[4-phosphono(difluoromethyl)]-phenylalanine amide, N-Acety-[4-phosphono(difluoromethyl)]-L-phenylalanyl-[4-phosphono(difluoromethyl)]-L-phenylalanyl-[4-phosphono(difluoromethyl)]-L-phenylalanine amide, N-Acetyl-L-aspartyl-[4-phosphono(difluoromethyl)]-L-phenylalanyl-[4-phosphono(difluoromethyl)]-L-phenylalanine amide, N-(4-Azido-3-iodo)-benzoyl-L-glutamyl-[4-phosphono(difluoromethyl)]-L-phenylalanyl-[4-phosphono(difluoromethyl)]-L-phenylalanine amide, N-Acetyl-L-tryptophyl-[4-phosphono(difluoromethyl)]-L-phenylalanyl-[4-phosphono(difluoromethyl)]-L-phenylalanine amide, N-Acetyl-L-histidyl-[4-Phosphono(difluoromethyl)]-L-phenylalanyl-[4-phosphono(difluoromethyl)]-L-phenylalanine amide, N-(2-Hydroxy-3-trifluoro-2-trifluoromethyl)propanoyl-[4-phosphono(difluoromethyl)]-L-phenylalanyl-[4-phosphono(difluoromethyl)]-L-phenylalanine amide, N-Acetyl-D-aspartyl-[4-phosphono(difluoromethyl)]-L-phenylalanyl-[4-phosphono(difluoromethyl)]-L-phenylalanine amide, N-Phthaloyl-[4-phosphono(difluoromethyl)]-L-phenylalanyl-[4-phosphono(difluoromethyl)]-L-phenylalanine amide, N-Acetyl-L-methionyl-[4-phosphono(difluoromethyl)]-L-phenylalanyl-[4-phosphono(difluoromethyl)]-L-phenylalanine amide, N-5-Methyl-3-phenyl-4-isoxazoloyl-[4-phosphono(difluoromethyl)]-methyl)]-L-phenylalanyl-[4-phosphono(difluoromethyl)]-L-phenylalanyne amide, N-Acetyl-L-glutaminyl-4-[phosphono(difluoromethyl)]-L-phenylalanyl-[4-phosphono(difluoromethyl)]-L-phenylalanyne amide, N-Acetyl-D-glutamyl-[4-phosphono(difluoromethyl)]-L-phenylalanyl-[4-phosphono(difluoromethyl)]-L-phenylalanine amide, N-Acetyl-L-threonyl-[4-phosphono(difluoromethyl)]-L-phenylalanyl-[4-phosphono(difluoromethyl)]-L-phenylalamine amide, N-Benzoyl-glycinyl-[4-phosphono(difluoromethyl)]-L-phenylalanyl-[4-phosphono(difluoromethyl)]-L-phenylalanine amide, N-Benzoyl-L-methylglutamate-[4-phosphono(diiluoromethyl)]-L-phenylalanyl-[4-phosphono(difluoromethyl)]-L-phenylalanine amide, N-Acetyl-L-arginyl-[4-phosphono(diiluoromethyl)-L-phenylalanyl-[4-phosphono(difluoromethyl)]-L-phenylalanine amide, N-Benzoyl-L-glutamyl-[4-phosphono(difluoromethyl)-L-phenylalanyl-[4-phosphono(difluoromethyl)]-L-phenylalanine, N-Benzoyl-[4-phosphono(difluoromethyl)]-D-phenylalanyl-[4-phosphono(difluoromethyl)-D-phenylalanine amide, N-Benzoyl-D-glutamyl-[4-phosphono(difluoromethyl)]-D-phenylalanyl-[4-phosphono(difluoromethyl)]-D-phenylalamine amide, N-Benzoyl-[4-phosphono(difluoromethyl)]-D-phenylalanine-[4-phosphono(difluoromethyl)]-L-phenylalanine amide, N-Benzoyl-[4-phosphono(difluoromethyl)]-L-phenylalanine-[4-phosphono(difluoromethyl)]-D-phenylalanine amide, N-Benzoyl-L-glutamyl-[4-phosphono(difluoromethyl)]-L-phenylalanine-[4-phosphono(difluoromethyl)]-D-phenylalanine amide, L-Aspartyl-[4-phosphono(difluoromethyl)]-L-phenylalanyl-[4-phosphono(difluoromethyl)]-L-phenylalannine amide, A useful ligand in the series is Bz-NEJJ-CONH$_2$, whose chemical name is: N-Benzoyl-L-glutamyl-[4-phosphono(difluoro-methyl)]-L-phenylalanyl-[4-phosphono(difluoromethyl)]-L-phenyl-alanineamide, and its tritiated form, N-(3,5-Ditritio)benzoyl-L-glutamyl-[4-phosphono(difuoromethyl)]-L-phenylalanyl-[4-phosphono-(dilfuoromethyl)]-L-phenylalanineamide.

Synthesis of both cold and hot ligands is described in the Examples.

ABBREVIATIONS AND DEFINITIONS

The following abbreviations have the indicated meanings:

| | | |
|---|---|---|
| AA | = | arachidonic acid |
| Ac | = | acetyl |
| AIBN | = | 2.2-azobisisobutyronitrile |
| Bn | = | benzyl |
| BSA | = | bovine serum albumin |
| Bz | = | benzoyl |
| CHO | = | chinese hamster ovary |
| CMC | = | 1-cyclohexyl-3-(2-morpholinoethyl) carbodiimidemetho-p-toluenesulfonate |
| DBU | = | diazabicyclo[5.4.0]undec-7-ene |
| DMAP | = | 4-(dimethylamino)pyridine |
| DMF | = | N,N-dimethylformamide |
| DMSO | = | dimethyl sulfoxide |
| Et3N | = | triethylamine |
| HBSS | = | Hanks balanced salt solution |
| HEPES | = | $N^1$-[2-Hydroxyethyl]piperazine-$N^4$-[2-ethanesulfonic acid] |
| HWB | = | human whole blood |
| KHMDS | = | potassium hexamethyldisilazane |
| LDA | = | lithium diisopropylamide |
| LPS | = | lipopolysaccharide |
| mCPBA | = | metachloro perbenzoic acid |
| MMPP | = | magnesium monoperoxyphthalate |
| Ms | = | methanesulfonyl = mesyl |
| MsO | = | methanesulfonate = mesylate |
| NBS | = | N-bromosuccinimide |
| NCS | = | N-chlorosuccinimide |
| NIS | = | N-iodosuccinimide |
| NSMD | = | non-steroidal anti-inflammatory drug |
| Oxone ® | = | potassium peroxymonosulfate |
| PCC | = | pyridinium chlorochromate |
| PDC | = | pyridinium dichromate |
| PTP | = | protein tyrosine phosphatase |
| r.t. | = | room temperature |
| rac. | = | racemic |
| Tf | = | trifluoromethanesulfonyl = triflyl |
| TFAA | = | trifluoroacetic anhydride |
| TfO | = | trifluoromethanesulfonate = triflate |
| THF | = | tetrahydrofuran |
| TLC | = | thin layer chromatography |
| Ts | = | p-toluenesulfonyl = tosyl |
| TsO | = | p-toluenesulfonate = tosylate |
| Tz | = | 1H (or 2H)-tetrazol-5-yl |

| Alkyl group abbreviations | | |
|---|---|---|
| Me | = | methyl |
| Et | = | ethyl |
| n-Pr | = | normal propyl |
| i-Pr | = | isopropyl |
| n-Bu | = | normal butyl |
| i-Bu | = | isobutyl |
| s-Bu | = | secondary butyl |
| t-Bu | = | tertiary butyl |
| c-Pr | = | cyclopropyl |
| c-Bu | = | cyclobutyl |
| c-Pen | = | cyclopentyl |
| c-Hex | = | cyclohexyl |

| Dose Abbreviations | | |
|---|---|---|
| bid | = | bis in die = twice daily |
| qid | = | quater in die = four times a day |
| tid | = | ter in die = three times a day |

For purposes of this specification alkyl means linear branched and cyclic structures, and combinations thereof, containing the indicated number of carbon atoms. Examples of alkyl groups include methyl, ethyl, propyl, isopropyl, butyl, s- and t-butyl, pentyl, hexyl, heptyl, octyl, nonyl, undecyl, dodecyl, tridecyl, tetradecyl, pentadecyl, eicosyl, 3,7-diethyl-2,2-dimethyl-4-propylnonyl, cydopropyl, cydopentyl, cycloheptyl, adamantyl, cyclododecylmethyl, 2-ethyl-1-bicyclo[4.4.0]decyl and the like.

For purposes of this specification fluoroalkyl means alkyl groups of the indicated number of carbon atoms in which one or more hydrogen is replaced by fluororine. Examples are —$CF_3$, —$CH_2CH_2F$, —$CH_2CF_3$, c-Pr-$F_5$, c-Hex-$F_{11}$ and the like.

For purposes of this specification an aromatic hydrocarbon, as in $R^1$, is intended to include, but is not limited to phenyl, biphenyl, naphthyl, anthracenyl, and phenanthrenyl.

For purposes of this specification heteroaryl, as in $R^1$, is intended to include, but is not limited to furany, diazinyl, imidazolyl, isooxazolyl, isothiazolyl, oxadiazolyl, oxazolyl, pyrazolyl, pyridyl, pyrrolyl, tetrazinyl, thiazolyl, thienyl, triazinyl, and triazolyl.

For purposes of this specification benzoheterocycle, as in $R^1$, is intended to include, but is not limited to 2H-1-benzopyran-2-one, 4H-1-benzopyran-4-one, 2(3H)benzofuranone, 3(2H)benzofuranone, 2,3-dihydrobenzofuran, 2,3-dihydrobenzothiophene and indoline.

For purposes of this specification heterocycloalkyl, as in $R^1$, is intended to include, but is not limited to azetidine, pyrrolidine, piperidine, hexahydroazepine, tetrahydrofuran, tetrahydropyran, morpholine, thiomorpholine, piperazine, 2-oxopiperidine, 4-oxopiperidine, 2-oxotetrahydropyran and 4-oxotetrahydropyran.

For purposes of this specification benzocarbocycle, as in $R^1$, is intended to include, but is not limited to indane, 1,2,3,4-tetrahydronaphthalene and benzocycloheptene.

For purposes of this specification bicyclic heteroaryl, as in $R^1$, is intended to include, but is not limited to indole, benzofuran, benzothiophene, benzimidazole, benzoxazole, benzothiazole, benzotriazole, benzothiadiazole, quinoline, isoquinoline, pyrrolopyridine, furopyridine, and thienopyridine.

L-amino acids and abbreviations:

L-Alanine
(Ala, A)

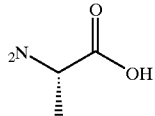

L-Arginine
(Arg, R)

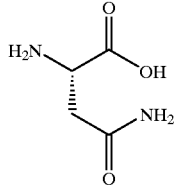

L-Asparagine
(Asn, N)

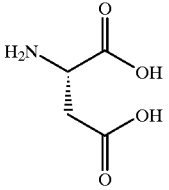

L-Aspartic acid
(Asp, D)

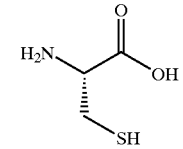

L-Cysteine
(Cys, C)

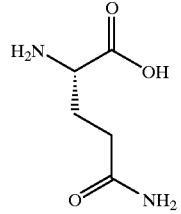

L-Glutamine
(Gln, Q)

-continued
L-Glutamic acid
(Glu, E)
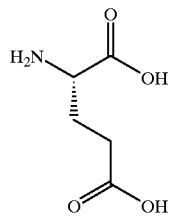
Glycine
(Gly, G)
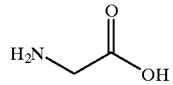
L-Histidine
(His, H)
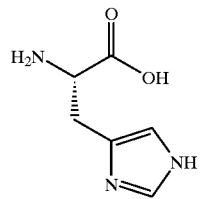
L-Isoleucine
(Ile, I)
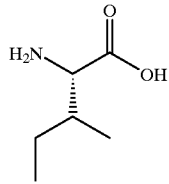
L-Leucine
(Leu, L)
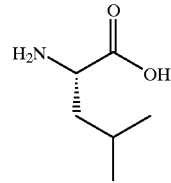
L-Lysine
(Lys, K)
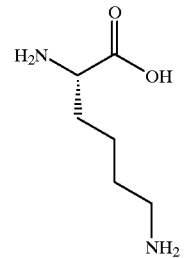
L-Methionine
(Met, M
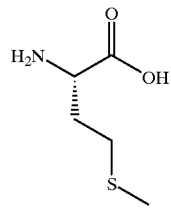
-continued
L-Phenylalanine
(Phe, F)
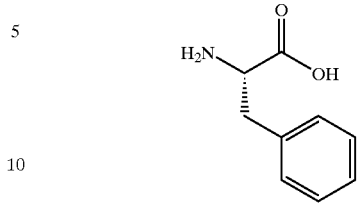
L-Proline
(Pro, P)
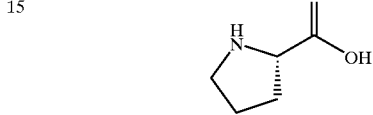
L-Serine
(Ser, S)
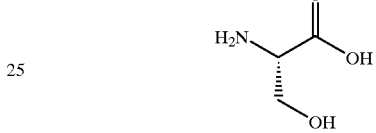
L-Threonine
(Thr, T)
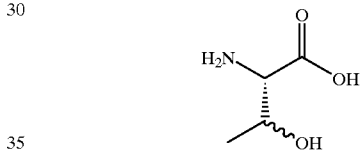
L-Tryptophane
(Trp, W)
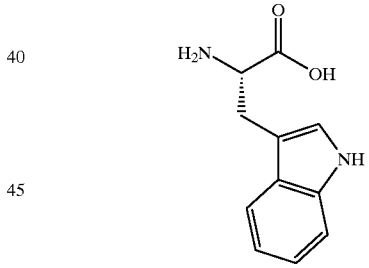
L-Tyrosine
(Tyr, Y)
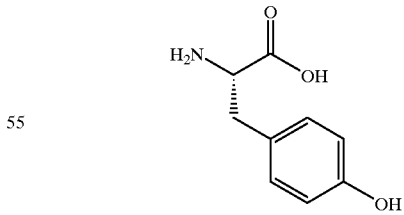
L-Valine
(Val, V)
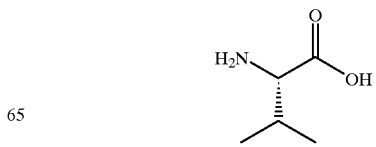

-continued

[4-phosphono(difluoromethyl)]-
L-phenylalanine
(F2Pmp, J)

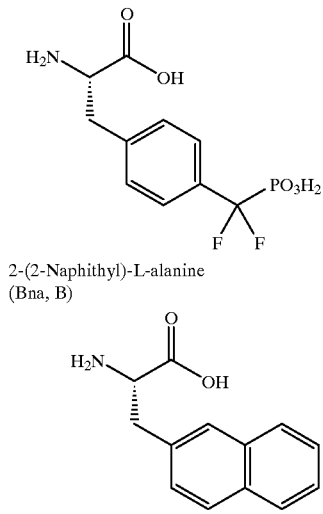

2-(2-Naphithyl)-L-alanine
(Bna, B)

The following Examples are illustrative of carrying out the invention and should not be construed as being limitations on the scope or spirit of the instant invention.

EXAMPLES

1. Preparation of PTP1B Truncate (Amino Acid Sequence from 1–320 and Fused GST-PTP1B Construct An *E. coli* culture carrying a PET plasmid expressing the fill length PTP1B protein was disclosed in J. Chernoff et al. *Proc Natl. Acad. Sci. USA*, 87, pp. 2735–2739, (1990). This was modified to a truncated PTP1B enzyme complex containing the active site with amino acids 1–320 inclusive, by the following procedure:

The full length human PTP-1B cDNA sequence (published in J. Chernoff et al., PNAS, USA, supra) cloned into a PET vector was obtained from Dr. Raymond Erickson (Harvard University). The PTP-1B cDNA sequence encoding amino acids 1–320 (Seq. ID No. 1) was amplified by PCR using the full length sequence as template. The 5' primer used for the amplification included a Bam HI site at the 5' end and the 3' primer had an Eco RI site at the 3' end. The amplified fragment was cloned into pCR2 ([Invitrogen) and sequenced to insure that no sequence errors had been introduced by Taq polymerase during the amplification. This sequence was released from pCR2 by a Bam HI/Eco RI digest and the PTP-1B cDNA fragment ligated into the GST fusion vector pGEX-2T (Pharmacia) that had been digested with the same enzymes. The GST-PTP-1B fusion protein expressed in *E. Coli* has an active protein tyrosine phosphatase activity. This same 1–320 PTP-1B sequence (Seq. ID No. 1) was then cloned into the expression vector pFLAG-2, where FLAG is the octa-peptide Asp-TyrLysAspAspAspAspLys.

This was done by releasing the PTP-1B sequence from the pGEX-2T vector by Nco I/Eco RI digest, filling in the ends of this fragment by Klenow and blunt-end ligating into the blunted Eco RI site of pFLAG2. Site-directed mutagenesis was performed on pFLAG2-PTP-1B plasmid using the Chameleon (Stratagene) double-stranded mutagenesis kit from Stratagene, to replaced the active-site Cys-215 with serine. The mutagenesis was carried out essentially as described by the manufacturer and mutants identifed by DNA sequencing. The FLAG-PTP-1B Cys215Ser mutant (Seq. ID No. 7) was expressed, purified and found not to have any phosphatase activity. The GST-PTP-1B $Cys^{215}Ser$ mutant was made using the mutated $Cys^{215}Ser$ sequence of PTP-1B already cloned into pFLAG2, as follows. The pFLAG2-PTP-1B $Cys^{215}Ser$ plasmid (Seq. ID No. 7) was digested with Sal I (3' end of PTP-1B sequence), filled in using Klenow polymerase (New England Biolabs), the enzymes were heat inactivated and the DNA redigested with Bgl II. The 500 bp 3' PTP-1B cDNA fragment which is released and contains the mutated active site was recovered. The pGEX-2T-PTP-1B plasmid was digested with Eco RI (3' end of PTP-1B sequence), filled in by Klenow, phenol/chloroform extracted and ethanol precipitated. This DNA was then digested with Bgl II, producing two DNA fragments a 500 bp 3' PTP-1B cDNA fragment that contains the active site and a 5.5 Kb fragment containing the pGEX-2T vector plus the 5' end of PTP-1B. The 5.5 Kb pGEX-2T 5' PTP-1B fragment was recovered and ligated with the 500 bp Bgl II/Sal I fragment containing the mutated active site. The ligation was transformed into bacteria (type DH5α, G) and clones containing the mutated active site sequence identified by sequencing. The GST-PTP-1B $Cys^{215}Ser$ mutant was overexpressed, purified and found not to have any phosphatase activity.

2. Preparation of Tritiated Bz-NEJJ-$CONH_2$

This compound can be prepared as outlined in Scheme 1, below, and by following the procedures:

Synthesis of N-Benzoyl-L-glutamyl-[4-phosphono
(difluoromethyl)]-L-phenylalanyl-[4-phosphono
(difluoromethyl)]-L-phenylalanineamide (BzN-EJJ-
$CONH_2$)

1.0 g of TentaGel® S RAM resin (RAPP polymer, ~0.2 mmol/g) as represented by the shaded bead in Scheme 1, was treated with piperidine (3 mL) in DMF (5 mL) for 30 min. The resin (symbolized by the circular P, containing the remainder of the organic molecule except the amino group) was washed successively with DMF (3×10 mL) and $CH_2Cl_2$ (10 mL) and air dried. A solution of DMF (5 mL), $N^\infty$-Fmoc-4-[diethylphosphono-(difluoromethyl)]-L-phenylalanine (350 mg), where Fmoc is 9-fluororenylmethoxycarbonyl, and O-(7-azabenzotriazol-1-yl)-1,1,3,3-tetramethyluranium hexafluororphosphate, (acronym being HATU, 228 mg) was treated with diisopropyl-ethylamine (0.21 mL) and, after 15 min., was added to the resin in 3 mL of DMF. After 1 h, the resin was washed successively with DMF (3×10 mL) and $CH_2Cl_2$ (10 mL) and air dried. The sequence was repeated two times, first using $N^\infty$-Fmoc-4-[diethylphosphono-(difluoromethyl)]-L-phenylalamine and then using N-Fmoc-L-glutamic acid gamma-t-butyl ester. After the final coupling, the resin bound tripeptide was treated with a mixture of piperidine (3 mL) in DMF (5 mL) for 30 min. and was then washed successively with DMF (3×10 mL) and $CH_2Cl_2$ (10 mL) and air dried.

To a solution of benzoic acid (61 mg) and HATU (190 mg) in DMF (1 mL) was added diisopropylethylamine (0.17 mL) and, after 15 min. the mixture was added to a portion of the resin prepared above (290 mg) in 1 mL DMF. After 90 min. the resin was washed successively with DMF (3×10 mL) and $CH_2Cl_2$ (10 mL) and air dried. The resin was treated with 2 mL of a mixture of TFA:water (9:1) and 0.05 mL of triisopropylsilane (TIPSI-H) for 1 h. The resin was filtered off and the filtrate was diluted with water (2 mL) and concentrated in vacuo at 35° C. The residue was treated with 2.5 mL of a mixture of TFA:DMS:TMSOTf (5:3:1) and 0.05 mL of TIPS-H, and stirred at 25° C. for 15 h. (TFA is trifluoroacetic acid, DMS is dimethyl sulfate, TMSOTf is trimethylsilyl trifluoromethanesulfonate).

The desired tripeptide, the title compound, was purified by reverse phase HPLC (C18 column, 25×100 mm) using a mobile phase gradient from 0.2% TFA in water to 50/50 acetonitrile/0.2% TFA in water over 40 min. and monitoring at 230 nm. The fraction eluting at approximately 14.3 min. was collected, concentrated and lyophylized to yield the title compound as a white foam.

Synthesis of N-(3,5-Ditritio)benzoyl-L-glutamyl-[4-phosphono(difluoromethyl)]-L-phenylalanyl-[4-phosphono(dilfuoromethyl)]-L-phenylalanineamide The above procedure described for the preparation of BzN-EJJ-CONH$_2$ was repeated, but substituting 3,5-dibromobenzoic acid for benzoic acid. After HPLC purification as before, except using a gradient over 30 min. and collecting the fraction at approximately 18.3 min., the dibromo containing tripeptide was obtained as a white foam.

A portion of this material (2 mg) was dissolved in methanol/triethylamine (0.5 mL, 4/1), 10% Pd—C (2 mg) was added, and the mixture stirred under an atmosphere of tritium gas for 24 h. The mixture was filtered through celite, washing with methanol and the filtrate was concentrated. The title compound was obtained after purification by semi-preparative HPLC using a C18 column and an isocratic mobile phase of acetonitrile/0.2% TFA in water (15:100). The fraction eluting at approximately 5 min. was collected and concentrated in vacuo. The title compound was dissolved in 10 mL of methanol/water (9:1) to provide a 0.1 mg/mL solution of specific activity 39.4 Ci/mmol.

SCHEME 1

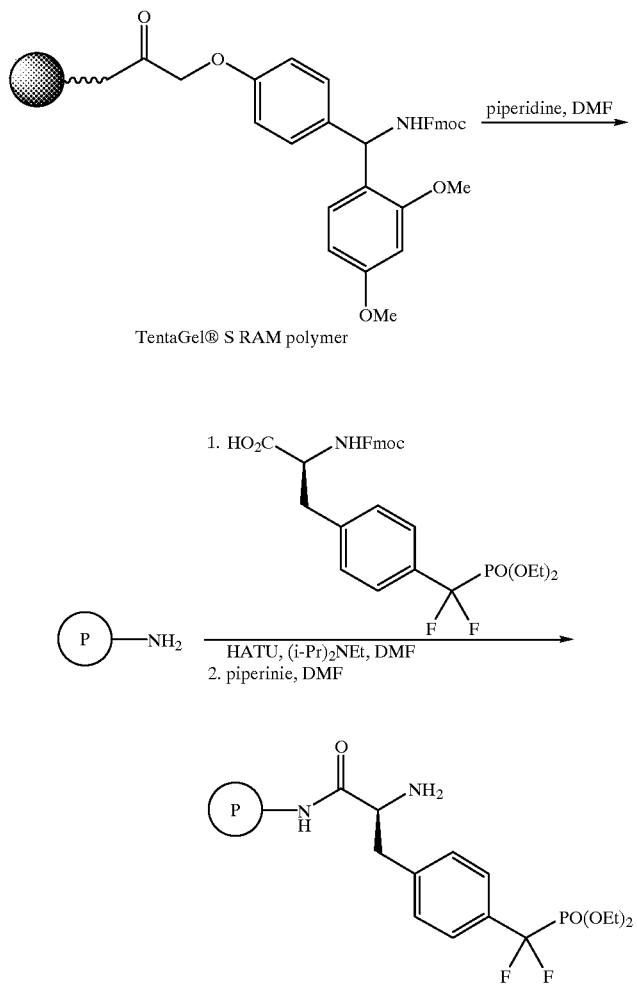

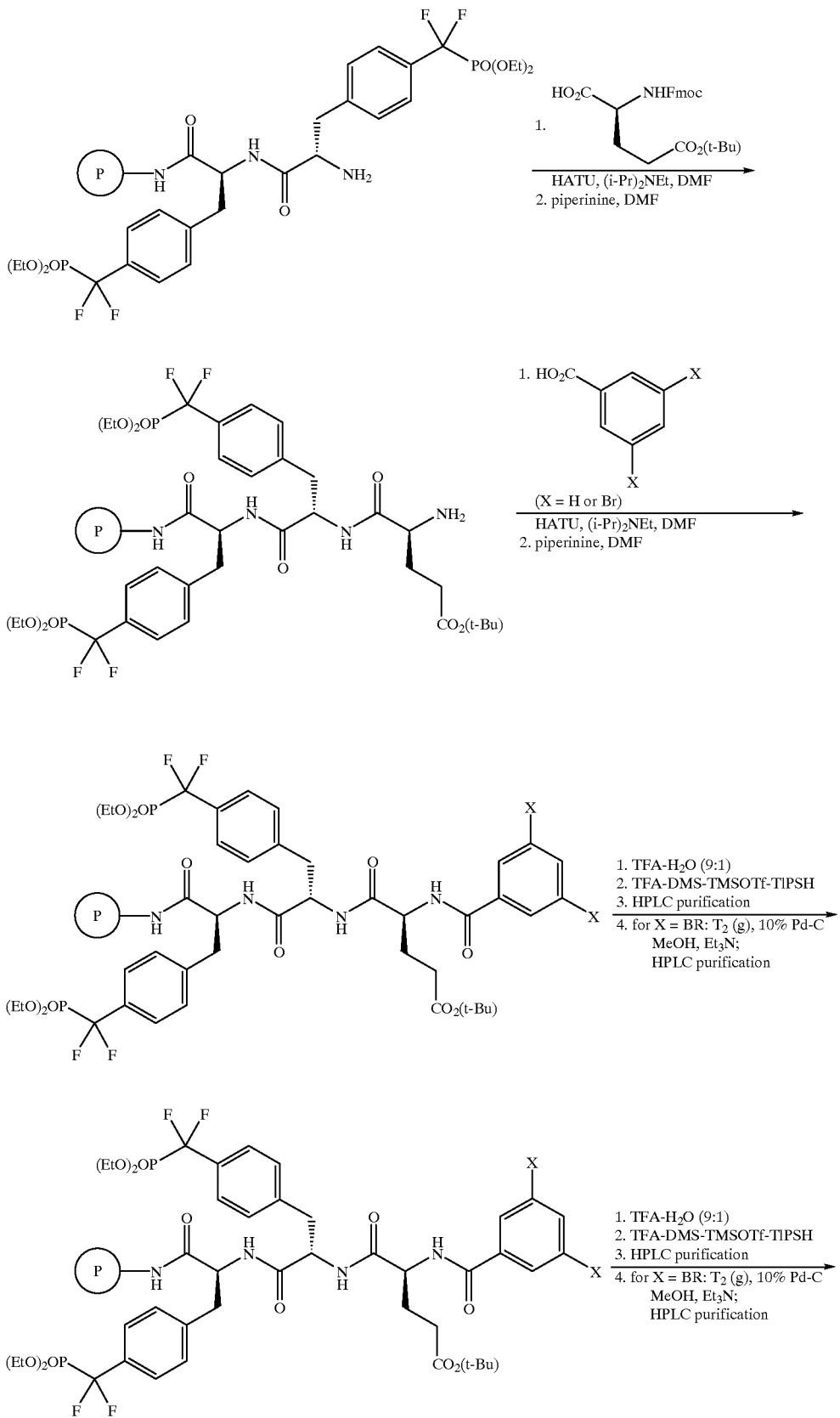

-continued
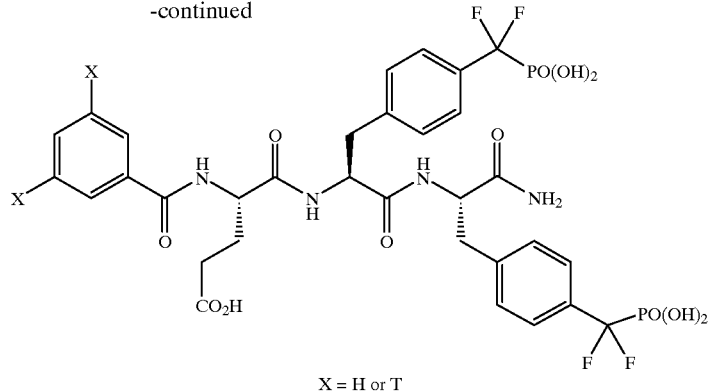
X = H or T
SCHEME 2
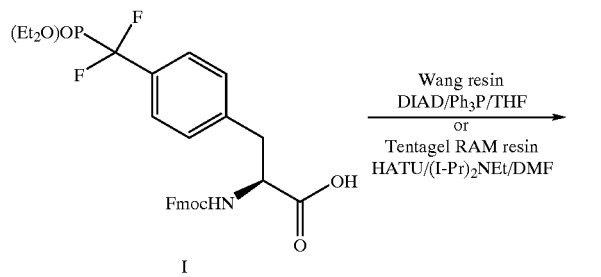
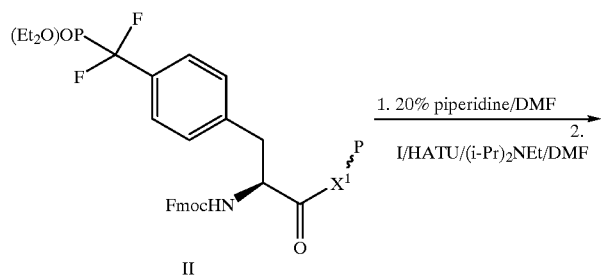
X = NH, O
P = polymer
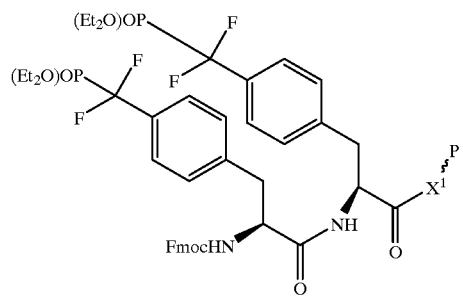
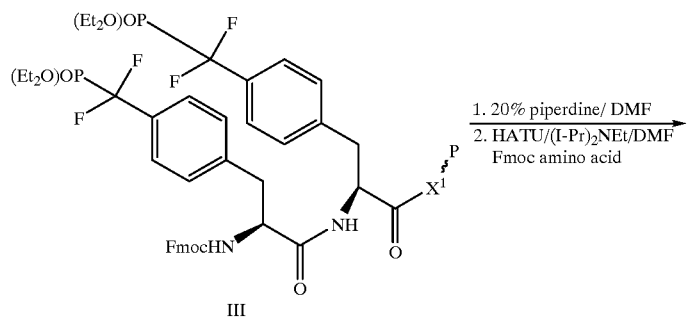

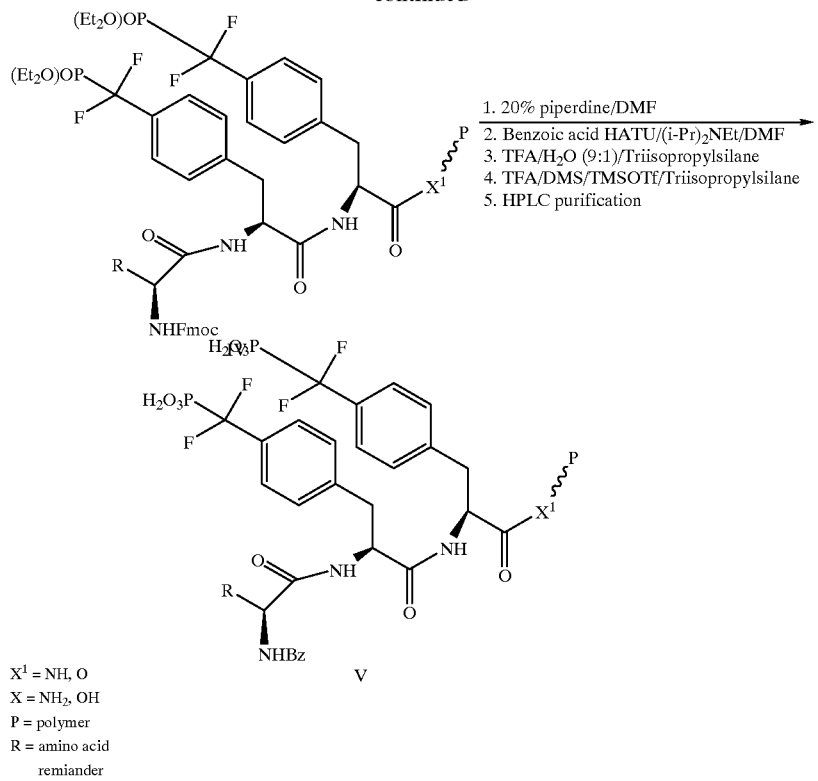
X¹ = NH, O
X = NH₂, OH
P = polymer
R = amino acid remiander
SCHEME 3
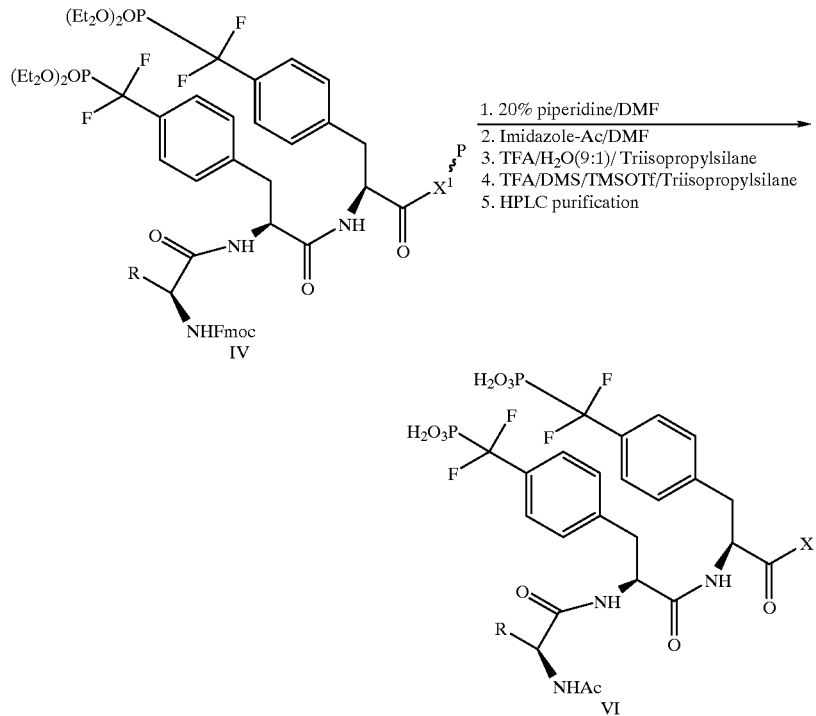
X¹ = NH, O
X = NH₂, OH
R = Amino acid remainder

SCHEME 4

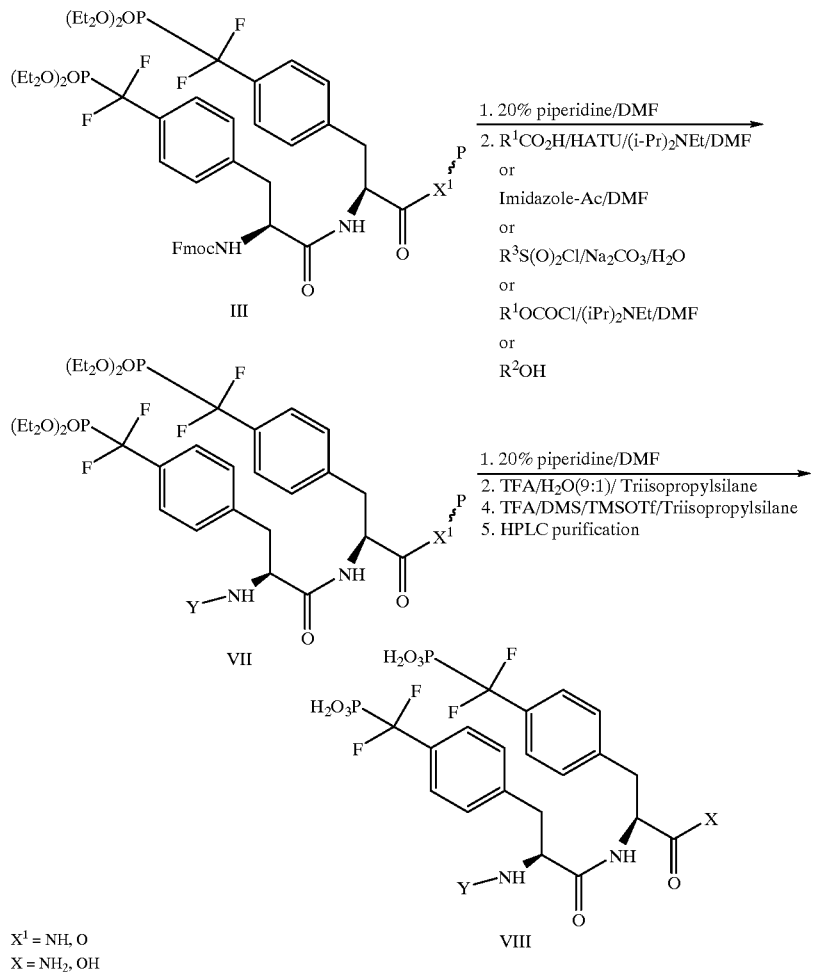

$X^1$ = NH, O
$X$ = $NH_2$, OH
$P$ = polymer

SCHEME 5

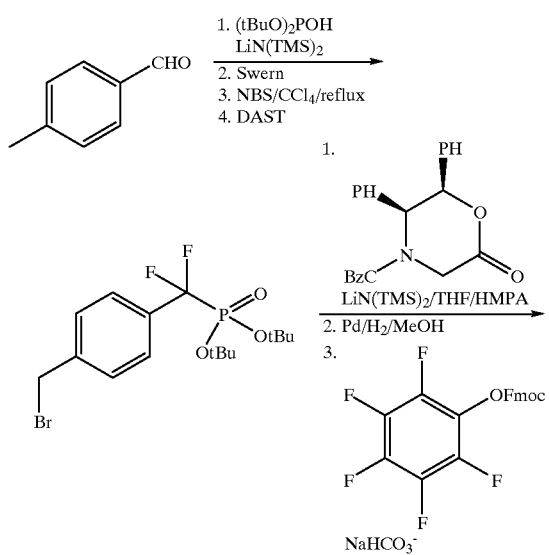

-continued

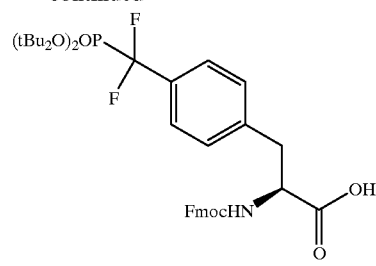

Scheme 2

N-α-Fmoc-4-[diethylphosphono-(difluoromethyl)-L-phenylalanine (see Solas, J. Org. Chem., 1996, 61, 1537) is loaded either on Wang's resin using diisopropylazodicarboxylate-triphenylphosphine in THF, or Tentagel® SRam resin using HATU—diisopropyl ethylamine in DMF. After removal of the Fmoc protecting group, the second protected amino acid is coupled with HATU, diisopropylethylamine in DMF to provide III. Using the same sequence, the third amino acid is introduced. The Fmoc protecting group is removed and the amino acid is capped with benzoic acid. After removal from solid support, ester cleavage and HPLC purification it provides V. Alternatively, the amine is not capped with benzoic acid.

Scheme 3

The tripeptide (IV) loaded on Wang or Tentagel® S RAM resin is deprotected and caped with acetyl imidazole in DMF. Then using the same sequence as reported in Method A it provides VI.

Scheme 4

The dipeptide loaded on solid support (III) is treated with piperidine in DMF and the amine capped with an acetyl, carboxyl, sulfonyl, or carbamates groups. After removal from solid support, ester cleavage and HPLC purification it provides VIII.

Scheme 5

Alternatively, the phosphonic acid tert-butyl-ester Ib (analog of I) could be prepared as described in Scheme 5 and used to prepare the compounds described in Scheme 2–4. This will allow to cleave from solid support and deprotect in a single operation using the TFA/H$_2$O/triisopropylsilane conditions.

By following the above described procedure for BzN-EJJ-CONH$_2$, the following other peptide inhibitors were also similarly prepared:

N-Benzoyl-L-glutamyl-[4-phosphono(difluoromethyl)]-L-phenyl-alanyl-[4-phosphono(difluoromethyl)]-L-phenylalanine amide, N-(3,5-Dibromo)benzoyl-L-glutamyl-[4-phosphono(difluoromethyl)]-L-phenyl-alanyl-[4-phosphono(difluoromethyl)]-L-phenylalanine amide, N-Acetyl-L-glutamyl-[4-phosphono(difluoromethyl)]-L-phenylalanyl-[4-phosphono(difluoromethyl)]-L-phenylalanine amide, L-Glutamyl-[4-phosphono(difluoromethyl)]-L-phenylalanyl-[4-phosphono(difluoromethyl)]-L-phenylalanine amide, L-Lysinyl-[4-phosphono(difluoromethyl)]-L-phenylalanyl-[4-phosphono(difluoromethyl)]-L-phenylalanine amide, L-Serinyl-[4-phosphono(difluoromethyl)]-L-phenylalanyl-[4-phosphono(difluoromethyl)]-L-phenylalanine amide, L-Prolinyl-[4-phosphono(difluoromethyl)]-L-phenylalanyl-[4-phosphono(difluoromethyl)]-L-phenylalanine amide, and L-Isoleucinyl-[4-phosphono(difluoromethyl)]-L-phenylalanyl-[4-phosphono(difluoromethyl)]-L-phenylalanine amide, N-Benzoyl-[4-phosphono(difluoromethyl)]-L-phenylalanyl-[4-phosphono(difluoromethyl)]-L-phenylalanineamide, N-Acetyl-L-phenylalanyl-[4-phosphono(difluoromethyl)]-L-phenylalanyl-[4-phosphono(difluoromethyl]-L-phenylalanine amide, N-Acetyl-L-2-naphthylalanyl-[4-phosphono(difluoromethyl)]-L-phenylalanyl-[4-phosphono(difluoromethyl)]-phenylalanine amide, N-Acetyl-[4-phosphono(difluoromethyl)]-L-phenylalanyl-[4-phosphono(difluoromethyl)]-L-phenylalanyl-[4-phosphono(difluoromethyl)]-L-phenylalanine amide, N-Acetyl-L-aspartyl-[4-phosphono(difluoromethyl)]-L-phenylalanyl-[4-phosphono(difluoromethyl)]-L-phenylalanine amide, N-(4-Azido-3-iodo)-benzoyl-L-glutamyl-[4-phosphono(difluoromethyl)]-L-phenylalanyl-[4-phosphono(difluoromethyl)]-L-phenylalanine amide, N-Acetyl-L-tryptophyl-[4-phosphono(difluoromethyl)]-L-phenylalanyl-[4-phosphono(difluoromethyl)]-L-phenylalanine amide, N-Acetyl-L-histidyl-[4-Phosphono(difluoromethyl)]-L-phenylalanyl-[4-phosphono(difluoromethyl)]-L-phenylalanine amide, N-(2-Hydroxy-3-trifluoro-2-trifluoromethyl)propanoyl-[4-phosphono(difluromethyl)]-L-phenylalanyl-[4-phosphono(difluoromethyl)]-L-phenylalanine amide, N-Acetyl-D-aspartyl-[4-phosphono(difluoromethyl)]-L-phenylalanyl-[4-phosphono(difluoromethyl)]-L-phenylalanine amide, N-Phthaloyl-[4-phosphono(difluoromethyl)]-L-phenylalanyl-[4-phosphono(difluoromethyl)]-L-phenylalanine amide, N-Acetyl-L-methionyl-[4-phosphono(difluoromethyl)]-L-phenylalanyl-[4-phosphono(difluoromethyl)]-L-phenylalanine amide, N-5-Methyl-3-phenyl-4-isoxazoloyl-[4-phosphono(difluoromethyl)]-methyl)]-L-phenylalanyl-[4-phosphono(difluoromethyl)]-L-phenylalanyne amide, N-Acetyl-L-glutaminyl-4-[phosphono(difluoromethyl)]-L-phenylalanyl-[4-phosphono(difluoromethyl)]-L-phenylalanyne amide, N-Acetyl-D-glutamyl-[4-phosphono(difluoromethyl)]-L-phenylalanyl-[4-phosphono(difluoromethyl)]-L-phenylalanine amide, N-Acetyl-L-threonyl-[4-phosphono(difluoromethyl)]-L-phenylalanyl-[4-phosphono(difluoromethyl)]-L-phenylalamine amide, N-Benzoyl-glycinyl-[4-phosphono(difluoromethyl)]-L-phenylalanyl-[4-phosphono(difluoromethyl)]-L-phenylalanine amide, N-Benzoyl-L-methylglutamate-[4-phosphono(difluoromethyl)-L-phenylalanyl-[4-phosphono(difluoromethyl)]-L-phenylalanine amide, N-Acetyl-L-arginyl-[4-phosphono(difluoromethyl)-L-phenylalanyl-[4-phosphono(difluoromethyl)]-L-phenylalanine amide, N-Benzoyl-L-glutamyl-[4-phosphono(difluoromethyl)-L-phenylalanyl-[4-phosphono(difluoromethyl)]-L-phenylalanine, N-Benzoyl-[4-phosphono(difluoromethyl)]-D-phenylalanyl-[4-phosphono(difluoromethyl)]-D-phenylalanine amide, N-Benzoyl-D-glutamyl-[4-phosphono(difluoromethyl)]-D-phenylalanyl-[4-phosphono(difluoromethyl)]-D-phenylalamine amide, N-Benzoyl-[4-phosphono(difluoromethyl)]-D-phenylalanine-[4-phosphono(difluoromethyl)]-L-phenylalanine amide, N-Benzoyl-[4-phosphono(difluoromethyl)]-L-phenylalanine-[4-phosphono(difluoromethyl)]-D-phenylalanine amide, N-Benzoyl-L-glutamyl-[4-phosphono(difluoromethyl)]-L-phenylalanine-[4-phosphono(difluoromethyl)]-D-phenylalanine amide, L-Aspartyl-[4-phosphono(difluromethyl)]-L-phenylalanyl-[4-phosphono(difluoromethyl)]-L-phenylalanine amide, 4. Phosphatase Assay Protocol Materials EDTA—ethylenediaminetetraacetic acid (Sigma)

DMH-N,N'-dimethyl-N,N'-bis(mercaptoacetyl)-hydrazine (synthesis published in *J. Org. Chem.* 56, pp. 2332–2337, (1991) by R. Singh and G. M. Whitesides and can be substituted with DTT—dithiothreitol Bistris—2,2-bis(hydroxymethyl)2,2',2"-nitrilotriethanol-(Sigma) Triton X-100—octylphenolpoly(ethylene-glycolether) 10 (Pierce)

Antibody: Anti-glutathione S-transferase rabbit (H and L) fraction (Molecular Probes)

Enzyme: Human recombinant PTPLB, containing ammo acids 1–320, (Seq. ID No. 1) fused to GST enzyme (glutathione S-transferase) purified by affinity chromatography. Wild type (Seq. ID No. 1) contains active site cysteine (215), whereas mutant (Seq. ID No. 7) contains active site serine(215).

Tritiated peptide: Bz-NEJJ-CONH$_2$, Mwt. 808, empirical formula, C$_{32}$H$_{32}$T$_2$O$_{12}$P$_2$F$_4$

| Stock Solutions | |
|---|---|
| (10X) Assay Buffer | 500 mM Bistris (Sigma), pH 6.2, MW = 209.2 |
| | 20 mM EDTA (GIBCO/BRL) |
| | Store at 40° C. |
| Prepare fresh daily: | |
| Assay Buffer (1X) (room temp.)2 mM EDTA | 50 mM Bistris |
| | 5 mM DMH (MW = 208) |
| Enzyme Dilution | |
| Buffer (keep on ice) | 50 mM Bistris |
| | 2 mM EDTA |
| | 5 mM DMH |
| | 20% Glycerol (Sigma) |
| | 0.01 mg/ml Triton X-100 (Pierce) |
| Antibody Dilution | |
| Buffer (keep on ice) | 50 mM Bistris |
| | 2 mM EDTA |

$IC_{50}$ Binding Assay Protocol

Compounds (ligands) which potentially inhibit the binding of a radioactive ligand to the specific phosphatase are screened in a 96-well plate format as follows:

To each well is added the following solutions @ 25° C. in the following chronological order:

1. 110 μl of assay buffer.
2. 10 μl. of 50 nM tritiated BzN-EJJ-CONH$_2$ in assay buffer (1X) @ 25° C.
3. 10 μl. of testing compound in DMSO at 10 different concentrations in serial dilution (final DMSO, about 5% v/v) in duplicate @ 25° C.
4. 10 μl. of 3.75 μg/ml purified human recombinant GST-PTP1B in enzyme dilution buffer.
5. The plate is shaken for 2 minutes.
6. 10 μl. of 0.3 μg/ml anti-glutathione S-transferase (anti-GST) rabbit IgG (Molecular Probes) diluted in antibody dilution buffer @ 25° C.
7. The plate is shaken for 2 minutes.
8. 50 μl. of protein A-PVT SPA beads (Amersham) @ 25° C.
9. The plate is shaken for 5 minutes. The binding signal is quantified on a Microbeta 96-well plate counter.
10. The non-specific signal is defined as the enzyme-ligand binding in the absence of anti-GST antibody.
11. 100% binding activity is defined as the enzyme-ligand binding in the presence of anti-GST antibody, but in the absence of the testing ligands with the non-specific binding subtracted.
12. Percentage of inhibition is calculated accordingly.
13. $IC_{50}$ value is approximated from the non-linear regression fit with the 4-parameter/multiple sites equation (described in: "Robust Statistics", New York, Wiley, by P. J. Huber (1981) and reported in nM units.
14. Test ligands (compounds) with larger than 90% inhibition at 10 μM are defined as actives.

The following Table I illustrates typical assay results of examples of known compounds which competitively inhibit the binding of the binding agent, BzN-EJJ-CONH2.

Examples of known compounds which competitively inhibit the binding of tripeptide (F$_2$PMP)2

Typical Assay Results
GST-PTP1B SPA Binding Assay with Non-Mutated (Cys215) and Mutated enzyme (Ser215)

| Compound | Structure | Non-Mutated | Mutated |
|---|---|---|---|
| Control: | | | |
| Tripeptide (F$_2$PMP)$_2$ | | 14 nM | 8 nM |
| DADE(F$_2$PMP)L hexapeptide (T. Burke et al. Biochem. Biophys. Res. Comm. 204, 129, (1994)) | | 400 nM | 100 nM |

-continued

Typical Assay Results
GST-PTP1B SPA Binding Assay with Non-Mutated (Cys215) and Mutated enzyme (Ser215)

| Compound | Structure | Non-Mutated | Mutated |
|---|---|---|---|
| SH-specific binding: | | | |
| Vanadate | [structure] | 2 μM | >100 μM |
| Insulin Receptor Peptide | Asp-Ile-Tyr(SO₃H)-Glu-Thr-Asp-OH [structure] | 17 μM | 70 μM |
| Potential Oxidizing agents: | | | |
| Hydrogen peroxide | $H_2O_2$ | 90% at 83 μM | 0% at 83 μM |
| Quinone | [structure] | 4 μM | >100 μM |
| Potential Alkylating agents: | | | |
| Imine | [structure] | 67% at 2 μM | 10% at 2 μM |

A typical $IC_{50}$ curve from a standard binding assay using mutant GST-PTP1B.
Tripeptide $(F_2PMP)_2$

| Conc (nM) | % INH |
|---|---|
| 250.0 | 100 |
| 125.0 | 90 |
| 62.5 | 92 |
| 31.8 | 77 |
| 15.6 | 56 |
| 7.8 | 45 |
| 3.9 | 21 |
| 2.0 | 12 |
| 1.0 | 8 |
| 0.5 | 9 |
| 250.0 | 100 |
| 125.0 | 95 |

-continued

A typical $IC_{50}$ curve from a standard binding assay using mutant GST-PTP1B.
Tripeptide $(F_2PMP)_2$

| Conc (nM) | % INH |
|---|---|
| 62.5 | 85 |
| 31.3 | 81 |
| 15.6 | 60 |
| 7.8 | 30 |
| 3.9 | 19 |
| 2.0 | 6 |
| 1.0 | 2 |
| 0.5 | −5 |

| | no antibody (− control) | antibody (+ control) | \multicolumn{10}{c}{conc. tripeptide (F₂PMP)₂ nM} |
|---|---|---|---|---|---|---|---|---|---|---|---|---|
| | | | 250 | 125 | 62.5 | 31.25 | 15.625 | 7.813 | 3.906 | 1.953 | 0.977 | 0.488 |
| dpm | 252 | 5652 | 288 | 873 | 757 | 1550 | 2775 | 3367 | 4743 | 5220 | 5454 | 5384 |
| dpm | 304 | 6380 | 273 | 588 | 1109 | 1337 | 2525 | 4165 | 4838 | 5581 | 5781 | 6211 |

% Inhibition (1 − (dpm − average no antibody)/(average antibody − average no antibody)) * 100

| | no antibody (− control) | antibody (+ control) | 250 | 125 | 62.5 | 31.25 | 15.625 | 7.813 | 3.906 | 1.953 | 0.977 | 0.488 |
|---|---|---|---|---|---|---|---|---|---|---|---|---|
| % Inh | 100 | 5 | 100 | 90 | 92 | 78 | 56 | 45 | 21 | 12 | 8 | 9 |
| % Inh | 100 | −8 | 100 | 95 | 85 | 81 | 60 | 30 | 19 | 6 | 2 | −5 |

| Enzyme Assay PTP1B | |
|---|---|
| Assay buffer | 50 mM Bis-Tris (pH = 6.3) |
| | 2 mM EDTA |
| | 5 mM N,N'-dimethyl-N,N'-bis(mercaptoacetyl) hydrazine (DMH) |
| Substrate | 10 mM fluorescein diphosphate (FDP) store at −20° C. |
| Enzyme dilution buffer | 50 mM Bis-Tris (pH = 6.3) |
| | 2 mM EDTA |
| | 5 mM DMH |
| | 20 % (v/v) glycerol |
| | 0.01% (v/v) BSA |

The assay was carried out at room temperature in 96 well plates. The reaction mixture in 180 µl contained 50 mM Bis-Tris (pH=6.3), 2 mM EDTA, 5 mM N,N'-dimethyl-N,N'bis(mercaptoacetyl)hydrazine (DMH) and 10 µm fluorrescein diphosphare (FDP). 10 µl of 10 concentrations (serial dilution) of the test compound (inhibitor) dissolved in DMSO or DMSO alone for control was added to each well and the plate was mixed for 2 min. The reaction was initiated by adding 10 µl of diluted PTP1B (50 nM in 50 mM Bis/Tris (pH=6.3), 2 mM EDTA, 5 mM DMH, 20% glycerol and 0.01% Triton X-100. The phosphatase activity was followed by monitoring the appearance of the fluorescent product fluororescein monophosphate (EMP) continuously for 15–30 min, using the Cytofluoror II plate reader (PerSeptive Biosystems Inc.) with excitation of 440 nm (slit width 20 nm) and emission at 530 nm (slit width 25 nm). All the assays were done at least in duplicate. The initial rate of FMP formation is plotted against the concentration of inhibitor and the data was fitted to 4-parameter equation and the inflection point of the fit is the $IC_{50}$.

TABLE I

| | Example | Scheme |
|---|---|---|
| [structure: tripeptide with two 4-(difluoro(phosphono)methyl)phenyl side chains; N-terminal glutamic acid with NHBz, linked via amide to central residue, linked to C-terminal amide (NH₂); PO₃H₂ and F₂ groups on both aryl-CF₂ arms] | 1 | 2 |

TABLE I-continued
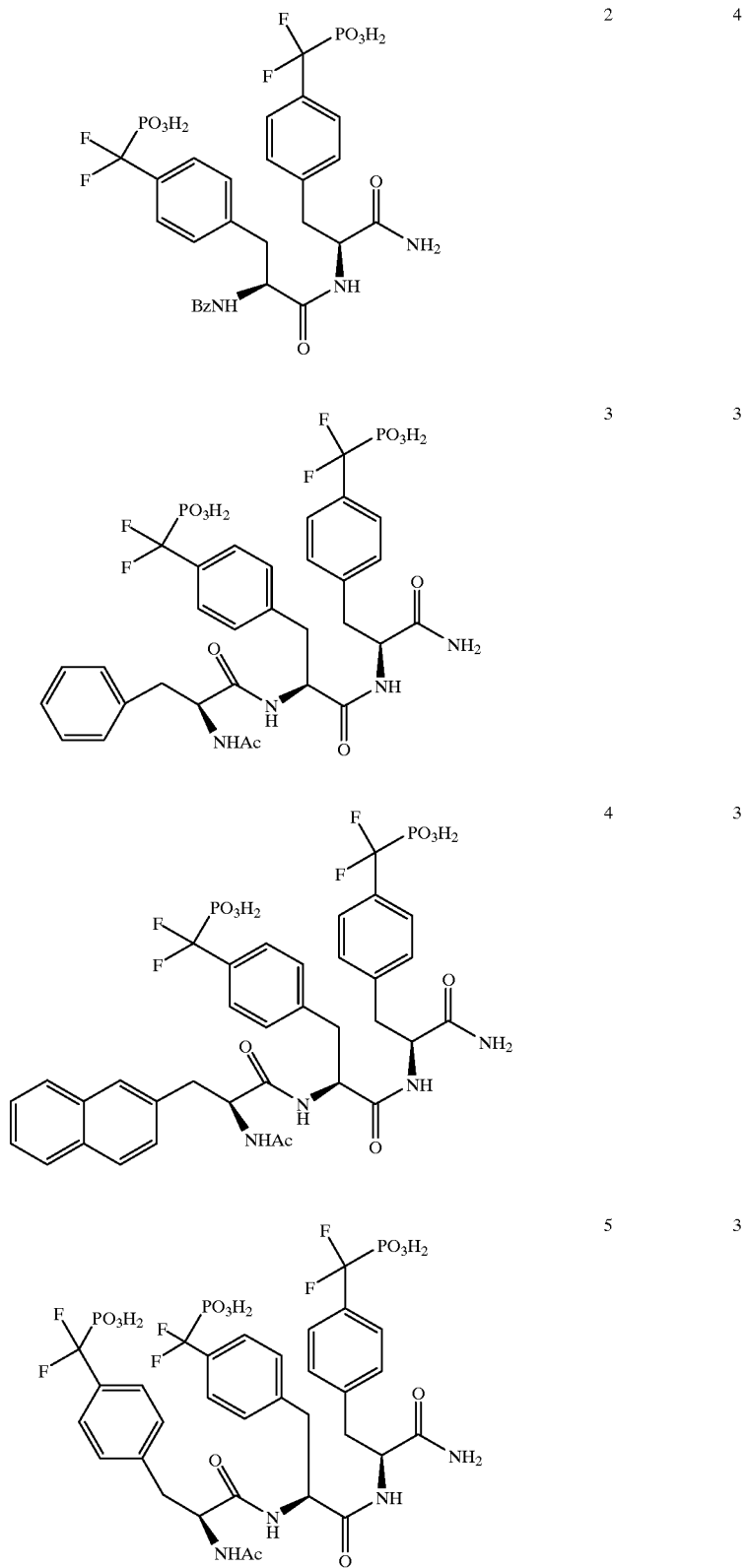

TABLE I-continued
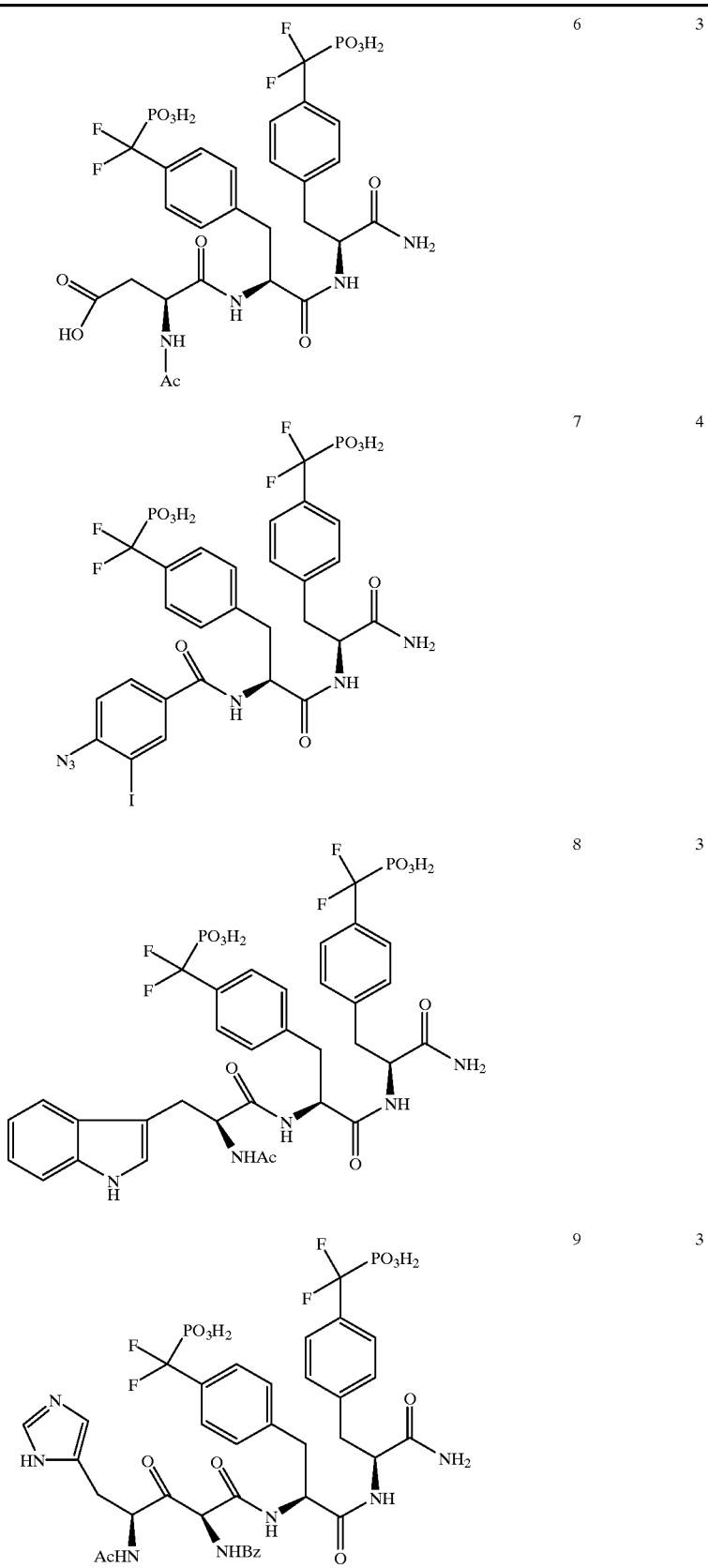

TABLE I-continued
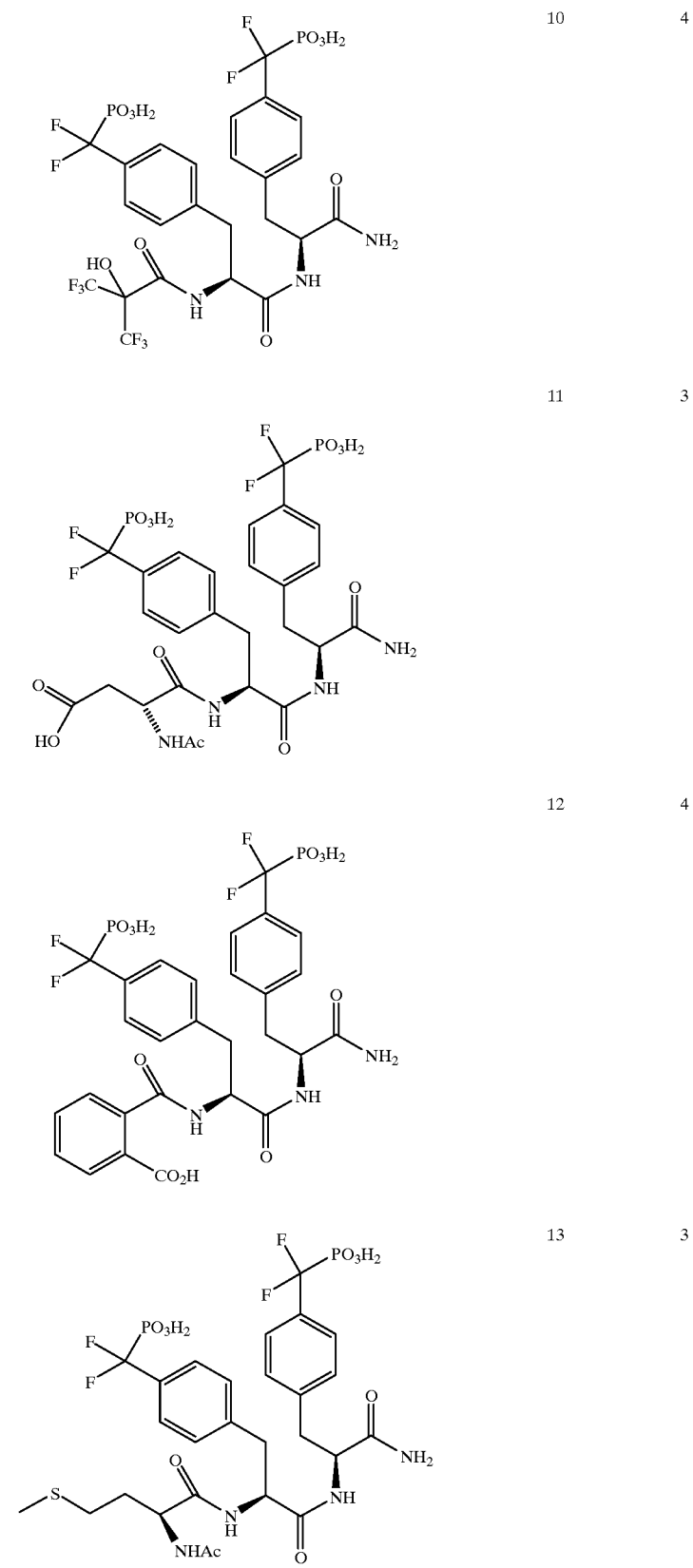

TABLE I-continued
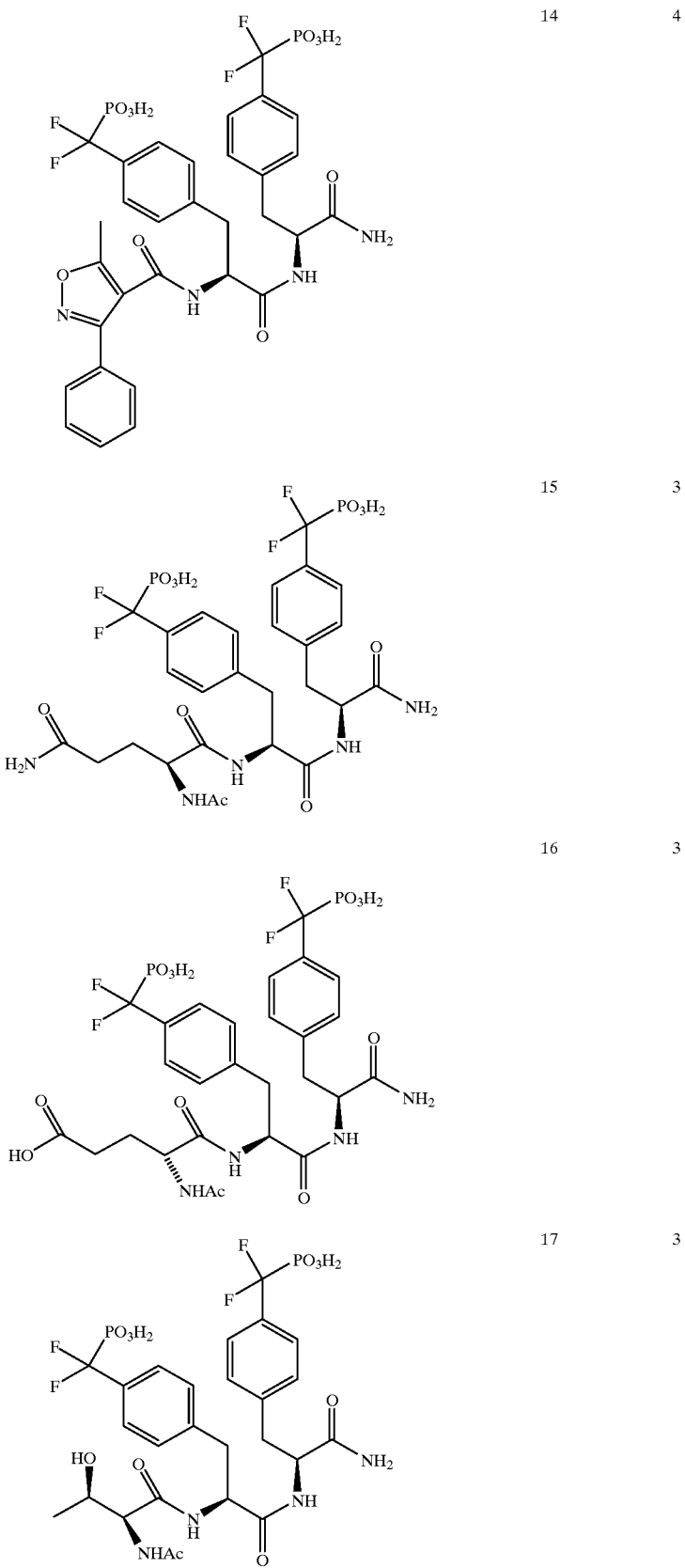

TABLE I-continued
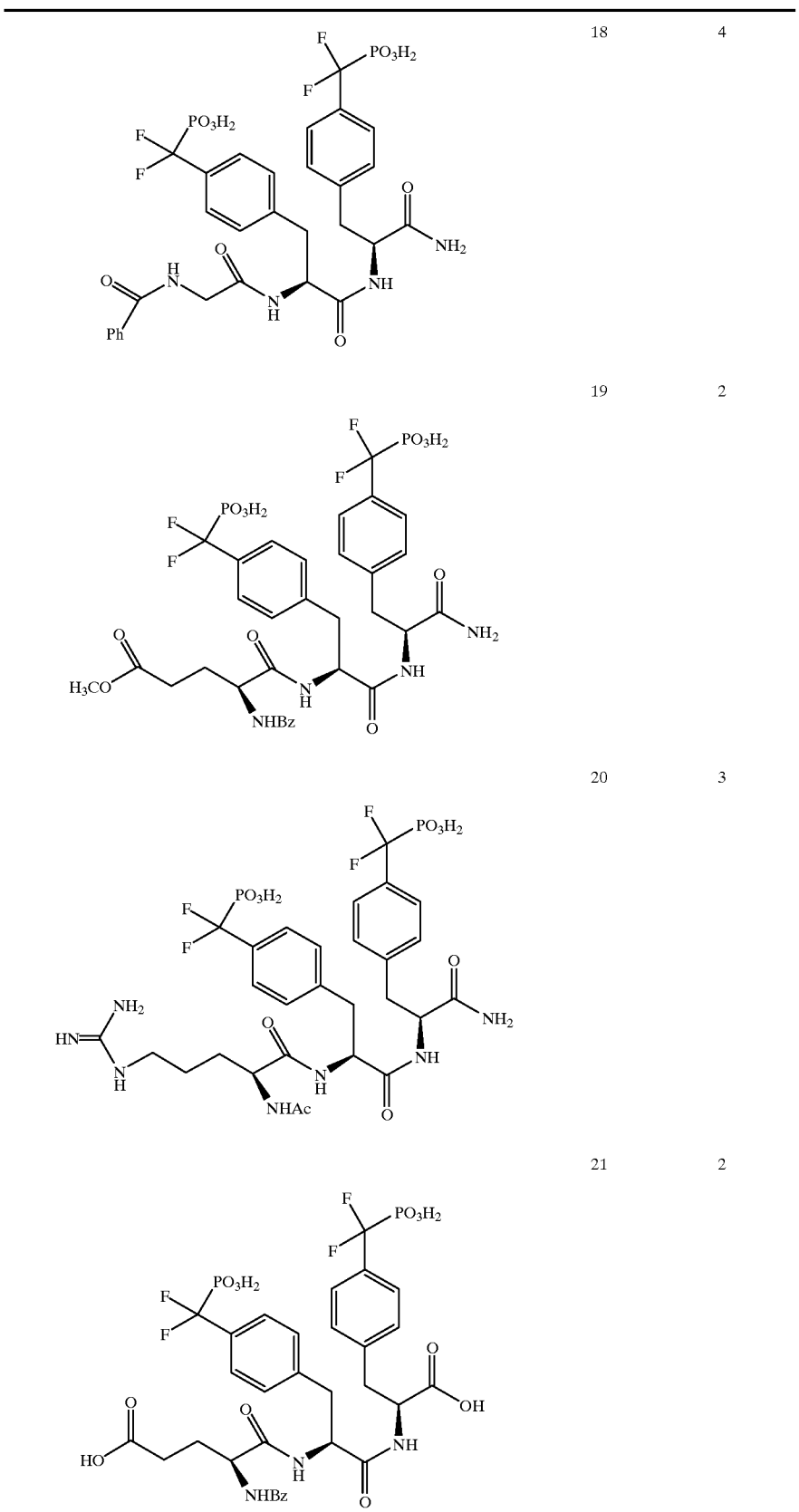
| | |
|---|---|
| 18 | 4 |
| 19 | 2 |
| 20 | 3 |
| 21 | 2 |

TABLE I-continued
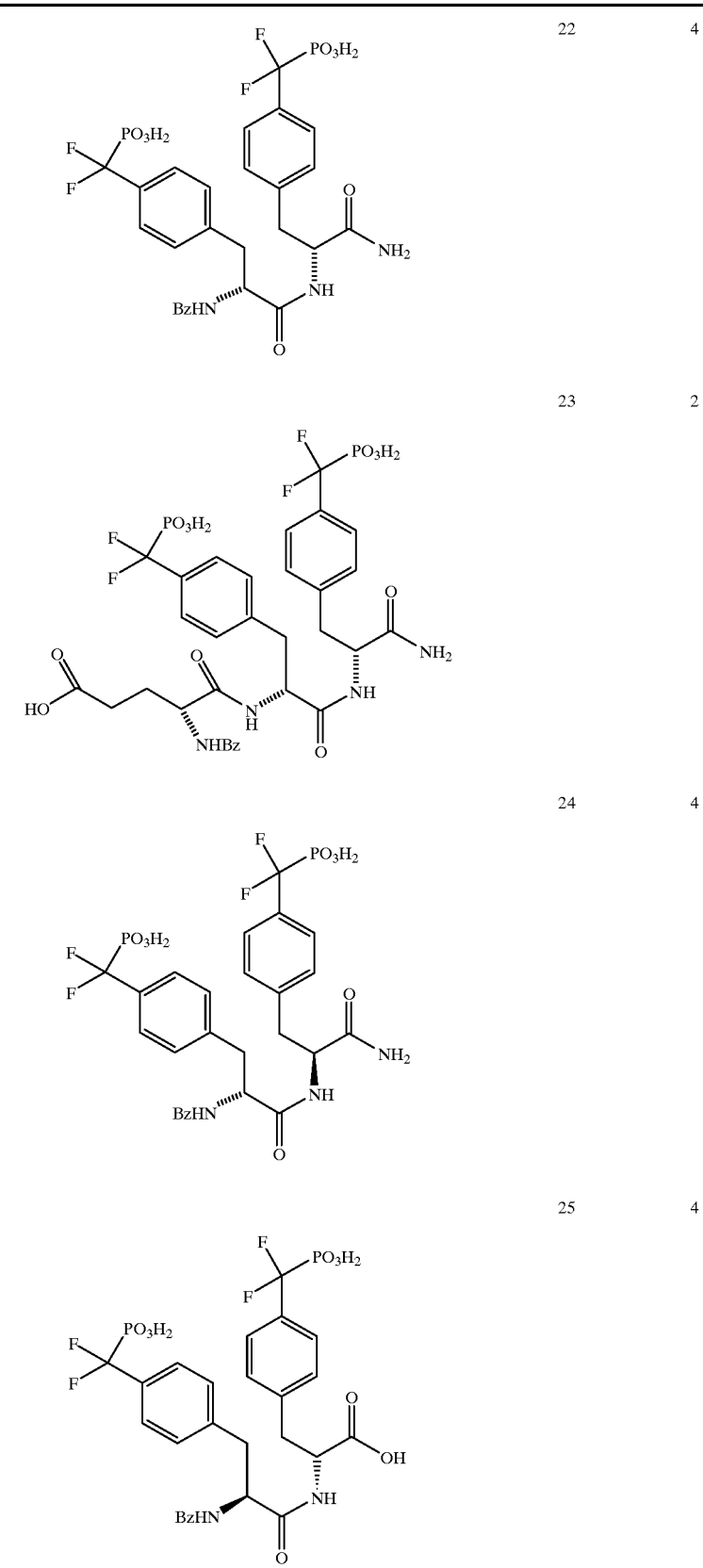
| | |
|---|---|
| 22 | 4 |
| 23 | 2 |
| 24 | 4 |
| 25 | 4 |

TABLE I-continued
| | |
|---|---|
| 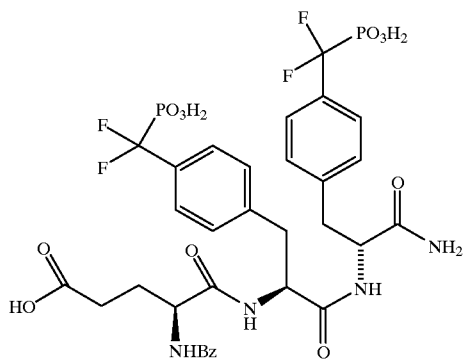 | 26  2 |
| 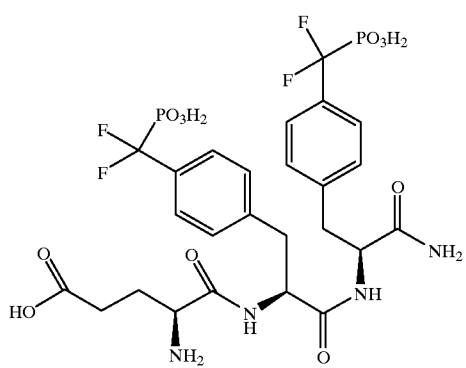 | 27  2 |
| 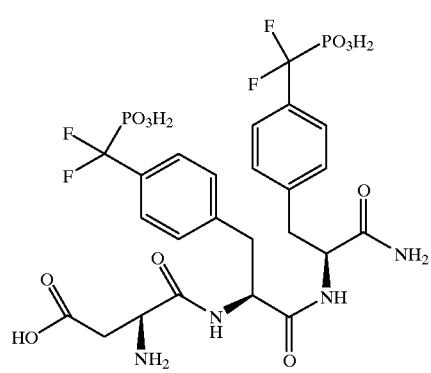 | 28  2 |
| 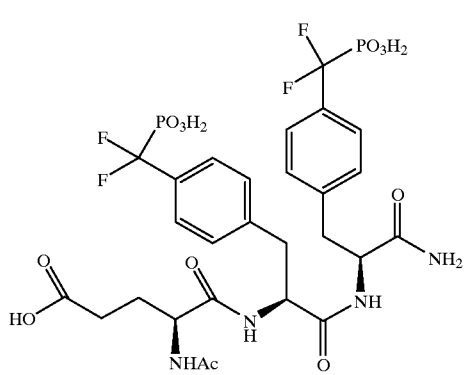 | 29  3 |

TABLE I-continued

| Structure | # | n |
|---|---|---|
| (structure 30) | 30 | 2 |
| (structure 31) | 31 | 2 |
| (structure 32) | 32 | 2 |
| (structure 33) | 33 | 2 |

TABLE I-continued
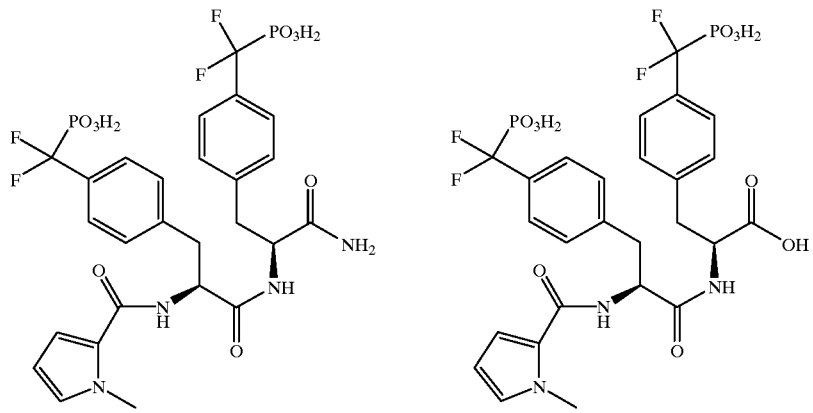
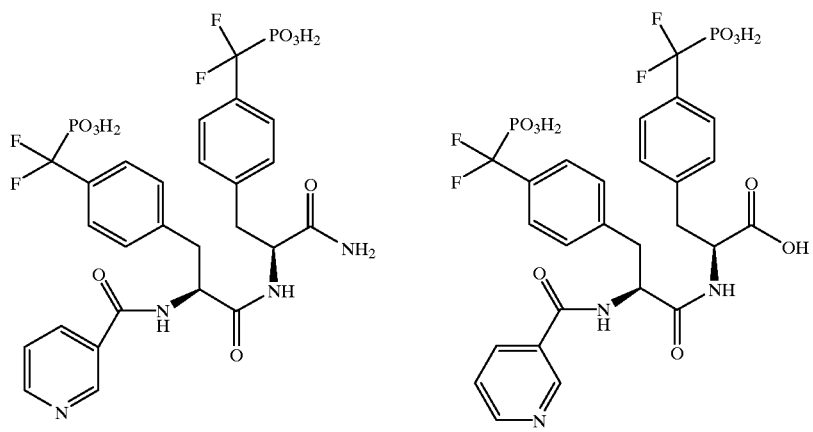
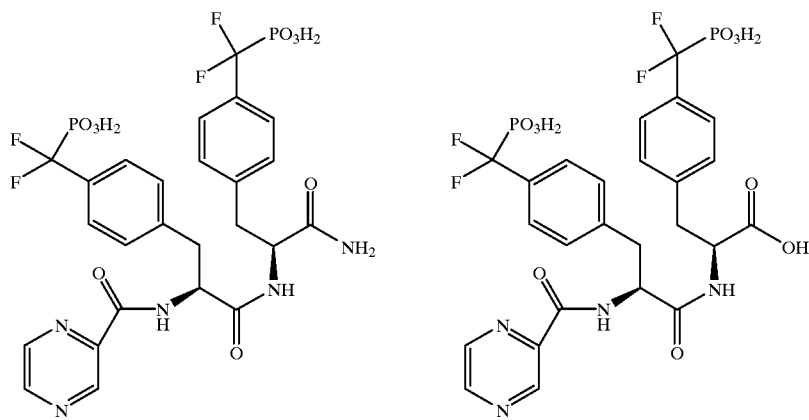

TABLE I-continued
1p; 2p
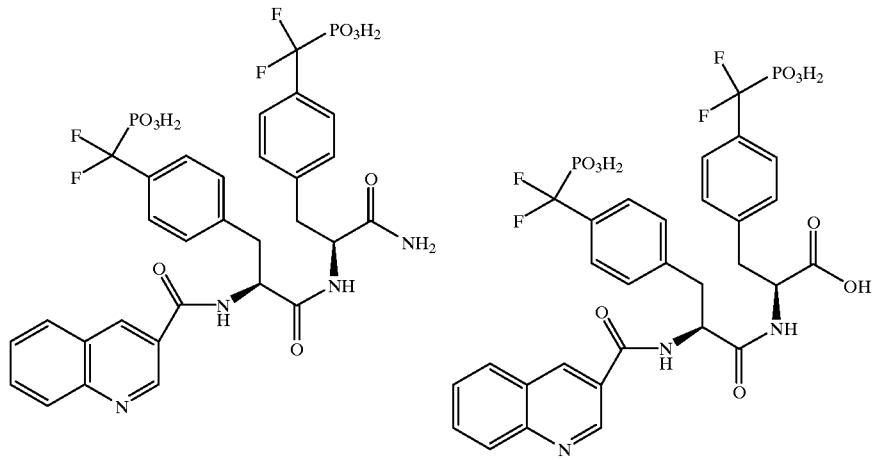
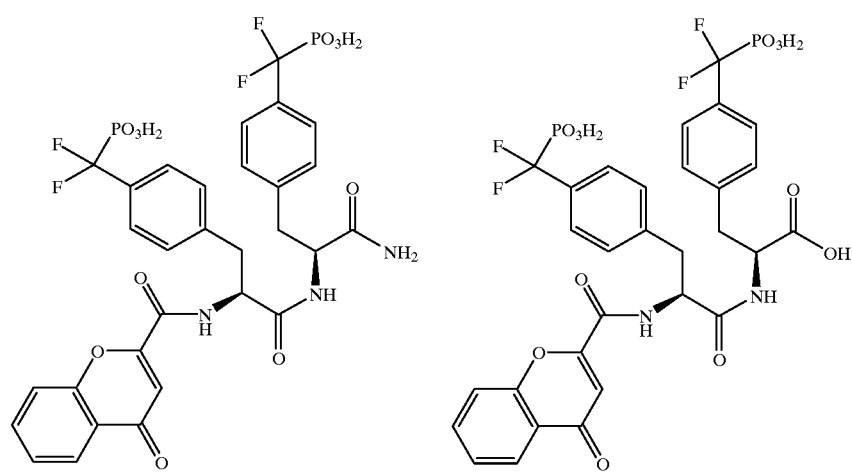
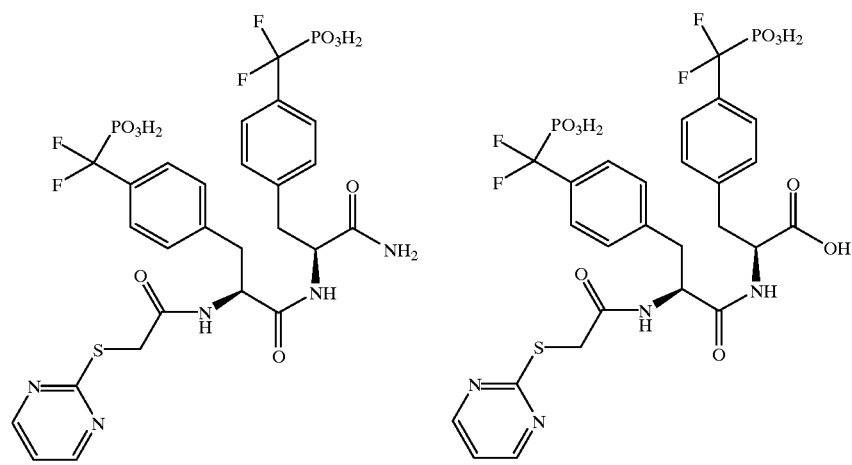

TABLE I-continued
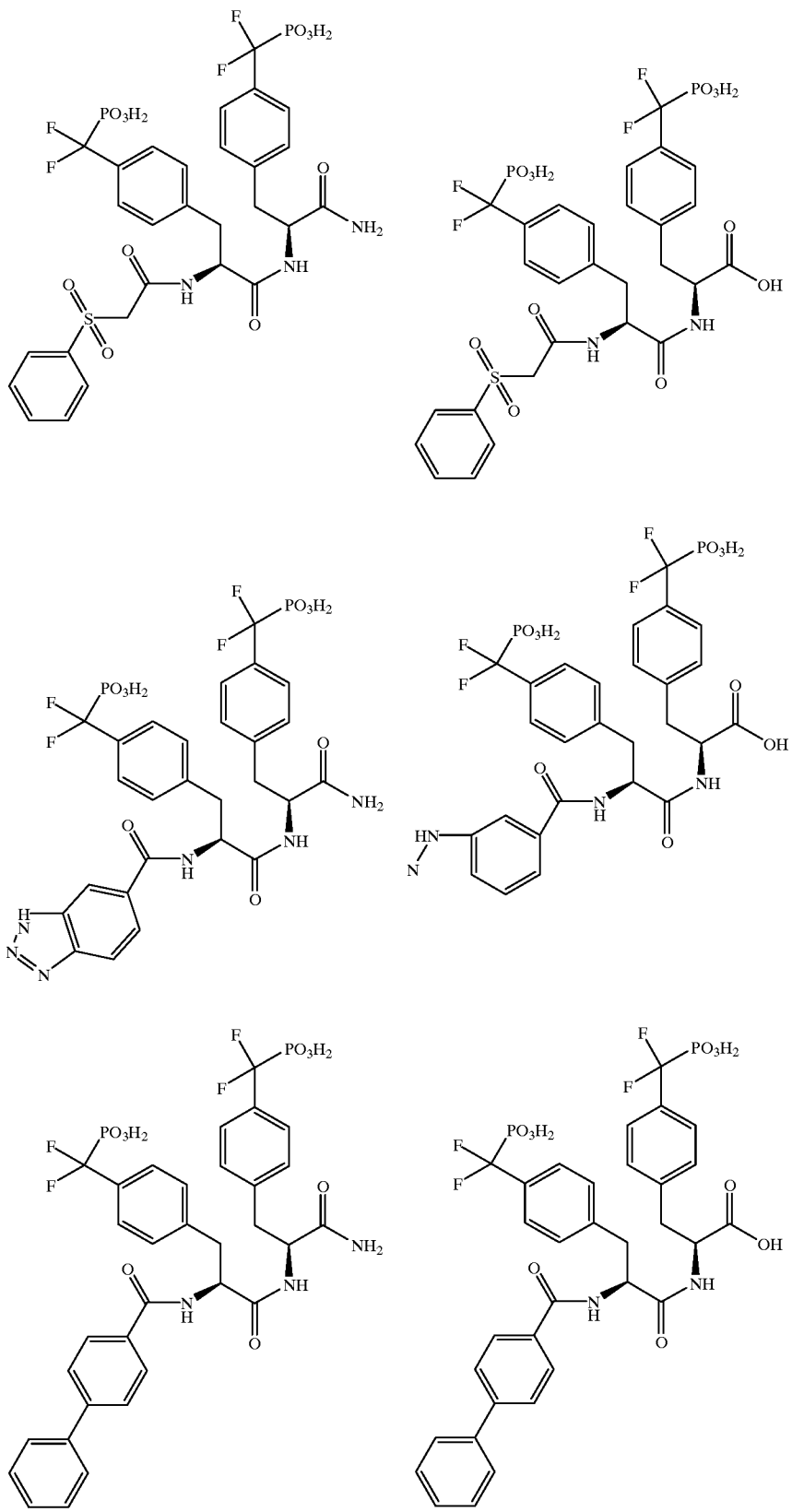

TABLE I-continued

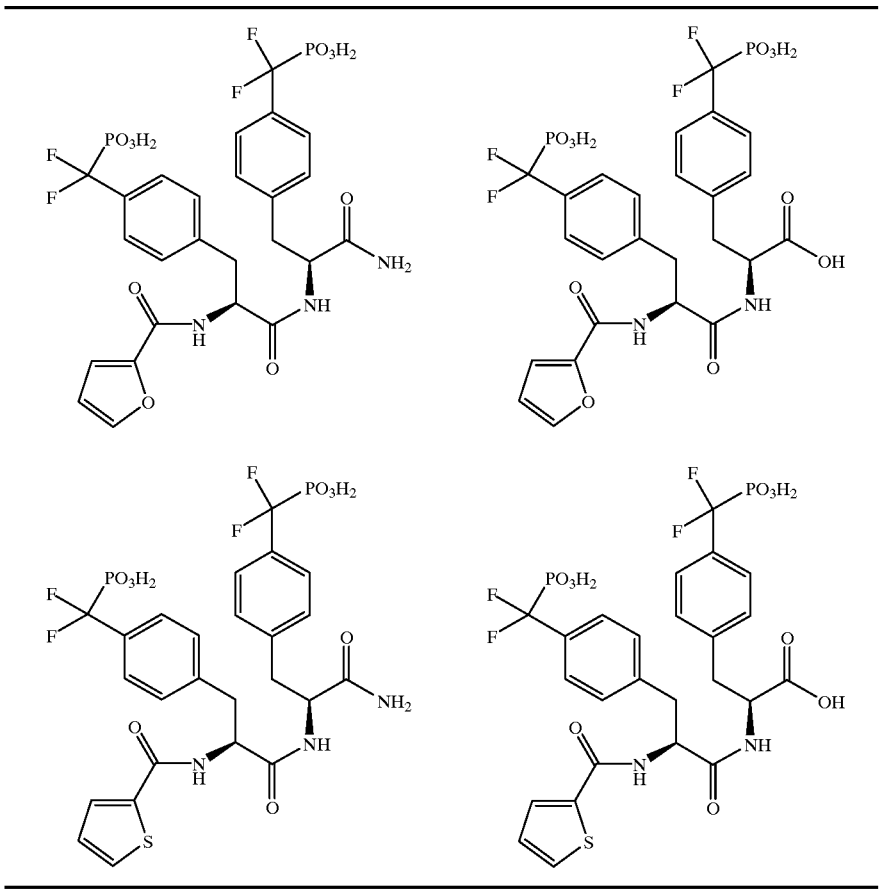

Preparation of Cathepsin K(O2) Mutant (CAT-K Mutant)

Cathepsin K is a prominent cysteine protease in human osteoclasts and is believed to play a key role in osteoclast-mediated bone resorption. Inhibitors of cathepsin K will be usefull for the treatment of bone disorders (such as osteoporosis) where excessive bone resorption occurs. Cathepsin K is synthesized as a dormant preproenzyme (Seq. ID No. 4). Both the pre-domain (Met$^1$-Ala$^{15}$) and the prodomain (Leu1$^{16}$-Arg$^{114}$) must be removed for full catalytic activity. The mature form of the protease (Ala$^{115}$-Met$^{329}$) contains the active site Cys residue (Cys$^{139}$).

The mature form of cathepsin K is engineered for expression in bacteria and other recombinant systems as a Met Ala$^{115}$-Met$^{329}$ construct by PCR-directed template modification of a clone that is identified. Epitope-tagged variants are also generated: (Met[FLAG]Ala$^{115}$-Met$^{329}$ and Met Ala$^{115}$-Met$^{329}$[FLAG]; where FLAG is the octa-peptide AspTyrLysAspAspAspAspLys). For the purpose of establishing a binding assay, several other constructs are generated including Met[FLAG]Ala$^{115}$-[Cys$^{139}$ to Ser$^{139}$]-Met$^{329}$ and Met Ala$^{115}$-[Cys$^{139}$ to Ser $^{139}$]-Met$^{329}$[FLAG] (where the active site Cys is mutated to a Ser residue), and Met [FLAG]Ala$^{115}$-[Cys$^{139}$ to Ala$^{139}$]-Met$^{329}$ and Met Ala$^{115}$-[Cys$^{139}$ to Ala$^{139}$]-Met$^{329}$[FLAG] (where the active site Cys is mutated to an Ala residue). In all cases, the resulting re-engineered polypeptides can be used in a binding assay by tethering the mutated enzymes to SPA beads via specific anti-FLAG antibodies that are commercially available (IDI-KODAK). Other epitope tags, GST and other fusions can also be used for this purpose and binding assay formats other than SPA can also be used. Ligands based on the prefered substrate for cathepsin K (e.g. Ac-P$_2$-P$_1$, Ac-P$_2$-P$_1$-aldehydes, Ac-P$_2$-P$_1$-ketones; where P1 is an amino acid with a hydrophilic side chain, preferably Arg or Lys, and P2 is an amino acid with a small hydrophobic side chain, preferably Leu, Val or Phe) are suitable in their radiolabeled (tritiated) forms for SPA-based binding assays. Similar binding assays can also be established for other cathepsin family members.

Preparation of Apopain (caspase-3) Mutant

Apopain is the active form of a cysteine protease belonging to the caspase superfamily of ICE/CED-3 like enzymes. It is derived from a catalytically dormant proenzyme that contains both the 17 kDa large subunit (p17) and 12 kDa (p12) small subunit of the catalytically active enzyme within a 32 kDa proenzyme polypeptide (p32). Apopain is a key mediator in the effector mechanism of apoptotic cell death and modulators of the activity of this enzyme, or structurally-related isoforms, will be useful for the therapeutic treatment of diseases where inappropriate apoptosis is prominent, e.g., Alzheimer's disease.

The method used for production of apopain involves folding of active enzyme from its constituent p17 and p12 subunits which are expressed separately in E. coli. The apopain p17 subunit (Ser$^{29}$-Asp$^{175}$) and p12 subunit (Ser$^{176}$-His$^{277}$) are engineered for expression as MetSer$^{29}$-Asp$^{175}$ and MetSer[176]-His[277] constructs, respectively, by PCR-directed template modification. For the purpose of establishing a binding assay, several other constructs are generated, including a MetSer[29]-[Cys[163] to Ser[163]]-Asp[175] large subunit and a Met[1]-[Cys[163] to Ser[163]]-His[277] proenzyme. In the former case, the active site Cys residue in the large subunit (p17) is replaced with a Ser residue by site-directed mutagenesis. This large subunit is then re-folded with the recombinant p12 subunit to generate the mature form of the enzyme except with the active site Cys mutated to a Ser. In the latter case, the same Cys[163] to Ser[163] mutation is made, except that the entire proenzyme is expressed. In both cases, the resulting re-engineered polypeptides can be used in a binding assay by tethering the mutated enzymes to SPA beads via specific antibodies that are generated to recognize apopain (antibodies against the prodomain, the large p17 subunit, the small p12 subunit and the entire p17:p12 active enzyme have been generated). Epitope tags or GST and other fusions could also be used for this purpose and binding assay formats other than SPA can also be used. Ligands based on the prefered substrate for apopain (varients of AspGluValAsp), such as Ac-AspGluVaLAsp, Ac-AspGluVaLAsp-aldehydes, Ac-AspGluValAsp-ketones are suitable in their radiolabeled forms for SPA-based binding assays. Similar binding assays can also be established for other caspase family members.

Example 1

N-Benzoyl-L-glutamyl-[4-phosphono (difluoromethyl)]-L-phenylalanyl-[4-phosphono (difluoromethyl)]-L-phenlalanine Amide Step 1

5.0 g of Tentagel® s RAM resin (RAPP polymer; 0.2 mmol/g) as represented by the shade bead in Scheme 1, was treated with piperidine (5 mL) in 20 mL of DMF for 30 min. The resin (symbolized by the circular P, containing the remainder of the organic molecule except the amino group) was dried with $N_2$ and washed successively with DMF (5×20 mL) and $CH_2Cl_2$ (5×20 mL). To a DMF (15.0 mL) solution of N -Fmoc-4-[diethylphosphono-(difluoromethyl)]-L-phenylalanine (see D. Solas, *J. Org. Chem.*, 1996, 61, 1537) (0.900 g) and O-(7-azabenzotriazol-1-yl)-1,1,3,3-tetramethyluronium hexafluororphosphate (HATU) (0.600 g) was added diisopropylethylamine (0.545 mL). After a period of 15 min. the mixture was added to the resin in DMF (15.0 mL). After a period of 45 min. the resin was washed with DMF (5×20 mL) and $CH_2Cl_2$ (5×20 mL). The resin was then treated with acetylimidazole (1.5 g) in DMF (15 mL). After a period of 1 h the resin was washed successively in the DMF (5×20 mL) and $CH_2Cl_2$ (5×20 mL) and dried with nitrogen. After removal of the Fmoc as described above, the same sequence was repeated a second time. The resin was then treated with piperidine (5 mL) in DMF (20 mL) for 30 min, and was then washed successively with DMF (5×20 mL) and $CH_2Cl_2$ (5×20 mL) and dried with nitrogen. To a DMF solution (15 mL) of N-Fmoc-L-glutamic acid γ-t-butyl ester (1.78 g) and HATU (1.59 g) was added diisopropylethylamine (1.46 mL). After a period of 15 min., the mixture was added to the resin in DMF (15 mL). After a period of 45 min. the resin was washed with DMF (5×20 mL) and $CH_2Cl_2$ (5×20 mL). The resin was then treated with piperidine (5 mL) in DMF (20 mL) for a period of 0.5 h, and was then washed successively with DMF (5×20 mL) and $CH_2Cl_2$ (5×20 mL) and dried with nitrogen.

N-Benzoyl-L-glutamyl-[4-phosphono (difluoromethyl)]-L-phenylalanyl-[4-phosphono (difluoromethyl)]-L-phenylalanine Amide Step 2

To a solution of benzoic acid (0.122 g) and HATU (0.380 g) in DMF (5.00 mL) was added diisopropylethylamine (0.350 mL). After a period of 15 min., the mixture was added to the resin prepared in Step 1 (1.0 g) in DMF (5.0 mL).

After a period of 90 min, the resin was washed successively with DMF (5×10 mL) and $CH_2Cl_2$ (5×10 mL) and dried with nitrogen. The resin was treated with 5 mL of a mixture of TFA: water (9:1) and 0.05 mL of triisopropylsilane for 30 min. The resin was filtered off and the filtrate was evaporated and co-distilled with water. The residue was treated with 2.5 mL of a mixture of TFA:DMS:TMSOTf (5:3:1) and 0.05 mL of triisopropylsilane and stirred at 25° C. for 15 h. The title compound was purified by reverse phase HPLC (C18 column, 40×100 m) using a mobile phase gradient from 0.5% TFA in water to 50/50 acetonitrile/0.5% TFA in water over 40 min. and monitoring at 235 nM.

$^1$H NMR (CD$_3$OD) δ 1.80 (2H, m), 2.15 (2H, t), 2.60 to 2.90 (4H, m), 4.20 to 4.35 (3H, m), 7.00 to 7.60(13H, m).

Example 2

N-Benzoyl-[4-phosphono(difluoromethyl)]-L-phenylalanyl-[4-phosphono(difluoromethyl)]-L-phenylalanine Amide Step 1

5.0 g of Tentagel® s RAM resin (RAPP polymer; 0.2 mmol/g) as represented by the shade bead in Scheme 1, was treated with piperidine (5 mL) in 20 mL of DMF for 30 min. The resin (symbolized by the circular P, containing the remainder of the organic molecule except the amino group) was dried with $N_2$ and washed successively with DMF (5×20 mL) and $CH_2Cl_2$ (5×20 mL). To a DMF (15.0 mL) solution of N -Fmoc-4-[diethylphosphono-(difluoromethyl)]-L-phenylalanine (see D. Solas, *J. Org. Chem.*, 1996, 61, 1537) (0.900 g) and O-(7-azabenzotriazol-1-yl)-1,1,3,3-tetramethyluronium hexafluororphosphate (HATU) (0.600 g) was added diisopropylethylamine (0.545 mL). After a period of 15 min. the mixture was added to the resin in DMF (15.0 ML). After a period of 45 min. the resin was washed with DMF (5×20 mL) and $CH_2Cl_2$ (5×20 mL). The resin was then treated with acetylimidazole (1.5 g) in DMF (15 mL). After a period of 1 h the resin was washed successively with DMF (5×20 mL) and $CH_2Cl_2$ (5×20 mL) and dried with nitrogen. After removal of the FMOC as described above, the same sequence was repeated a second time. The resin was then treated with piperidine (5 mL) in DMF (20 mL) for 30 min, and was then washed successively with DMF (5×20 mL) and $CH_2Cl_2$ (5×20 mL) and dried with nitrogen.

N-Benzoyl-[4-phosphono(difluoromethyl)]-L-phenylalanyl-[4-phosphono(difluoromethyl)]-L-phenylalanine Amide Step 2

To a solution of benzoic acid (0.122 g) and HATU (0.380 g) in DMF (5.00 mL) was added diisopropylethylamine (0.350 mL). After a period of 15 min., the mixture was added to the resin prepared in Step 1 (1.0 g) in DMF (5.0 mL).

After a period of 90 min, the resin was washed successively with DMF (5×10 mL) and $CH_2Cl_2$ (5×10 mL) and dried with nitrogen. The resin was treated with 5 mL of a mixture of TFA: water (9:1) and 0.05 mL of triisopropylsilane for 30 min. The resin was filtered off and the filtrate was evaporated and co-distilled with water. The residue was treated with 2.5 mL of a mixture of TFA:DMS:TMSOTf (5:3:1) and 0.05 mL of triisopropylsilane and stirred at 25° C. for 15 h. The title compound was purified by reverse phase HPLC (C18 column, 40×100 m) using a mobile phase gradient from 0.5% TFA in water to 50/50 acetonitrile/0.5% TFA in water over 40 min. and monitoring at 235 nM.

$^1$H NMR (CD$_3$OD) δ 2.91 and 3.12 (4H, m), 4.60 (1H, m), 4.80 (1H, m), 7.29 to 7.75 (13H, m).

Example 3

N-Acetyl-L-phenylalanyl-]4-phosphono (difluoromethyl)-L-phenylalanyl-[4-phosphono (difluoromethyl]-L-phenylalanine Amide Step 1

The resin (0.50 g) of Example 2 Step 1, was treated as described in Example 2 Step 2 using N-α-Fmoc-L-phenylalanine (0.162 g), HATU (0.160 g) and diisopropylethylamine (0.150 mL) in DMF (3.0 mL) for 30 min. The resin was then washed with 5×10 mL DMF and 5×10 mL CH$_2$Cl$_2$ and dried with N$_2$. The resin was then treated with a mixture of 1.0 mL of piperidine in 4.0 mL of DMF. After a period of 30 min. the resin was washed successively with DMF (5×10 mL) and CH$_2$Cl$_2$ (5×10 mL) and dried with nitrogen. To the resin was added a DMF (3.0 mL) solution of acetylimidazole (0.300 g). After a period of 1 h, the resin was washed successively with DMF (5×10 mL) and CH$_2$Cl$_2$ (5×10 mL). The resin was treated with 5.0 mL of a mixture of TFA:water (9:1) and 0.05 mL of triisopropylsilane for 30 min. The resin was filtered off and the filtrate was evaporated and co-distilled with water. The residue was treated with 2.5 mL of a mixture of TFA:DMS:TMSOTf (5:3:1) and 0.05 mL of triisopropylsilane and stirred at 25° C. for 15 h. The desired tripeptide, the title compound, was purified by reverse phase HPLC (C18 Column, 40×100 mm) using a mobile phase gradient from 0.5% TFA in water to 50/50 acetonitrile/0.5% TFA in water over 40 min. and monitoring at 235 nM.

$^1$H NMR (CD$_3$OD) δ 1.85 (3H, s), 2.80 (6H, m), 4.52 (3H, m), 7.10 to 7.60 (13H, m).

Example 4

N-Acety-L-2-naphthyalanyl-[4-phosphono (difluoromethyl)]-L-phenylalanyyl-[4-phosphono (difluoromethyl)]-phenylalanine Amide The tide compound was prepared as described in Example 3 Step 1.

$^1$H NMR (CD$_3$OD) δ 1.85 (3H, s), 2.70 to 3.20 (6H, m), 4.50 to 4.70 (3H, m), 7.15 to 7.85 (15H, m).

Example 5

N-Acetyl-[4-phosphono(difluoromethyl)]-L-phenylalanyl-[4-phosphono(difluoromethyl)]-L-phenylalanyl-[4-phosphono(difluoromethyl)]-L-phenylalanine Amide The title compound was prepared as described in Example 3 Step 1.

$^1$H NMR (CD$_3$OD) δ 1.90 (3H, s), 2.80 to 3.10 (6H, m), 4.55 (3H, m), 7.20 to 7.60 (12H, m).

Example 6

N-Acetyl-L-aspartyl-[4-phosphono (difluoromethyl)]-L-phenylalanyl-[4-phosphono (difluoromethyl)-L-phenylalanine Amide The title compound was prepared as described in Example 3 Step 1.

$^1$H NMR (CD$_3$OD) δ 1.90 (3H, s), 2.60 to 3.20 (6H, m), 4.45 to 4.70 (3H, m), 7.30 (4H, dd), 7.55 (4H, dd).

Example 7

N-(4-Azido-3-iodo)-benzoyl-L-glutamyl-[4-phosphono(difluoromethyl)]-L-phenylalanyl-[4-phosphono(difluoromethyl)]-L-phenylalanine Amide The title compound was prepared as described in Example 2.

$^1$H NMR (CD$_3$OD) δ 1.95 to 2.08 (2H, m), 2.32 to 2.39 (2H, m), 2.95 to 3.03 (2H, m), 3.05 to 3.12 (1H, m), 4.36 to 4.42 (1H, m), 4.50 to 4.57 (2H, m), 6.73 to 6.78 (1H, m), 7.20 to 7.30 (4H, m), 8.16 to 8.19 (1H, m), 9.65 (1H, s).

Example 8

N-Acetyl-L-tryptophyl-[4-phosphono (difluoromethyl)]-L-phenylalanyl-[4-phosphono (difluoromethyl)]-L-phenylalanine Amide The title compound was prepared as described in Example 3 Step 1.

$^1$H NMR (CD$_3$OD) δ 2.85 (3H, s), 2.8 to 3.2 (4H, m), 3.65 (2H, d), 4.45 (2H, m), 4.6 (1H, t), 6.95 to 7.15 (4H, m), 7.25 (2H), 7.30 (2H, d), 7.45 to 7.65 (5H, m).

Example 9

N-AcetyL-L-histidyl-[4-Phosphono (difluoromethyl)]-L-phenylalanyl-[4-phosphono (difluoromethyl)]-L-phenylalanine Amide The title compound was prepared as described in Example 3 Step 1.

$^1$H NMR (CD$_3$OD) δ 1.95 (3H, s), 2.80 to 3.20 (6H, m), 4.50 to 4.70 (3H, m), 7.05 (1H, s), 7.20 and 7.55 (8H, m), 8.60 (1H, s).

Example 10

N-(2-Hydroxy-3-trifluoro-2-trifluoromethylpropanyl-[4-phosphono (difluoromethyl)]-L-phenylalanyl-[4-phosphono (difluoromethyl)]-L-phenylalanine Amide The title compound was prepared as described in Example 2.

$^1$H NMR (CD$_3$OD) δ 2.80 to 3.10 (4H, m), 4.48 (1H, m), 4.70 (1H, m), 7.20 (4H, m), 7.50 (4H, m).

Example 11

N-Acetyl-D-aspartyl-[4-phosphono (difluoromethyl)]-L-phenylalanyl-[4-phosphono (difluoromethyl)]-L-phenylalanine Amide The title compound was prepared as described in Example 3 Step 1.

$^1$H NMR (CD$_3$OD) δ 1.95 (3H, s), 2.60 to 3.20 (6H, m), 4.60 (3H, m), 7.20 to 7.60 (8H, m).

Example 12

N-Phthaloyl-[4-phosphono(difluoromethyl)]-L-phenylalanyl-[4-phosphono(difluoromethyl)]-L-phenylalanine Amide The title compound was prepared as described in Example 2.

$^1$H NMR (CD$_3$OD) δ 2.70 to 3.20 (4H, m), 4.60 to 4.75 (2H, m), 7.00 (1H, dd), 7.30 (4H, dd), 7.55 (6H, m), 8.05 (1H, dd).

Example 13

N-Acetyl-L-methionyl-[4-phosphono(difluoromethyl)]-L-phenylalanyl-[4-phosphono(difluoromethyl)]-L-phenylalanine Amide The title compound was prepared as described in Example 3 Step 1.

$^1$H NMR (CD$_3$OD) δ 1.85 (2H, m), 1.95 (3H, s), 2.05 (3H, s), 2.45(2H, t), 2.9–3.15 (4H, m), 4.35(1H, m), 4.55 (2H, m), 7.25 (4H, m), 7.52 (4H, m).

Example 14

N-5-Methyl-3-phenyl-4-isoxazoloyl-[4-phosphono(difluoromethyl)]-methyl)]-L-phenylalanyl-[4-phosphono(difluoromethyl)-L-phenylalanine Amide The title compound was prepared as described in Example 2.

$^1$H NMR (CD$_3$OD) δ 2.35 (3H, s), 2.90 to 3.20 (4H, m), 4.55 to 4.80(2H, m), 7.20 to 7.55 (13H, m).

Example 15

N-Acetyl-L-glutaminyl-4-[phosphono(difluoromethyl)]-L-phenylalanyl-[4-phosphono(difluoromethyl)]-L-phenylalanine Amide The title compound was prepared as described in Example 3 Step 1.

$^1$H NMR (CD$_3$OD) δ 1.85 (2H, m), 1.90 (3H, s), 2.20 (2H, m), 2.90 to 3.20 (4H, m), 4.20 (1H, m), 4.55 (2H, m), 4.80 (1H, m), 7.20 to 7.55 (8H, m).

Example 16

N-Acetyl-D-glutamyl-[4-phosphono(difluoromethyl)]-L-phenylalanyl-[4-phosphono(difluoromethyl)]-L-phenylalanine Amide The title compound was prepared as described in Example 3 Step 1.

$^1$H NMR (CD$_3$OD) δ 1.90 (2H, m), 1.95 (3H, s), 2.20 (2H, t), 2.80 to 3.00 (4H, m), 4.50 (3H, m), 7.20 to 7.55 (8H, m).

Example 17

N-Acetyl-L-threonyl-[4-phosphono(difluoromethyl)]-L-phenylalanyl-[4-phosphono(difluoromethyl)]-L-phenylalamine Amide The title compound was prepared as described in Example 3 Step 1.

$^1$H NMR (CD$_3$OD) δ 1.07 (3H, d), 2.00 (3H, s), 2.81–3.11 (5H, m), 4.02(1H, m), 4.23 (1lH, d), 4.58 (2H, m), 7.27 (4H, m), 7.51 (4H, m).

Example 18

N-Benzoyl-glycinyl-[4-phosphono(difluoromethyl)]-L-]phenylalanyl-[4-phosphono(difluoromethyl)]-L-phenylalanine Amide The title compound was prepared as described in Example 2.

$^1$H NMR (CD$_3$OD) δ 2.80 to 3.20 (4H, m), 3.90 (2H, m), 4.55 (2H, m), 7.20 to 7.90 (13H, m).

Example 19

N-Benzoyl-L-γ-methylglutamate-]4-phosphono(difluoromethyl)-L-phenylalanyl-]4-phosphono(difluoromethyl)]-L-phenylalanine Amide The title compound was isolated from standing the free acid of Example 1 in MeOH.

$^1$H NMR (CD$_3$OD) δ 2.08 (2H, m), 2.40 (2H, m), 2.88–3.15 (4H, m), 3.65 (3H, s), 4.52 (1H, q), 4.55 (2H, q), 7.28 (4H, t), 7.42–7.58 (7H, m), 7.85 (2H, d).

Example 20

N-Acetyl-L-arginyl-[4-phosphono(difluoromethyl)-L-phenylalanyl-]4-phosphono(difluoromethyl)]-L-phenylalanine Amide The title compound was prepared as described in Example 3 Step 1.

$^1$H NMR (CD$_3$OD) δ 2.10 (3H, s), 2.15 (1H, q), 2.35 (4H, t), 2.50 (1H, m), 3.0 to 3.2 (4H, m), 3.76 (2H, t), 6.72 (2H, d), 6.95 (2H, d), 7.12 (2H, d), 7.30 (2H, d).

Example 21

N-Benzoyl-L-glutamyl-[4-phosphono(difluoromethyl)-L-phenylalanyl-[4-phosphono(difluoromethyl)]-L-phenylalanine To Wang resin (140 mg) in THF (2.5 mL) were added N-α-Fmoc-4-[diethylphosphono-(difluoromethyl)]-L-phenylalanine (0.200 g), diisopropyl azodicarboxylate (0.082 g). To the previous mixture at 0° C., was added a solution of triphenyl phosphine (0.109 g) in CH$_2$Cl$_2$ (2.5 mL). After a period of 10 h at room temperature the resin was washed with DMF (5×10 mL) and CH$_2$Cl$_2$ (5×10 mL). The resin was treated with piperidine (2 mL) in 8 mL of DMF for 30 min. The resin was dried with N$_2$ and washed successively with DMF (5×10 mL) and CH$_2$Cl$_2$ (5×10 mL). To a DMF (3.0 mL) solution of N-α-Fmoc-4-[diethylphosphono-(difluoromethyl)]-L-phenylalanine (0.200 g) and HATU (0.132 g) was added diisopropylethylamine (0.121 mL). After a period of 15 min, the mixture was added to the resin in DMF (3.0 mL). After a period of 0.5 h, the resin was dried with N$_2$ and washed successively DMF (5×10 mL) and CH$_2$Cl$_2$ (5×10 mL). The same sequence was repeated with N-α-Fmoc-L-glutamic acid γ-t-butyl ester and benzoic acid to give the title compound after cleavage from solid support and deprotection as described in Example 1.

$^1$H NMR (CD$_3$OD) δ 2.00 (2H, m), 2.40 (2H, t), 2.92 to 3.20 (4H, m), 4.50 to 4.80 (3H, m), 7.30 to 7.90(13H, m).

Example 22

N-Benzoyl-[4-phosphono(difluoromethyl)]-D-phenylalanyl-[4-phosphono(difluoromethyl)]-D-phenylalanine Amide The title compound was prepared as described in Example 2 using N-α-Fmoc-4-[diethylphosphono-(difluoromethyl)]-D-phenylalanine.

$^1$H NMR (CD$_3$OD) δ 2.91 and 3.12 (4H, m), 4.60 (1H, m), 4.80 (lH, m), 7.29 to 7.75 (13H, m).

Example 23

N-Benzoyl-D-glutamyl-[4-phosphono(diflluloromethyl)]-D-phenylalanyl-[4-phosphono(difluoromethyl)]-D-phenylalamine Amide The title compound was prepared as described in Example 1.

$^1$H NMR (CD$_3$OD) δ 1.80 (2H, m), 2.15 (2H, t), 2.60 to 2.90 (4H, m), 4.20 to 4.35 (3H, m), 7.00 to 7.60 (13H, m).

Example 24

N-Benzoyl-[4-phosphono(difluoromethyl)]-D-phenylalanine-[4-phosphono(difluoromethyl)]-L-phenylalanine Amide The title compound was prepared as described in Example 2.

$^1$H NMR (CD$_3$OD) δ 2.85 to 3.00 (4H, m), 4.60 to 4.80 (2H, m), 7.20 to 7.75 (13H, m).

Example 25

N-Benzoyl-[4-phosphono(difluoromethyl)]-L-phenylalanine-[4-phosphono(difluoromethyl)]-D-phenylalanine Amide The title compound was prepared as described in Example 2.

Example 26

N-Benzoyl-L-glutamyl-[4-phosphono(difluoromethyl)]-L-phenyalanine-[4-phosphono(difluoromethyl)]-D-phenylalanine Amide The title compound was prepared as described in Example 1.

Example 27

L-Glutamyl-[4-phosphono(difluoromethyl)]-L-phenylalanine-[4-phosphono(difluoromethyl)]-L-phenylalanine Amide The title compound was prepared as described in Example 1 except there is no capping with benzoic acid.

M/z 699 (M−1).

Example 28

L-Aspartyl-[4-phosphono(difluromethyl)]-L-phenylalanyl-[4-phosphono(difluoromethyl)]-L-phenylalanine Amide The title compound was prepared as described in Example 3 except there was no capping with acetyl imidazole.

M/z 685 (M−1).

Example 29

N-Acetyl-L-glutamyl-[4-phosphono(difluoromethyl)]-L-phenylalanyl-[4-phosphono(difluoromethyl)-L-phenylalanine Amide The title compound was prepared as described in Example 3 Step 1.

M/z 743 (M+1).

Example 30

L-Lysinyl-[4-phosphono(difluoromethyl)]-L-phenylalanyl-[4-phosphono(difluoromethyl)]-L-phenylalanine Amide The title compound was prepared as described in Example 3 except there was no capping with acetyl imidazole.

M/z 700 (M+1).

Example 31

L-Serinyl-[4-phosphono(difluoromethyl)]-L-phenylalanine-[4-phosphono(difluoromethyl)]-L-phenylalanine Amide The title compound was prepared as described in Example 3 except there was no capping with acetyl imidazole.

M/z 659 (M+1).

Example 32

L-Prolinyl-[4-phosphono(difluoromethyl)]-L-phenylalanine-[4-phosphono(difluoromethyl)]-L-phenylalanine Amide The title compound was prepared as described in Example 3 except there was no capping with acetyl imidazole.

M/z 669 (M+1).

Example 33

L-Isoleucinyl-[4-phosphono(difluoromethyl)]-L-phenylalanine-[4-phoshono(difluoromethyl)]-L-phenylalanine Amide The title compound was prepared as described in Example 3 except there was no capping with acetyl imidazole.

M/z 685 (M+1).

DESCRIPTION OF THE SEQUENCE LISTINGS

SEQ ID NO. 1 is the top sense DNA strand of FIGS. 2A and 2B for the PTP1B tyrosine phosphatase enzyme.

SEQ ID NO. 2 is the amino acid sequence of FIGS. 2A and 2B for the PTP 1B tyrosine phosphatase enzyme.

SEQ ID NO. 3 is the top sense cDNA strand of FIGS. 3A, 3B and 3C for the Cathepsin K preproenzyme.

SEQ ID NO. 4 is the amino acid sequence of FIGS. 3A, 3B and 3C for the Cathepsin K preproenzyme.

SEQ ID NO. 5 is the top sense cDNA strand of FIGS. 4A and 4B for the CPP32 apopain proenzyme.

SEQ ID NO. 6 is the amino acid sequence of FIGS. 4A and 4B for the CPP32 apopain proenzyme.

SEQ ID NO. 7 is the cDNA sequence of the human PTP-1B$_{1-320}$ Ser mutant.

SEQ ID NO. 8 is the amino acid sequence of the human PTP-1B$_{1-320}$ Ser mutant.

SEQ ID NO. 9 is the cDNA sequence for apopain C$_{163}$S mutant.

SEQ ID NO. 10 is the amino acid sequence for the apopain C$_{163}$S mutant.

SEQ ID NO. 11 is the large subunit of the heterodimeric amino acid sequence for the apopain C$_{163}$S mutant.

SEQ ID NO. 12 is the cDNA sequence for the Cathepsin K C139S mutant.

SEQ ID NO. 13 is the cDNA sequence for the Cathepsin K C$_{139}$A mutant.

SEQ ID NO. 14 is the amino acid sequence for the Cathepsin K C$_{139}$S mutant.

SEQ ID NO. 15 is the amino acid sequence for the Cathepsin K C$_{139}$A mutant.

```
SEQ ID NO.1
    ATGGAGATGGAAAAGGAGTTCGAGCAGATCGACAAGTCCGGGAGCTGGGCGGCCATTTAC
  1 ---------+---------+---------+---------+---------+---------+   60

CAGGATATCCGACATGAAGCCAGTGACTTCCCATGTAGAGTGGCCAAGCTTCCTAAGAAC
 61 ---------+---------+---------+---------+---------+---------+  120

AAAAACCGAAATAGGTACAGAGACGTCAGTCCCTTTGACCATAGTCGGATTAAACTACAT
121 ---------+---------+---------+---------+---------+---------+  180

CAAGAAGATAATGACTATATCAACGCTAGTTTGATAAAAATGGAAGAAGCCCAAAGGAGT
181 ---------+---------+---------+---------+---------+---------+  240

TACATTCTTACCCAGGGCCCTTTGCCTAACACATGCGGTCACTTTTGGGAGATGGTGTGG
241 ---------+---------+---------+---------+---------+---------+  300

GAGCAGAAAAGCAGGGGTGTCGTCATGCTCAACAGAGTGATGGAGAAAGGTTCGTTAAAA
301 ---------+---------+---------+---------+---------+---------+  360

TGCGCACAATACTGGCCACAAAAAGAAGAAAAAGAGATGATCTTTGAAGACACAAATTTG
361 ---------+---------+---------+---------+---------+---------+  420

AAATTAACATTGATCTCTGAAGATATCAAGTCATATTATACAGTGCGACAGCTAGAATTG
421 ---------+---------+---------+---------+---------+---------+  480

GAAAACCTTACAACCCAAGAAACTCGAGAGATCTTACATTTCCACTATACCACATGGCCT
481 ---------+---------+---------+---------+---------+---------+  540

GACTTTGGAGTCCCTGAATCACCAGCCTCATTCTTGAACTTTCTTTTCAAAGTCCGAGAG
541 ---------+---------+---------+---------+---------+---------+  600

TCAGGGTCACTCAGCCCGGAGCACGGGCCCGTTGTGGTGCACTGCAGTGCAGGCATCGGC
601 ---------+---------+---------+---------+---------+---------+  660

AGGTCTGGAACCTTCTGTCTGGCTGATACCTGCCTCCTGCTGATGGACAAGAGGAAAGAC
661 ---------+---------+---------+---------+---------+---------+  720

CCTTCTTCCGTTGATATCAAGAAAGTGCTGTTAGAAATGAGGAAGTTTCGGATGGGGTTG
721 ---------+---------+---------+---------+---------+---------+  780

ATCCAGACAGCCGACCAGCTGCGCTTCTCCTACCTGGCTGTGATCGAAGGTGCCAAATTC
781 ---------+---------+---------+---------+---------+---------+  840

ATCATGGGGACTCTTCCGTGCAGGATCAGTGGAAGGAGCTTTCCCACGAGGACCTGGAG
841 ---------+---------+---------+---------+---------+---------+  900

CCCCCACCCGAGCATATCCCCCCACCTCCCCGGCCACCCAAACGAATCCTGGAGCCACACTGA
901 ---------+---------+---------+---------+---------+---------+---  960

SEQ ID NO.2
  1 MetGluMetGluLysGluPheGluGlnIleAspLysSerGlySerTrpAlaAlaIleTyr    20

21 GlnAspIleArgHisGluAlaSerAspPheProCysArgValAlaLysLeuProLysAsn    40

41 LysAsnArgAsnArgTyrArgAspValSerProPheAspHisSerArgIleLysLeuHis    60

61 GlnGluAspAsnAspTyrIleAsnAlaSerLeuIleLysMetGluGluAlaGlnArgSer    80

81 TyrIleLeuThrGlnGlyProLeuProAsnThrCysGlyHisPheTrpGluMetValTrp   100

101 GluGlnLysSerArgGlyValValMetLeuAsnArgValMetGluLysGlySerLeuLys   120

121 CysAlaGlnTyrTrpProGlnLysGluGluLysGluMetIlePheGluAspTrpAsnLeu   140

141 LysLeuThrLeuIleSerGluAspIleLysSerTyrTyrThrValArgGlnLeuGluLeu   160

161 GluAsnLeuThrThrGlnGluThrArgGluIleLeuHisPheHisTyrThrThrTrpPro   180

181 AspPheGlyValProGluSerProAlaSerPheLeuAsnPheLeuPheLysValArgGlu   200

201 SerGlySerLeuSerProGluHisGlyProValValValHisCysSerAlaGlyIleGly   220

221 ArgSerGlyThrPheCysLeuAlaAspThrCysLeuLeuLeuMetAspLysArgLysAsp   240

241 ProSerSerValAspIleLysLysValLeuLeuGluMetArgLysPheArgMetGlyLeu   260

261 IleGlnThrAlaAspGlnLeuArgPheSerTyrLeuAlaValIleGluGlyAlaLysPhe   280
```

-continued

281 IleMetGlyAspSerSerValGlnAspGlnTrpLysGluLeuSerHisGluAspLeuGlu 300

301 ProProProGluHisIleProProProProArgProProLysArgIleLeuGluProHisEnd 320

SEQ ID NO. 3

```
        GAAACAAGCACTGGATTCCATATCCCACTGCCAAAACCGCATGGTTCAGATTATCGCTAT
   1    ---------+---------+---------+---------+---------+---------+ 60

TGCAGCTTTCATCATAATACACACCTTTGCTGCCGAAACGAAGCCAGACAACAGATTTCC
  61    ---------+---------+--------- +---------+---------+---------+ 120

ATCAGCAGGATGTGGGGGCTCAAGGTTCTGCTGCTACCTGTGGTGAGCTTTGCTCTGTAC
 121    ---------+---------+---------+---------+---------+---------+ 180

CCTGAGGAGATACTGGACACCCACTGGGAGCTATGGAAGAAGACCCACAGGAAGCAATAT
 181    ---------+---------+---------+---------+---------+---------+ 240

AACAACAAGGTGGATGAAATCTCTCGGCGTTTAATTTGGGAAAAAAACCTGAAGTATATT
 241    ---------+---------+---------+---------+---------+---------+ 300

TCCATCCATAACCTTGAGGCTTCTCTTGGTGTCCATACATATGAACTGGCTATGAACCAC
 301    ---------+---------+---------+---------+---------+---------+ 360

CTGGGGGACATGACCAGTGAAGAGGTGGTTCAGAAGATGACTGGACTCAAAGTACCCCTG
 361    ---------+---------+---------+---------+---------+---------+ 420

TCTCATTCCCGCAGTAATGACACCCTTTATATCCCAGAATGGGTAGAGTAGAGCCCAGAC
 421    ---------+---------+---------+---------+---------+---------+ 480

TCTGTCGACTATCGAAAGAAAGGATATGTTACTCCTGTCAAAAATCAGGGTCAGTGTGGT
 481    ---------+---------+---------+---------+---------+---------+ 540

TCCTGTTGGGCTTTTAGCTCTGTGGGTGCCCTGGAGGGCCAACTCAAGAAGAAAACTGGC
 541    ---------+---------+---------+---------+---------+---------+ 600

AAACTCTTAAATCTGAGTCCCCAGAACCTAGTGGATTGTGTGTCTGAGAATGATGGCTGT
 601    ---------+---------+---------+---------+---------+---------+ 660

GGAGGGGGCTACATGACCAATGCCTTCCAATATGTGCAGAAGAACCGGGGTATTGACTCT
 661    ---------+---------+---------+---------+---------+---------+ 720

GAAGATGCCTACCCATATGTGGGACAGGAAGAGAGTTGTATGTACAACCCAACAGGCAAG
 721    ---------+---------+---------+---------+---------+---------+ 780

GCAGCTAAATGCAGAGGGTACAGAGAGATCCCCGAGGGGAATGAGAAAGCCCTGAAGAGG
 781    ---------+---------+---------+---------+---------+---------+ 840

GCAGTGGCCCGAGTGGGACCTGTCTCTGTGGCCATTGATGCAAGCCTGACCTCCTTCCAG
 841    ---------+---------+---------+---------+---------+---------+ 900

TTTTACAGCAAAGGTGTGTATTATGATGAAAGCTGCAATAGCGATAATCTGAACCATGCG
 901    ---------+---------+---------+---------+---------+---------+ 960

GTTTTGGCAGTGGGATATGGAATCCAGAAGGGAAACAAGCACTGGATAATTAAAAACAGC
 961    ---------+---------+---------+---------+---------+---------+ 1020

TGGGGAGAAAACTGGGGAAACAAAGGATATATCCTCATGGCTCGAAATAAGAACAACGCC
1021    ---------+---------+---------+---------+---------+---------+ 1080

TGTGGCATTGCCAACCTGGCCAGCTTCCCCAAGATGTGACTCCAGCCAGCCAAATCCATC
1081    ---------+---------+---------+---------+---------+---------+ 1140

CTGCTCTTCCATTTCTTCCACGATGGTGCAGTGTAACGATGCACTTTGGAAGGGAGTTGG
1141    ---------+---------+---------+---------+---------+---------+ 1200

TGTGCTATTTTTGAAGCAGATGTGGTGATACTGAGATTGTCTGTTCAGTTTCCCCATTTG
1201    ---------+---------+---------+---------+---------+---------+ 1260

TTTGTGCTTCAAATGATCCTTCCTACTTTGCTTCTCTCCACCCATGACCTTTTTCACTGT
1261    ---------+---------+---------+---------+---------+---------+ 1320

GGCCATCAGGACTTTCCCTGACAGCTGTGTACTCTTAGGCTAAGAGATGTGACTACAGCC
1321    ---------+---------+---------+---------+---------+---------+ 1380

TGCCCCTGACTGTGTTGTCCCAGGGCTGATGCTGTACAGGTACAGGCTGGAGATTTTCAC
1381    ---------+---------+---------+---------+---------+---------+ 1440
```

-continued

```
        ATAGGTTAGATTCTCATTCACGGGACTAGTTAGCTTTAAGCACCCTAGAGGACTAGGGTA
   1441 ---------+---------+---------+---------+---------+---------+ 1500

ATCTGACTTCTCACTTCCTAATGTTCCCTTCATACTCCTCAAGGTAGAATGTCTATGTTT
   1501 ---------+---------+---------+---------+---------+---------+ 1560

TCTACTCCAATTCATAAATCTATTCATAAGTCTTTGGTACAAGTTTACATGATAAAAAGA
   1561 ---------+---------+---------+---------+---------+---------+ 1620

AATGTGATTTGTCTTCCCTTCTTTGCACTTTTGAAATAAAGTATTTATC
   1621 ---------+---------+---------+---------+---------        1669
```

SEQ ID NO.4
MetTrpGlyLeuLysValLeuLeuLeuProValValSerPheAlaLeuTyr

ProGluGluIleLeuAspThrHisTrpGluLeuTrpLysLysThrHisArgLysGlnTyr

AsnAsnLysValAspGluIleSerArgArgLeuIleTrpGluLysAsnLeuLysTyrIle

SerIleHisAsnLeuGluAlaSerLeuGlyValHisThrTyrGluLeuAlaMetAsnHis

LeuGlyAspMetThrSerGluGluValValGlnLysMetThrGlyLeuLysValProLeu

SerHisSerArgSerAsnAspThrLeuTyrIleProGluTrpGluGlyArgAlaProAsp

SerValAspTyrArgLysLysGlyTyrValThrProValLysAsnGlnGlyGlnCysGly

SerCysTrpAlaPheSerSerValGlyAlaLeuGluGlyGlnLeuLysLysLysThrGly
   139

LysLeuLeuAsnLeuSerProGlnAsnLeuValAspCysValSerGluAsnAspGlyCys

GlyGlyGlyTyrMetThrAsnAlaPheGlnTyrValGlnLysAsnArgGlyIleAspSer

GluAspAlaTyrProTyrValGlyGlnGluGluSerCysMetTyrAsnProThrGlyLys

AlaAlaCysArgLeuTyrArgGluIleProGluGlyAsnGluLysAlaLeuLysArg

AlaValAlaArgValGlyProValSerValAlaIleAspAlaSerLeuThrSerPheGln

PheTyrSerLysGlyValTyrTyrAspGluSerCysAsnSerAspAsnLeuAsnHisAla

ValLeuAlaValGlyTyrGlyIleGlnLysGlyAsnLysHisTrpIleIleLysAsnSer

TrpGlyGluAsnTrpGlyAsnLysGlyTyrIleLeuMetAlaArgAsnLysAsnAsnAla

CysGlyIleAlaAsnLeuAlaSerPheProLysMetEnd

SEQ ID NO.5
```
        CTGCAGGAATTCGGCACGAGGGGTGCTATTGTGAGGCGGTTGTAGAAGTTAATAAAGGTA
      1 ---------+---------+---------+---------+---------+---------+ 60

TCCATGGAGAACACTGAAAACTCAGTGGATTCAAAATCCATTAAAAATTTGGAACCAAAG
     61 ---------+---------+---------+---------+---------+---------+ 120

ATCATACATGGAAGCCAATCAATGGACTCTGGAATATCCCTGGACAACAGTTATAAAATG
    121 ---------+---------+---------+---------+---------+---------+ 180

GATTATCCTGAGATGGGTTTATGTATAATAATTAATAATAAGAATTTTCATAAGAGCACT
    181 ---------+---------+---------+---------+---------+---------+ 240

GGAATGACATCTCGGTCTGGTACAGATGTCGATGCAGCAAACCTCAGGGAAACATTCAGA
    241 ---------+---------+---------+---------+---------+---------+ 300

AACTTGAAATATGAAGTCAGGAATAAAAATGATCTTACACGTGAAGAAATTGTGGAATTG
    301 ---------+---------+---------+---------+---------+---------+ 360

ATGCGTGATGTTTCTAAAGAAGATCACAGCAAAAGGAGCAGTTTTGTTTGTGTGCTTCTG
    361 ---------+---------+---------+---------+---------+---------+ 420

AGCCATGGTGAAGAAGGAATAATTTTTGGAACAAATGGACCTGTTGACCTGAAAAAAATA
    421 ---------+---------+---------+---------+---------+---------+ 480

ACAAACTTTTTCAGAGGGGATCGTTGTAGAAGTCTAACTGGAAAACCCAAACTTTTCATT
    481 ---------+---------+---------+---------+---------+---------+ 540
```

-continued

```
      ATTCAGGCCTGCCGTGGTACAGAACTGGACTGTGGCATTGAGACAGACAGTGGTGTTGAT
541 ---------+---------+---------+---------+---------+---------+ 600

GATGACATGGCGTGTCATAAAATACCAGTGGAGGCCGACTTCTTGTATGCATACTCCACA
601 ---------+---------+---------+---------+---------+---------+ 660

GCACCTGGTTATTATTCTTGGCGAAATTCAAGGATGGCTCCTGGTTCATCCAGTCGCTT
661 ---------+---------+---------+---------+---------+---------+ 720

TGTGCCATGCTGAAACAGTATGCCGACAAGCTTGAATTTATGCACATTCTTACCCGGGTT
721 ---------+---------+---------+---------+---------+---------+ 780

AACCGAAAGGTGGCAACAGAATTTGAGTCCTTTTCCTTTGACGCTACTTTTCATGCAAAG
781 ---------+---------+---------+---------+---------+---------+ 840

AAACAGATTCCATGTATTGTTTCCATGCTCACAAAAGAACTCTATTTTTATCACTAAAGA
841 ---------+---------+---------+---------+---------+---------+ 900

AATGGTTGGTTGGTGGTTTTTTTTAGTTTGTATGCCAAGTGAGAAGATGGTATATTTGGT
901 ---------+---------+---------+---------+---------+---------+ 960

ACTGTATTTCCCTCTCATTTTGACCTACTCTCATGCTGCAG
961 ---------+---------+---------+---------+-                    1001
```

SEQ ID NO.6
MetGluAsnThrGluAsnSerValAspSerLysSerIleLysAsnLeuGluProLys

IleIleHisGlySerGluSerMetAspSerGlyIleSerLeuAspAsnSerTyrLysMet

AspTyrProGluMetGlyLeuCysIleIleIleAsnAsnLysAsnPheHisLysSerThr

GlyMetThrSerArgSerGlyThrAspValAspAlaAlaAsnLeuArgGluThrPheArg

AsnLeuLysTyrGluValArgAsnLysAsnAspLeuThrArgGluGluIleValGluLeu

MetArgAspValSerLysGluAspHisSerLysArgSerSerPheValCysValLeuLeu

SerHisGlyGluGluGlyIleIlePheGlyThrAsnGlyProValAspLeuLysLysIle

ThrAsnPhePheArgGlyAspArgCysArgSerLeuThrGlyLysProLysLeuPheIle

IleGlnAla<u>Cys</u>ArgGlyThrGluLeuAspCysGlyIleGluThrAspSerGlyValAsp
         163

AspAspMetAlaCysHisLysIleProValGluAlaAspPheLeuTyrAlaTyrSerThr

AlaProGlyTyrTyrSerTrpArgAsnSerLysAspGlySerTrpPheIleGlnSerLeu

CysAlaMetLeuLysGlnTyrAlaAspLysLeuGluPheMetHisIleLeuThrArgVal

AsnArgLysValAlaThrGluPheGluSerPheSerPheAspAlaThrPheHisAlaLys

LysGlnIleProCysIleValSerMetLeuThrLysGluLeuTyrPheTyrHisEnd

SEQ ID NO.7
```
      ATGGAGATGGAAAAGGAGTTCGAGCAGATCGACAAGTCCGGGAGCTGGGCGGCCATTTAC
  1 ---------+---------+---------+---------+---------+---------+ 60

CAGGATATCCGACATGAAGCCAGTGACTTCCCATGTAGAGTGGCCAAGCTTCCTAAGAAC
 61 ---------+---------+---------+---------+---------+---------+ 120

AAAAACCGAAATAGGTACAGAGACGTCAGTCCCTTTGACCATAGTCGGATTAAACTACAT
121 ---------+---------+---------+---------+---------+---------+ 180

CAAGAAGATAATGACTATATCAACGCTAGTTTGATAAAAATGGAAGAAGCCCAAAGGAGT
181 ---------+---------+---------+---------+---------------+     240

TACATTCTTACCCAGGGCCCTTTGCCTAACACATGCGGTCACTTTTGGGAGATGGTGTGG
241 ---------+---------+---------+---------+---------+---------+ 300

GAGCAGAAAAGCAGGGGTGTCGTCATGCTCAACAGAGTGATGGAGAAAGGTTCGTTAAAA
301 -----------+---------+---------+---------+--------------+    360

TGCGCACAATACTGGCCACAAAAAGAAGAAAAAGAGATGATCTTTGAAGACACAAATTTG
361 ---------+---------+---------+---------+---------+---------+ 420
```

-continued

```
         AAATTAACATTGATCTCTGAAGATATCAAGTCATATTATACAGTGCGACAGCTAGAATTG
421      ---------+---------+---------+---------+-------------+          480

GAAAACCTTACAACCCAAGAAACTCGAGAGATCTTACATTTCCACTATACCACATGGCCT
481      ---------+---------+---------+---------+---------+---------+    540

GACTTTGGAGTCCCTGAATCACCAGCCTCATTCTTGAACTTTCTTTTCAAAGTCCGAGAG
541      ---------+---------+---------+---------+----+---------+         600

TCAGGGTCACTCAGCCCGGAGCACGGGCCCGTTGTGGTGCACTGCAGTGCAGGCATCGGC
601      ---------+---------+---------+---------+---------+---------+    660

AGGTCTGGAACCTTCTGTCTGGCTGATACCTGCCTCCTGCTGATGGACAAGAGGAAAGAC
661      ---------+---------+---------+---------+---------+---------+    720

CCTTCTTCCGTTGATATCAAGAAAGTGCTGTTAGAAATGAGGAAGTTTCGGATGGGGTTG
721      ---------+---------+---------+---------+---------+---------+    780

ATCCAGACAGCCGACCAGCTGCGCTTCTCCTACCTGGCTGTGATCGAAGGTGCCAAATTC
781      ---------+---------+---------+---------+---------+---------+    840

ATCATGGGGGACTCTTCCGTGCAGGATCAGTGGAAGGAGCTTTCCCACGAGGACCTGGAG
841      ---------+---------+---------+---------+---------+---------+    900

CCCCCACCCGAGCATATCCCCCCACCTCCCCGGCCACCCAAACGAATCCTGGAGCCACACTGA
901      ---------+---------+---------+---------+---------+---------+---  960
```

```
SEQ ID NO. 8
MetGluMetGluLysGluPheGluGlnIleAspLysSerGlySerTrpAlaAlaIleTyr              20

GlnAspIleArgHisGluAlaSerAspPheProCysArgValAlaLysLeuProLysAsn             40

LysAsnArgAsnArgTyrArgAspValSerProPheAspHisSerArgIleLysLeuHis             60

GlnGluAspAsnAspTyrIleAsnAlaSerLeuIleLysMetGluGluAlaGlnArgSer             80

TyrIleLeuThrGlnGlyProLeuProAsnThrCysGlyHisPheTrpGluMetValTrp            100

GluGlnLysSerArgGlyValValMetLeuAsnArgValMetGluLysGlySerLeuLys            120

CysAlaGlnTyrTrpProGlnLysGluGluLysGluMetIlePheGluAspThrAsnLeu            140

LysLeuThrLeuIleSerGluAspIleLysSerTyrTyrThrValArgGlnLeuGluLeu            160

GluAsnLeuThrThrGlnGluThrArgGluIleLeuHisPheHisTyrThrThrTrpPro            180

AspPheGlyValProGluSerProAlaSerPheLeuAsnPheLeuPheLysValArgGlu            200

SerGlySerLeuSerProGluHisGlyProValValValHisCysSerAlaGlyIleGly         220
{TCG}

ArgSerGlyThrPheCysLeuAlaAspThrCysLeuLeuLeuMetAspLysArgLysAsp            240

ProSerSerValAspIleLysLysValLeuLeuGluMetArgLysPheArgMetGlyLeu            260

IleGlnThrAlaAspGlnLeuArgPheSerTyrLeuAlaValIleGluGlyAlaLysPhe            280

IleMetGlyAspSerSerValGlnAspGlnTrpLysGluLeuSerHisGluAspLeuGlu            300

ProProProGluHisIleProProProProArgProProLysArgIleLeuGluProHisEnd         320
```

```
SEQ ID NO. 9
    1 CTGCAGGAAT TCGGCACGAG GGGTGCTATT GTGAGGCGGT TGTAGAAGTT

51 AATAAAGGTA TCCATGGAGA ACACTGAAAA CTCAGTGGAT TCAAAATCCA

101 TTAAAAATTT GGAACCAAAG ATCATACATG GAAGCGAATC AATGGACTCT

151 GGAATATCCC TGGACAACAG TTATAAAATG GATTATCCTG AGATGGGTTT

201 ATGTATAATA ATTAATAATA AGAATTTTCA TAAGAGCACT GGAATGACAT

251 CTCGGTCTGG TACAGATGTC GATGCAGCAA ACCTCAGGGA AACATTCAGA

301 AACTTGAAAT ATGAAGTCAG GAATAAAAAT GATCTTACAC GTGAAGAAAT

351 TGTGGAATTG ATGCGTGATG TTTCTAAAGA AGATCACAGC AAAAGGAGCA
```

```
 401 GTTTTGTTTG TGTGCTTCTG AGCCATGGTG AAGAAGGAAT AATTTTTGGA

451 ACAAATGGAC CTGTTGACCT GAAAAAAATA ACAAACTTTT TCAGAGGGGA

501 TCGTTGTAGA AGTCTAACTG GAAAACCCAA ACTTTTCATT ATTCAGGCCT

551 CCCGTGGTAC AGAACTGGAC TGTGGCATTG AGACAGACAG TGGTGTTGAT

601 GATGACATGG CGTGTCATAA ATACCAGTG GAGGCCGACT TCTTGTATGC

651 ATACTCCACA GCACCTGGTT ATTATTCTTG GCGAAATTCA AAGGATGGCT

701 CCTGGTTCAT CCAGTCGCTT TGTGCCATGC TGAAACAGTA TGCCGACAAG

751 CTTGAATTTA TGCACATTCT TACCCGGGTT AACCGAAAGG TGGCAACAGA

801 ATTTGAGTCC TTTTCCTTTG ACGCTACTTT TCATGCAAAG AAACAGATTC

851 CATGTATTGT TTCCATGCTC ACAAAAGAAC TCTATTTTTA TCACTAAAGA

901 AATGGTTGGT TGGTGGTTTT TTTTAGTTTG TATGCCAAGT GAGAAGATGG

951 TATATTTGGT ACTGTATTTC CCTCTCATTT TGACCTACTC TCATGCTGCA

1001 G
```

```
SEQ ID NO.10
    1 MENTENSVDS KSIKNLEPKI IHGSESMDSG ISLDNSYKMD YPEMGLCIII

51 NNKNFHKSTG MTSRSGTDVD AANLRETFRN LKYEVRNKND LTREEIVELM

101 RDVSKEDHSK RSSFVCVLLS HGEEGIIFGT NGPVDLKKIT NFFRGDRCRS

151 LTGKPKLFII QASRGTELDC GIETDSGVDD DMACHKIPVE ADFLYAYSTA

201 PGYYSWRNSK DGSWFIQSLC AMLKQYADKL EFMHILTRVN RKVATEFESF

251 SFDATFHAKK QIPCIVSMLT KELYFYH
```

```
SEQ ID NO.11
    1                             MSG ISLDNSYKMD YPEMGLCIII

51 NNKNFHKSTG MTSRSGTDVD AANLRETFRN LKYEVRNKND LTREEIVELM

101 RDVSKEDHSK RSSFVCVLLS HGEEGIIFGT NGPVDLKKIT NFFRGDRCRS

151 LTGKPKLFII QASRGTELDC GIETD
```

```
  1 ATGTGGGGGC TCAAGGTTCT GCTGCTACCT GTGGTGAGCT TGCTCTGTA SEQ ID NO. 12

51 CCCTGAGGAG ATACTGGACA CCCACTGGGA GCTATGGAAG AAGACCCACA

101 GGAAGCAATA TAACAACAAG GTGGATGAAA TCTCTCGGCG TTTAATTTGG

151 GAAAAAAACC TGAAGTATAT TTCCATCCAT AACCTTGAGG CTTCTCTTGG

201 TGTCCATACA TATGAACTGG CTATGAACCA CCTGGGGGAC ATGACCAGTG

251 AAGAGGTGGT TCAGAAGATG ACTGGACTCA AGTACCCCT GTCTCATTCC

301 CGCAGTAATG ACACCCTTTA TATCCCAGAA TGGAAGGTA GAGCCCCAGA

351 CTCTGTCGAC TATCGAAAGA AAGGATATGT TACTCCTGTC AAAAATCAGG

401 GTCAGTGTGG TTCCTCTTGG GCTTTTAGCT CTGTGGGTGC CCTGGAGGGC

451 CAACTCAAGA AGAAAACTGG CAAACTCTTA AATCTGAGTC CCCAGAACCT

501 AGTGGATTGT GTGTCTGAGA ATGATGGCTG TGGAGGGGGC TACATGACCA

551 ATGCCTTCCA ATATGTGCAG AAGAACCGGG GTATTGACTC TGAAGATGCC
```

```
                         -continued
601 TACCCATATG TGGGACAGGA AGAGAGTTGT ATGTACAACC CAACAGGCAA

651 GGCAGCTAAA TGCAGAGGGT ACAGAGAGAT CCCCGAGGGG AATGAGAAAG

701 CCCTGAAGAG GGCAGTGGCC CGAGTGGGAC CTGTCTCTGT GGCCATTGAT

751 GCAAGCCTGA CCTCCTTCCA GTTTTACAGC AAAGGTGTGT ATTATGATGA

801 AAGCTGCAAT AGCGATAATC TGAACCATGC GGTTTTGGCA GTGGGATATG

851 GAATCCAGAA GGGAAACAAG CACTGGATAA TTAAAAACAG CTGGGGAGAA

901 AACTGGGGAA ACAAAGGATA TATCCTCATG GCTCGAAATA AGAACAACGC

951 CTGTGGCATT GCCAACCTGG CCAGCTTCCC CAAGATGTGA

1 ATGTGGGGGC TCAAGGTTCT GCTGCTACCT GTGGTGAGCT TTGCTCTGTA  SEQ ID NO. 13

51 CCCTGAGGAG ATACTGGACA CCCACTGGGA GCTATGGAAG AAGACCCACA

101 GGAAGCAATA TAACAACAAG GTGGATGAAA TCTCTCGGCG TTTAATTTGG

151 GAAAAAAACC TGAAGTATAT TTCCATCCAT AACCTTGAGG CTTCTCTTGG

201 TGTCCATACA TATGAACTGG CTATGAACCA CCTGGGGGAC ATGACCAGTG

251 AAGAGGTGGT TCAGAAGATG ACTGGACTCA AAGTACCCCT GTCTCATTCC

301 CGCAGTAATG ACACCCTTTA TATCCCAGAA TGGGAAGGTA GAGCCCCAGA

351 CTCTGTCGAC TATCGAAAGA AAGGATATGT TACTCCTGTC AAAAATCAGG

401 GTCAGTGTGG TTCCGCTTGG GCTTTTAGCT CTGTGGGTGC CCTGGAGGGC

451 CAACTCAAGA AGAAAACTGG CAAACTCTTA AATCTGAGTC CCCAGAACCT

501 AGTGGATTGT GTGTCTGAGA ATGATGGCTG TGGAGGGGGC TACATGACCA

551 ATGCCTTCCA ATATGTGCAG AAGAACCGGG GTATTGACTC TGAAGATGCC

601 TACCCATATG TGGGACAGGA AGAGAGTTGT ATGTACAACC CAACAGGCAA

651 GGCAGCTAAA TGCAGAGGGT ACAGAGAGAT CCCCGAGGGG AATGAGAAAG

701 CCCTGAAGAG GGCAGTGGCC CGAGTGGGAC CTGTCTCTGT GGCCATTGAT

751 GCAAGCCTGA CCTCCTTCCA GTTTTACAGC AAAGGTGTGT ATTATGATGA

801 AAGCTGCAAT AGCGATAATC TGAACCATGC GGTTTTGGCA GTGGGATATG

851 GAATCCAGAA GGGAAACAAG CACTGGATAA TTAAAAACAG CTGGGGAGAA

901 AACTGGGGAA ACAAAGGATA TATCCTCATG GCTCGAAATA AGAACAACGC

951 CTGTGGCATT GCCAACCTGG CCAGCTTCCC CAAGATGTGA

1 MWGLKVLLLP VVSFALYPEE ILDTHWELWK KTHRKQYNNK VDEISRRLIW  SEQ ID NO. 14

51 EKNLKYISIH NLEASLGVHT YELAANHLGD MTSEEVVQKM TGLKVPLSHS

101 RSNDTLYIPE WEGRAPDSVD YRKKGYVTPV KNQGQCGSSW AFSSVGALEG

151 QLKKKTGKLL NLSPQNLVDC VSENDGCGGG YMTNAFQYVQ KNRGIDSEDA

201 YPYVGQEESC MYNPTGKAAK CRGYREIPEG NEKALKRAVA RVGPVSVAID

251 ASLTSFQFYS KGVYYDESCN SDNLNHAVLA VGYGIQKGNK HWIIKNSWGE

301 NWGNKGYILM ARNKNNACGI ANLASFPKM

1 MWGLKVLLLP VVSFALYPEE ILDTHWELWK KTHRKQYNNK VDEISRRLIW  SEQ ID NO. 15

51 EKNLKYISIH NLEASLGVHT YELAMNHLGD MTSEEVVQKM TGLKVPLSHS
```

101 RSNDTLYIPE WEGRAPDSVD YRKKGYVTPV KNQGQCGSAW AFSSVGALEG

151 QLKKKTGKLL NLSPQNLVDC VSENDGCGGG YMTNAFQYVQ KNRGIDSEDA

201 YPYVGQEESC MYNPTGKAAK CRGYREIPEG NEKALKRAVA RVGPVSVAID

251 ASLTSFQFYS KGVYYDESCN SDNLNHAVLA VGYGIQKGNK HWIIKNSWGE

301 NWGNKGYILM ARNKNNACGI ANLASFPKM

---

What is claimed is:

1. A tripeptide that contains two 4-phosphono (difluoromethyl)phenylalanine groups.

2. A compound of structure A

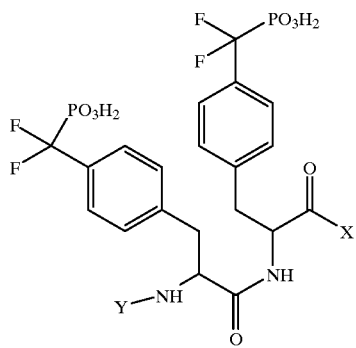

or a pharmaceutically acceptable salt thereof wherein:

X is OH or $NH_2$;

Y is hydrogen, $C_{1-6}$ alkyl, $R^1Z$ CO—, $R^2$—, or $R^3S(O)_2$—;

Z is O, $NR^4$, $SCH_2$, $S(O)_2CH_2$, CH=CH or a bond;

$R^1$ is selected from the group consisting of
 (a) $C_{1-10}$alkyl;
 (b) $C_{1-6}$fluoroalkyl, optionally substituted with a hydroxy group;
 (c) mono-, di- or tri-substituted aromatic hydrocarbon wherein the substituents are selected from the group consisting of

| | |
|---|---|
| (1) | hydrogen, |
| (2) | halo, |
| (3) | NO2, |

(4) N₃,
(5) OH,
(6) CN,
(7) CONH₂,
(8) CO₂H,
(9) CO₂—C$_{1-10}$alkyl,
(10) C$_{1-10}$ alkyl,
(11) C$_{1-6}$ fluoroalkyl,
(12) C$_{1-10}$alkoxy,
(13) C$_{1-10}$alkylthio,
(14) C$_{1-10}$alkylsulfinyl,
(15) C$_{1-10}$alkylsulfonyl, or
(16) phenyl;

(d) mono-, di- or tri-substituted heteroaryl wherein the heteroaryl is a monocyclic aromatic ring of 5 atoms, said ring having one hetero atom which is S, O, or N, and optionally 1, 2, or 3 additional N atoms; or the heteroaryl is a monocyclic ring of 6 atoms, said ring having one hetero atom which is N, and optionally 1, 2, or 3 additional N atoms, wherein the substituents are selected from the group consisting of (1) hydrogen,
(2) halo,
(3) NO₂,
(4) N₃,
(5) OH (or the carbonyl tautomer thereof),
(6) CN,
(7) CONH₂,
(8) CO₂H,
(9) CO₂—C$_{1-10}$alkyl,
(10) C$_{1-10}$ alkyl,
(11) C$_{1-6}$ fluoroalkyl,
(12) C$_{1-10}$alkoxy,
(13) C$_{1-10}$alkylthio,
(14) C$_{1-10}$alkylsulfinyl, or
(15) C$_{1-10}$alkylsulfonyl;

(e) a mono- or di-substituted benzoheterocycle in which the heterocycle is a 5, 6, or 7-membered ring which may contain 1 or 2 heteroatoms chosen independently from O, S, or N and which may contain a carbonyl group or a sulfonyl group; wherein the substituents are selected from the group consisting of (1) hydrogen,
(2) halo,
(3) NO₂,
(4) N₃,
(5) OH,
(6) CN,
(7) CONH₂,
(8) CO₂H,
(9) CO₂—C$_{1-10}$alkyl,
(10) C$_{1-10}$ alkyl,
(11) C$_{1-6}$ fluoroalkyl,
(12) C$_{1-10}$alkoxy,
(13) C$_{1-10}$alkylthio,
(14) C$_{1-10}$alkylsulfinyl, or
(15) C$_{1-10}$alkylsulfonyl;

(f) a heterocycloalkyl group of 5, 6 or 7 members which contains 1 or 2 heteroatoms chosen from O, S, or N and optionally contains a carbonyl group or a sulfonyl group;
(g) a mono- or di-substituted benzocarbocycle in which the carbocycle is a 5, 6, or 7-membered ring which optionally contains a carbonyl group, wherein the substituents are selected from the group consisting of (1) hydrogen,
(2) halo,
(3) NO₂,
(4) N₃,
(5) OH,
(6) CN,
(7) CONH₂,
(8) CO₂H,
(9) CO₂—C$_{1-10}$alkyl,
(10) C$_{1-10}$ alkyl,
(11) C$_{1-6}$ fluoroalkyl,
(12) C$_{1-10}$alkoxy,
(13) C$_{1-10}$alkylthio,
(14) C$_{1-10}$alkylsulfinyl, or
(15) C$_{1-10}$alkylsulfonyl;

(h) a mono- or di-substituted bicyclic heteroaryl of 8, 9, or 10 members, containing 1 to 5 heteroatoms chosen independently from O, S or N, wherein the substituents are selected from the group consisting of (1) hydrogen,
(2) halo,
(3) NO₂,
(4) N₃,
(5) OH (or the carbonyl tantomes thereof)
(6) CN,
(7) CONH₂,
(8) CO₂H,
(9) CO₂—C$_{1-10}$alkyl,
(10) C$_{1-10}$ alkyl,
(11) C$_{1-6}$ fluoroalky,
(12) C$_{1-10}$alkoxy,
(13) C$_{1-10}$alkylthio,
(14) C$_{1-10}$alkylsulfinyl, or
(15) C$_{1-10}$alkylsulfonyl; or $R^2$ is the acyl residue of one of the amino acid described in this specification, the amino group of which may be optionally substituted by an acyl group of the structure $R^1ZCO$— or $C_{1-6}$ alkyl, and in the case of a dicarboxylic amino acid, the terminal carboxyl may optionally be in the form of a $C_{1-4}$ alkyl ester, $R^3$ is selected from the group consisting of
(a) C$_{1-10}$alkyl,
(b) C$_{1-6}$fluoroalkyl,
(c) mono-, di- or tri-substituted aromatic hydrocarbon wherein the substituents are selected from the group consisting of (1) hydrogen,
(2) halo,
(3) NO₂,
(4) N₃,
(5) OH,
(6) CN,
(7) CONH₂,
(8) CO₂H,
(9) CO₂—C$_{1-10}$alkyl,
(10) C$_{1-10}$ alkyl,
(11) C$_{1-6}$ fluoroalkyl,
(12) C$_{1-10}$alkoxy,
(13) C$_{1-10}$alkylthio,
(14) C$_{1-10}$alkylsulfinyl, or
(15) C$_{1-10}$alkylsulfonyl.

3. A compound according to claim 2 selected from the group consisting of:

N-Benzoyl-L-glutamyl-[4-phosphono(difluoromethyl)]-L-phenyl-alanyl-[4-phosphono(difluoromethyl)]-L-phenylalanine amide, N-(3,5-Dibromo)benzoyl-L-glutamyl-[4-phosphono(difluoromethyl)]-L-phenyl-alanyl-[4-phosphono(difluoromethyl)]-L-phenylalanine amide, N-Acetyl-L-glutamyl-[4-phosphono(difluoromethyl)]-L-phenylalanyl-[4-phosphono(difluoromethyl)]-L-phenylalanine amide, L-Glutamyl-[4-phosphono(difluoromethyl)]-L-phenylalanyl-[4-phosphono(difluoromethyl)]-L-phenylalanine amide, L-Lysinyl-[4-phosphono(difluoromethyl)]-L-phenylalanyl-[4-phosphono(difluoromethyl)]-L-phenylalanine amide, L-Serinyl-[4-phosphono(difluoromethyl)]-L-phenylalanyl-[4-phosphono(difluoromethyl)]-L-phenylalanine amide, L-Prolinyl-[4-phosphono(difluoromethyl)]-L-phenylalanyl-[4-phosphono(difluoromethyl)]-L-phenylalanine amide, and L-Isoleucinyl-[4-phosphono(difluoromethyl)]-L-phenylalanyl-[4-phosphono(difluoromethyl)]-L-phenylalanine amide, N-Benzoyl-[4-phosphono(difluoromethyl)]-L-phenylalanyl-[4-phosphono(difluoromethyl)]-L-phenylalanineamide, N-Acetyl-L-phenylalanyl-[4-phosphono(difluoromethyl)]-L-phenylalanyl-[4-phosphono(difluoromethyl]-L-phenylalanine amide, N-Acetyl-L-2-naphthylalanyl-[4-phosphono(difluoromethyl)]-L-phenylalanyl-[4-phosphono(difluoromethyl)]-phenylalanine amide, N-Acetyl-[4-phosphono(difluoromethyl)]-L-phenylalanyl-[4-phosphono(difluoromethyl)]-L-phenylalanyl-[4-phosphono(difluoromethyl)]-L-phenylalanine amide, N-Acetyl-L-aspartyl-[4-phosphono(difluoromethyl)]-L-phenylalanyl-[4-phosphono(difluoromethyl)]-L-phenylalanine amide, N-(4-Azido-3-iodo)-benzoyl-L-glutamyl-[4-phosphono(difluoromethyl)]-L-phenylalanyl-[4-phosphono(difluoromethyl)]-L-phenylalanine amide, N-Acetyl-L-tryptophyl-[4-phosphono(difluoromethyl)]-L-phenylalanyl-[4-phosphono(difluoromethyl)]-L-phenylalanine amide, N-Acetyl-L-histidyl-[4-Phosphono(difluoromethyl)]-L-phenylalanyl-[4-phosphono(difluoromethyl)]-L-phenylalanine amide, N-(2-Hydroxy-3-trifluoro-2-trifluoromethyl)propanoyl-[4-phosphono(difluromethyl)]-L-phenylalanyl-[4-phosphono(difluoromethyl)]-L-phenylalanine amide, N-Acetyl-D-aspartyl-[4-phosphono(difluoromethyl)]-L-phenylalanyl-[4-phosphono(difluoromethyl)]-L-phenylalanine amide, N-Phthaloyl-[4-phosphono(difluoromethyl)]-L-phenylalanyl-[4-phosphono(difluoromethyl)]-L-phenylalanie amide, N-Acetyl-L-methionyl-[4-phosphono(difluoromethyl)]-phenyalanyl-[4-phosphono(difluoromethyl)]-L-phenylalanine amide, N-5-Methyl-3-phenyl-4-isoxazoloyl-[4-phosphono(difluoromethyl)]-methyl)]-L-phenylalanyl-[4-phosphono(difluoromethyl)]-L-phenylalanyne amide, N-Acetyl-L-glutaminyl-4-[phosphono(difluoromethyl)]-L-phenylalanyl-[4-phosphono(difluoromethyl)]-L-phenylalanine amide, N-Acetyl-D-glutamyl-[4-phosphono(difluoromethyl)]-L-phenylalanyl-[4-phosphono(difluoromethyl)]-L-phenylalanine amide, N-Acetyl-L-threonyl-[4-phosphono(difluoromethyl)]-L-phenylalanyl-[4-phosphono(difluoromethyl)]-L-phenylalamine amide, N-Benzoyl-glycinyl-[4-phosphono(difluoromethyl)]-L-phenylalanyl-[4-phosphono(difluoromethyl)]-L-phenylalanine amide, N-Benzoyl-L-methylglutamate-[4-phosphono(difluoromethyl)-L-phenylalanyl-[4-phosphono(difluoromethyl)]-L-phenylalanine amide, N-Acetyl-L-arginyl-[4-phosphono(difluoromethyl)-L-phenylalanyl-[4-phosphono(fluoromethyl)]-L-phenylalanine amide, N-Benzoyl-L-glutamyl-[4-phosphono(difluoromethyl)-L-phenylalanyl-[4-phosphono(difluoromethyl)]-L-phenylalanine, N-Benzoyl-[4-phosphono(difluoromethyl)]-D-phenylalanyl-[4-phosphono(difluoromethyl)]-D-phenylalanine amide, N-Benzoyl-D-glutamyl-[4-phosphono(difluoromethyl)]-D-phenylalanyl-[4-phosphono(difuoromethyl)]-D-phenylalamine amide, N-Benzoyl-[4-phosphono(difluoromethyl)]-D-phenylalanine-[4-phosphono(difluoromethyl)]-L-phenylalanine amide, N-Benzoyl-[4-phosphono(difluoromethyl)]-L-phenylalanine-[4-phosphono(difluoromethyl))]-D-phenylalanine amide, N-Benzoyl-L-glutamyl-[4-phosphono(difluoromethyl)]-L-phenylalanine-[4-phosphono(difluoromethyl)]-D-phenylalanine amide, L-Aspartyl-[4-phosphono(difluromethyl)]-L-phenylalanyl-[4-phosphono(difluoromethyl)]-L-phenylalanine amide.

4. The peptide of claim 3 in tritiated or $I^{125}$ iodinated form.

5. A tritiated peptide, N-(3,5-Ditritio)benzoyl-L-glutamyl-[4-phosphono(difluoromethyl)]-L-phenylalanyl-[4-phosphono(difluoromethyl)]-L-phenylalanineamide.

* * * * *

SEQUENCE LISTING (1) GENERAL INFORMATION:

(iii) NUMBER OF SEQUENCES: 15

(2) INFORMATION FOR SEQ ID NO:1:

(i) SEQUENCE CHARACTERISTICS:
       (A) LENGTH: 963 base pairs
       (B) TYPE: nucleic acid
       (C) STRANDEDNESS: single
       (D) TOPOLOGY: linear (ii) MOLECULE TYPE: cDNA (xi) SEQUENCE DESCRIPTION: SEQ ID NO:1:

```
ATGGAGATGG AAAAGGAGTT CGAGCAGATC GACAAGTCCG GGAGCTGGGC GGCCATTTAC      60

CAGGATATCC GACATGAAGC CAGTGACTTC CCATGTAGAG TGGCCAAGCT TCCTAAGAAC     120

AAAAACCGAA ATAGGTACAG AGACGTCAGT CCCTTTGACC ATAGTCGGAT TAAACTACAT     180

CAAGAAGATA ATGACTATAT CAACGCTAGT TTGATAAAAA TGGAAGAAGC CCAAAGGAGT     240

TACATTCTTA CCCAGGGCCC TTTGCCTAAC ACATGCGGTC ACTTTTGGGA GATGGTGTGG     300

GAGCAGAAAA GCAGGGGTGT CGTCATGCTC AACAGAGTGA TGGAGAAAGG TTCGTTAAAA     360

TGCGCACAAT ACTGGCCACA AAAAGAAGAA AAAGAGATGA TCTTTGAAGA CACAAATTTG     420

AAATTAACAT TGATCTCTGA AGATATCAAG TCATATTATA CAGTGCGACA GCTAGAATTG     480

GAAAACCTTA CAACCCAAGA AACTCGAGAG ATCTTACATT TCCACTATAC CACATGGCCT     540

GACTTTGGAG TCCCTGAATC ACCAGCCTCA TTCTTGAACT TTCTTTTCAA AGTCCGAGAG     600

TCAGGGTCAC TCAGCCCGGA GCACGGGCCC GTTGTGGTGC ACTGCAGTGC AGGCATCGGC     660

AGGTCTGGAA CCTTCTGTCT GGCTGATACC TGCCTCCTGC TGATGGACAA GAGGAAAGAC     720

CCTTCTTCCG TTGATATCAA GAAAGTGCTG TTAGAAATGA GGAAGTTTCG GATGGGGTTG     780

ATCCAGACAG CCGACCAGCT GCGCTTCTCC TACCTGGCTG TGATCGAAGG TGCCAAATTC     840

ATCATGGGGG ACTCTTCCGT GCAGGATCAG TGGAAGGAGC TTTCCCACGA GGACCTGGAG     900

CCCCCACCCG AGCATATCCC CCCACCTCCC CGGCCACCCA AACGAATCCT GGAGCCACAC     960

TGA                                                                   963
```

(2) INFORMATION FOR SEQ ID NO:2:

(i) SEQUENCE CHARACTERISTICS:
       (A) LENGTH: 320 amino acids
       (B) TYPE: amino acid
       (C) STRANDEDNESS: single
       (D) TOPOLOGY: linear (ii) MOLECULE TYPE: peptide (xi) SEQUENCE DESCRIPTION: SEQ ID NO:2:

```
Met Glu Met Glu Lys Glu Phe Glu Gln Ile Asp Lys Ser Gly Ser Trp
 1               5                  10                  15

Ala Ala Ile Tyr Gln Asp Ile Arg His Glu Ala Ser Asp Phe Pro Cys
            20                  25                  30

Arg Val Ala Lys Leu Pro Lys Asn Lys Asn Arg Asn Arg Tyr Arg Asp
            35                  40                  45

Val Ser Pro Phe Asp His Ser Arg Ile Lys Leu His Gln Glu Asp Asn
50                  55                  60

Asp Tyr Ile Asn Ala Ser Leu Ile Lys Met Glu Glu Ala Gln Arg Ser
65                  70                  75                  80

Tyr Ile Leu Thr Gln Gly Pro Leu Pro Asn Thr Cys Gly His Phe Trp
                85                  90                  95

Glu Met Val Trp Glu Gln Lys Ser Arg Gly Val Val Met Leu Asn Arg
                100                 105                 110

Val Met Glu Lys Gly Ser Leu Lys Cys Ala Gln Tyr Trp Pro Gln Lys
            115                 120                 125

Glu Glu Lys Glu Met Ile Phe Glu Asp Thr Asn Leu Lys Leu Thr Leu
            130                 135                 140

Ile Ser Glu Asp Ile Lys Ser Tyr Tyr Thr Val Arg Gln Leu Glu Leu
145                 150                 155                 160

Glu Asn Leu Thr Thr Gln Glu Thr Arg Glu Ile Leu His Phe His Tyr
                165                 170                 175

Thr Thr Trp Pro Asp Phe Gly Val Pro Glu Ser Pro Ala Ser Phe Leu
            180                 185                 190

Asn Phe Leu Phe Lys Val Arg Glu Ser Gly Ser Leu Ser Pro Glu His
            195                 200                 205

Gly Pro Val Val His Cys Ser Ala Gly Ile Gly Arg Ser Gly Thr
210                 215                 220

Phe Cys Leu Ala Asp Thr Cys Leu Leu Leu Met Asp Lys Arg Lys Asp
225                 230                 235                 240

Pro Ser Ser Val Asp Ile Lys Lys Val Leu Leu Glu Met Arg Lys Phe
            245                 250                 255

Arg Met Gly Leu Ile Gln Thr Ala Asp Gln Leu Arg Phe Ser Tyr Leu
            260                 265                 270

Ala Val Ile Glu Gly Ala Lys Phe Ile Met Gly Asp Ser Ser Val Gln
            275                 280                 285

Asp Gln Trp Lys Glu Leu Ser His Glu Asp Leu Glu Pro Pro Pro Glu
290                 295                 300

His Ile Pro Pro Pro Arg Pro Pro Lys Arg Ile Leu Glu Pro His
305                 310                 315                 320
```

(2) INFORMATION FOR SEQ ID NO:3:

(i) SEQUENCE CHARACTERISTICS:
        (A) LENGTH: 1669 base pairs
        (B) TYPE: nucleic acid
        (C) STRANDEDNESS: single
        (D) TOPOLOGY: linear (ii) MOLECULE TYPE: cDNA (xi) SEQUENCE DESCRIPTION: SEQ ID NO:3:

```
GAAACAAGCA CTGGATTCCA TATCCCACTG CCAAAACCGC ATGGTTCAGA TTATCGCTAT     60

TGCAGCTTTC ATCATAATAC ACACCTTTGC TGCCGAAACG AAGCCAGACA ACAGATTTCC    120

ATCAGCAGGA TGTGGGGGCT CAAGGTTCTG CTGCTACCTG TGGTGAGCTT TGCTCTGTAC    180
```

-continued

```
CCTGAGGAGA TACTGGACAC CCACTGGGAG CTATGGAAGA AGACCCACAG GAAGCAATAT      240

AACAACAAGG TGGATGAAAT CTCTCGGCGT TTAATTTGGG AAAAAAACCT GAAGTATATT      300

TCCATCCATA ACCTTGAGGC TTCTCTTGGT GTCCATACAT ATGAACTGGC TATGAACCAC      360

CTGGGGGACA TGACCAGTGA AGAGGTGGTT CAGAAGATGA CTGGACTCAA AGTACCCCTG      420

TCTCATTCCC GCAGTAATGA CACCCTTTAT ATCCCAGAAT GGGAAGGTAG AGCCCCAGAC      480

TCTGTCGACT ATCGAAAGAA AGGATATGTT ACTCCTGTCA AAAATCAGGG TCAGTGTGGT      540

TCCTGTTGGG CTTTTAGCTC TGTGGGTGCC CTGGAGGGCC AACTCAAGAA GAAAACTGGC      600

AAACTCTTAA ATCTGAGTCC CCAGAACCTA GTGGATTGTG TGTCTGAGAA TGATGGCTGT      660

GGAGGGGGCT ACATGACCAA TGCCTTCCAA TATGTGCAGA AGAACCGGGG TATTGACTCT      720

GAAGATGCCT ACCCATATGT GGGACAGGAA GAGAGTTGTA TGTACAACCC AACAGGCAAG      780

GCAGCTAAAT GCAGAGGGTA CAGAGAGATC CCCGAGGGGA ATGAGAAAGC CCTGAAGAGG      840

GCAGTGGCCC GAGTGGGACC TGTCTCTGTG GCCATTGATG CAAGCCTGAC CTCCTTCCAG      900

TTTTACAGCA AAGGTGTGTA TTATGATGAA AGCTGCAATA GCGATAATCT GAACCATGCG      960

GTTTTGGCAG TGGATATGG AATCCAGAAG GGAAACAAGC ACTGGATAAT TAAAAACAGC      1020

TGGGGAGAAA ACTGGGGAAA CAAAGGATAT ATCCTCATGG CTCGAAATAA GAACAACGCC      1080

TGTGGCATTG CCAACCTGGC CAGCTTCCCC AAGATGTGAC TCCAGCCAGC CAAATCCATC      1140

CTGCTCTTCC ATTTCTTCCA CGATGGTGCA GTGTAACGAT GCACTTTGGA AGGGAGTTGG      1200

TGTGCTATTT TTGAAGCAGA TGTGGTGATA CTGAGATTGT CTGTTCAGTT TCCCCATTTG      1260

TTTGTGCTTC AAATGATCCT TCCTACTTTG CTTCTCTCCA CCCATGACCT TTTTCACTGT      1320

GGCCATCAGG ACTTTCCCTG ACAGCTGTGT ACTCTTAGGC TAAGAGATGT GACTACAGCC      1380

TGCCCCTGAC TGTGTTGTCC CAGGGCTGAT GCTGTACAGG TACAGGCTGG AGATTTTCAC      1440

ATAGGTTAGA TTCTCATTCA CGGGACTAGT TAGCTTTAAG CACCCTAGAG GACTAGGGTA      1500

ATCTGACTTC TCACTTCCTA AGTTCCCTTC TATATCCTCA AGGTAGAAAT GTCTATGTTT      1560

TCTACTCCAA TTCATAAATC TATTCATAAG TCTTTGGTAC AAGTTTACAT GATAAAAAGA      1620

AATGTGATTT GTCTTCCCTT CTTTGCACTT TTGAAATAAA GTATTTATC               1669
```

(2) INFORMATION FOR SEQ ID NO:4:

(i) SEQUENCE CHARACTERISTICS:
        (A) LENGTH: 329 amino acids
        (B) TYPE: amino acid
        (C) STRANDEDNESS: single
        (D) TOPOLOGY: linear (ii) MOLECULE TYPE: peptide (xi) SEQUENCE DESCRIPTION: SEQ ID NO:4:

```
Met Trp Gly Leu Lys Val Leu Leu Pro Val Val Ser Phe Ala Leu
 1               5                  10                  15

Tyr Pro Glu Glu Ile Leu Asp Thr His Trp Glu Leu Trp Lys Lys Thr
                20                  25                  30

His Arg Lys Gln Tyr Asn Asn Lys Val Asp Glu Ile Ser Arg Arg Leu
                35                  40                  45

Ile Trp Glu Lys Asn Leu Lys Tyr Ile Ser Ile His Asn Leu Glu Ala
            50                  55                  60

Ser Leu Gly Val His Thr Tyr Glu Leu Ala Met Asn His Leu Gly Asp
65                  70                  75                  80
```

```
Met Thr Ser Glu Glu Val Val Gln Lys Met Thr Gly Leu Lys Val Pro
                85                  90                  95
Leu Ser His Ser Arg Ser Asn Asp Thr Leu Tyr Ile Pro Glu Trp Glu
            100                 105                 110
Gly Arg Ala Pro Asp Ser Val Asp Tyr Arg Lys Lys Gly Tyr Val Thr
            115                 120                 125
Pro Val Lys Asn Gln Gly Gln Cys Gly Ser Cys Trp Ala Phe Ser Ser
130                 135                 140
Val Gly Ala Leu Glu Gly Gln Leu Lys Lys Thr Gly Lys Leu Leu
145                 150                 155                 160
Asn Leu Ser Pro Gln Asn Leu Val Asp Cys Val Ser Glu Asn Asp Gly
                165                 170                 175
Cys Gly Gly Gly Tyr Met Thr Asn Ala Phe Gln Tyr Val Gln Lys Asn
                180                 185                 190
Arg Gly Ile Asp Ser Glu Asp Ala Tyr Pro Tyr Val Gly Gln Glu Glu
                195                 200                 205
Ser Cys Met Tyr Asn Pro Thr Gly Lys Ala Ala Lys Cys Arg Gly Tyr
                210                 215                 220
Arg Glu Ile Pro Glu Gly Asn Glu Lys Ala Leu Lys Arg Ala Val Ala
225                 230                 235                 240
Arg Val Gly Pro Val Ser Val Ala Ile Asp Ala Ser Leu Thr Ser Phe
                245                 250                 255
Gln Phe Tyr Ser Lys Gly Val Tyr Tyr Asp Glu Ser Cys Asn Ser Asp
                260                 265                 270
Asn Leu Asn His Ala Val Leu Ala Val Gly Tyr Gly Ile Gln Lys Gly
                275                 280                 285
Asn Lys His Trp Ile Ile Lys Asn Ser Trp Gly Glu Asn Trp Gly Asn
                290                 295                 300
Lys Gly Tyr Ile Leu Met Ala Arg Asn Lys Asn Ala Cys Gly Ile
305                 310                 315                 320
Ala Asn Leu Ala Ser Phe Pro Lys Met
                325
```

(2) INFORMATION FOR SEQ ID NO:5:

(i) SEQUENCE CHARACTERISTICS:
        (A) LENGTH: 1001 base pairs
        (B) TYPE: nucleic acid
        (C) STRANDEDNESS: single
        (D) TOPOLOGY: linear (ii) MOLECULE TYPE: cDNA (xi) SEQUENCE DESCRIPTION: SEQ ID NO:5:

```
CTGCAGGAAT TCGGCACGAG GGGTGCTATT GTGAGGCGGT TGTAGAAGTT AATAAAGGTA      60
TCCATGGAGA ACACTGAAAA CTCAGTGGAT TCAAAATCCA TTAAAAATTT GGAACCAAAG     120
ATCATACATG GAAGCGAATC AATGGACTCT GGAATATCCC TGGACAACAG TTATAAAATG     180
GATTATCCTG AGATGGGTTT ATGTATAATA ATTAATAATA AGAATTTTCA TAAGAGCACT     240
GGAATGCAT CTCGGTCTGG TACAGATGTC GATGCAGCAA ACCTCAGGGA AACATTCAGA      300
AACTTGAAAT ATGAAGTCAG GAATAAAAAT GATCTTACAC GTGAAGAAAT TGTGGAATTG     360
ATGCGTGATG TTTCTAAAGA AGATCACAGC AAAAGGAGCA GTTTTGTTTG TGTGCTTCTG     420
AGCCATGGTG AAGAAGGAAT AATTTTTGGA ACAAATGGAC CTGTTGACCT GAAAAAAATA     480
ACAAACTTTT TCAGAGGGGA TCGTTGTAGA AGTCTAACTG GAAAACCCAA ACTTTTCATT     540
```

-continued

```
ATTCAGGCCT GCCGTGGTAC AGAACTGGAC TGTGGCATTG AGACAGACAG TGGTGTTGAT      600

GATGACATGG CGTGTCATAA AATACCAGTG GAGGCCGACT TCTTGTATGC ATACTCCACA      660

GCACCTGGTT ATTATTCTTG GCGAAATTCA AAGGATGGCT CCTGGTTCAT CCAGTCGCTT      720

TGTGCCATGC TGAAACAGTA TGCCGACAAG CTTGAATTTA TGCACATTCT TACCCGGGTT      780

AACCGAAAGG TGGCAACAGA ATTTGAGTCC TTTTCCTTTG ACGCTACTTT TCATGCAAAG      840

AAACAGATTC CATGTATTGT TTCCATGCTC ACAAAAGAAC TCTATTTTTA TCACTAAAGA      900

AATGGTTGGT TGGTGGTTTT TTTTAGTTTG TATGCCAAGT GAGAAGATGG TATATTTGGT      960

ACTGTATTTC CCTCTCATTT TGACCTACTC TCATGCTGCA G                         1001
```

(2) INFORMATION FOR SEQ ID NO:6:

(i) SEQUENCE CHARACTERISTICS:
        (A) LENGTH: 277 amino acids
        (B) TYPE: amino acid
        (C) STRANDEDNESS: single
        (D) TOPOLOGY: linear (ii) MOLECULE TYPE: peptide (xi) SEQUENCE DESCRIPTION: SEQ ID NO:6:

```
Met Glu Asn Thr Glu Asn Ser Val Asp Ser Lys Ser Ile Lys Asn Leu
  1               5                  10                  15

Glu Pro Lys Ile Ile His Gly Ser Glu Ser Met Asp Ser Gly Ile Ser
             20                  25                  30

Leu Asp Asn Ser Tyr Lys Met Asp Tyr Pro Glu Met Gly Leu Cys Ile
         35                  40                  45

Ile Ile Asn Asn Lys Asn Phe His Lys Ser Thr Gly Met Thr Ser Arg
     50                  55                  60

Ser Gly Thr Asp Val Asp Ala Ala Asn Leu Arg Glu Thr Phe Arg Asn
 65                  70                  75                  80

Leu Lys Tyr Glu Val Arg Asn Lys Asn Asp Leu Thr Arg Glu Glu Ile
                 85                  90                  95

Val Glu Leu Met Arg Asp Val Ser Lys Glu Asp His Ser Lys Arg Ser
            100                 105                 110

Ser Phe Val Cys Val Leu Leu Ser His Gly Glu Glu Gly Ile Ile Phe
        115                 120                 125

Gly Thr Asn Gly Pro Val Asp Leu Lys Lys Ile Thr Asn Phe Phe Arg
    130                 135                 140

Gly Asp Arg Cys Arg Ser Leu Thr Gly Lys Pro Lys Leu Phe Ile Ile
145                 150                 155                 160

Gln Ala Cys Arg Gly Thr Glu Leu Asp Cys Gly Ile Glu Thr Asp Ser
                165                 170                 175

Gly Val Asp Asp Asp Met Ala Cys His Lys Ile Pro Val Glu Ala Asp
            180                 185                 190

Phe Leu Tyr Ala Tyr Ser Thr Ala Pro Gly Tyr Tyr Ser Trp Arg Asn
        195                 200                 205

Ser Lys Asp Gly Ser Trp Phe Ile Gln Ser Leu Cys Ala Met Leu Lys
    210                 215                 220

Gln Tyr Ala Asp Lys Leu Glu Phe Met His Ile Leu Thr Arg Val Asn
225                 230                 235                 240

Arg Lys Val Ala Thr Glu Phe Glu Ser Phe Ser Phe Asp Ala Thr Phe
                245                 250                 255

His Ala Lys Lys Gln Ile Pro Cys Ile Val Ser Met Leu Thr Lys Glu
            260                 265                 270
```

Leu Tyr Phe Tyr His
    275

(2) INFORMATION FOR SEQ ID NO:7:

(i) SEQUENCE CHARACTERISTICS:
        (A) LENGTH: 963 base pairs
        (B) TYPE: nucleic acid
        (C) STRANDEDNESS: single
        (D) TOPOLOGY: linear (ii) MOLECULE TYPE: cDNA (xi) SEQUENCE DESCRIPTION: SEQ ID NO:7:

```
ATGGAGATGG AAAAGGAGTT CGAGCAGATC GACAAGTCCG GGAGCTGGGC GGCCATTTAC      60

CAGGATATCC GACATGAAGC CAGTGACTTC CCATGTAGAG TGGCCAAGCT TCCTAAGAAC     120

AAAAACCGAA ATAGGTACAG AGACGTCAGT CCCTTTGACC ATAGTCGGAT TAAACTACAT     180

CAAGAAGATA ATGACTATAT CAACGCTAGT TTGATAAAAA TGGAAGAAGC CCAAAGGAGT     240

TACATTCTTA CCCAGGGCCC TTTGCCTAAC ACATGCGGTC ACTTTTGGGA GATGGTGTGG     300

GAGCAGAAAA GCAGGGGTGT CGTCATGCTC AACAGAGTGA TGGAGAAAGG TTCGTTAAAA     360

TGCGCACAAT ACTGGCCACA AAAAGAAGAA AAAGAGATGA TCTTTGAAGA CACAAATTTG     420

AAATTAACAT TGATCTCTGA AGATATCAAG TCATATTATA CAGTGCGACA GCTAGAATTG     480

GAAAACCTTA CAACCCAAGA AACTCGAGAG ATCTTACATT TCCACTATAC CACATGGCCT     540

GACTTTGGAG TCCCTGAATC ACCAGCCTCA TTCTTGAACT TTCTTTTCAA AGTCCGAGAG     600

TCAGGGTCAC TCAGCCCGGA GCACGGGCCC GTTGTGGTGC ACAGCAGTGC AGGCATCGGC     660

AGGTCTGGAA CCTTCTGTCT GGCTGATACC TGCCTCCTGC TGATGGACAA GAGGAAAGAC     720

CCTTCTTCCG TTGATATCAA GAAAGTGCTG TTAGAAATGA GGAAGTTTCG GATGGGGTTG     780

ATCCAGACAG CCGACCAGCT GCGCTTCTCC TACCTGGCTG TGATCGAAGG TGCCAAATTC     840

ATCATGGGGG ACTCTTCCGT GCAGGATCAG TGGAAGGAGC TTTCCCACGA GGACCTGGAG     900

CCCCCACCCG AGCATATCCC CCCACCTCCC CGGCCACCCA AACGAATCCT GGAGCCACAC     960

TGA                                                                  963
```

(2) INFORMATION FOR SEQ ID NO:8:

(i) SEQUENCE CHARACTERISTICS:
        (A) LENGTH: 322 amino acids
        (B) TYPE: amino acid
        (C) STRANDEDNESS: single
        (D) TOPOLOGY: linear (ii) MOLECULE TYPE: peptide (xi) SEQUENCE DESCRIPTION: SEQ ID NO:8:

```
Met Glu Met Glu Lys Glu Phe Glu Gln Ile Asp Lys Ser Gly Ser Trp
 1               5                  10                  15

Ala Ala Ile Tyr Gln Asp Ile Arg His Glu Ala Ser Asp Phe Pro Cys
            20                  25                  30

Arg Val Ala Lys Leu Pro Lys Asn Lys Asn Arg Asn Arg Tyr Arg Asp
        35                  40                  45

Val Ser Pro Phe Asp His Ser Arg Ile Lys Leu His Gln Glu Asp Asn
    50                  55                  60

Asp Tyr Ile Asn Ala Ser Leu Ile Lys Met Glu Glu Ala Gln Arg Ser
65                  70                  75                  80
```

```
Tyr Ile Leu Thr Gln Gly Pro Leu Pro Asn Thr Cys Gly His Phe Trp
                85                  90                  95
Glu Met Val Trp Glu Gln Lys Ser Arg Gly Val Val Met Leu Asn Arg
            100                 105                 110
Val Met Glu Lys Gly Ser Leu Lys Cys Ala Gln Tyr Trp Pro Gln Lys
        115                 120                 125
Glu Glu Lys Glu Met Ile Phe Glu Asp Thr Asn Leu Lys Leu Thr Leu
    130                 135                 140
Ile Ser Glu Asp Ile Lys Ser Tyr Tyr Thr Val Arg Gln Leu Glu Leu
145                 150                 155                 160
Glu Asn Leu Thr Thr Gln Glu Thr Arg Glu Ile Leu His Phe His Tyr
                165                 170                 175
Thr Thr Trp Pro Asp Phe Gly Val Pro Glu Ser Pro Ala Ser Phe Leu
            180                 185                 190
Asn Phe Leu Phe Lys Val Arg Glu Ser Gly Ser Leu Ser Pro Glu His
        195                 200                 205
Gly Pro Val Val His Ser Ser Ala Gly Ile Gly Thr Cys Gly Arg
    210                 215                 220
Ser Gly Thr Phe Cys Leu Ala Asp Thr Cys Leu Leu Leu Met Asp Lys
225                 230                 235                 240
Arg Lys Asp Pro Ser Ser Val Asp Ile Lys Lys Val Leu Leu Glu Met
                245                 250                 255
Arg Lys Phe Arg Met Gly Leu Ile Gln Thr Ala Asp Gln Leu Arg Phe
            260                 265                 270
Ser Tyr Leu Ala Val Ile Glu Gly Ala Lys Phe Ile Met Gly Asp Ser
        275                 280                 285
Ser Val Gln Asp Gln Trp Lys Glu Leu Ser His Glu Asp Leu Glu Pro
    290                 295                 300
Pro Pro Glu His Ile Pro Pro Pro Arg Pro Pro Lys Arg Ile Leu
305                 310                 315                 320
Glu Pro (2) INFORMATION FOR SEQ ID NO:9:

(i) SEQUENCE CHARACTERISTICS:
        (A) LENGTH: 1001 base pairs
        (B) TYPE: nucleic acid
        (C) STRANDEDNESS: single
        (D) TOPOLOGY: linear (ii) MOLECULE TYPE: cDNA (xi) SEQUENCE DESCRIPTION: SEQ ID NO:9:

CTGCAGGAAT TCGGCACGAG GGGTGCTATT GTGAGGCGGT TGTAGAAGTT AATAAAGGTA     60

TCCATGGAGA ACACTGAAAA CTCAGTGGAT TCAAAATCCA TTAAAAATTT GGAACCAAAG    120

ATCATACATG GAAGCGAATC AATGGACTCT GGAATATCCC TGGACAACAG TTATAAAATG    180

GATTATCCTG AGATGGGTTT ATGTATAATA ATTAATAATA AGAATTTTCA TAAGAGCACT    240

GGAATGACAT CTCGGTCTGG TACAGATGTC GATGCAGCAA ACCTCAGGGA AACATTCAGA    300

AACTTGAAAT ATGAAGTCAG GAATAAAAAT GATCTTACAC GTGAAGAAAT TGTGGAATTG    360

ATGCGTGATG TTTCTAAAGA AGATCACAGC AAAAGGAGCA GTTTTGTTTG TGTGCTTCTG    420

AGCCATGGTG AAGAAGGAAT AATTTTTGGA ACAAATGGAC CTGTTGACCT GAAAAAAATA    480

ACAAACTTTT TCAGAGGGGA TCGTTGTAGA AGTCTAACTG GAAAACCCAA ACTTTTCATT    540

ATTCAGGCCT CCCGTGGTAC AGAACTGGAC TGTGGCATTG AGACAGACAG TGGTGTTGAT    600
```

```
GATGACATGG CGTGTCATAA AATACCAGTG GAGGCCGACT TCTTGTATGC ATACTCCACA      660

GCACCTGGTT ATTATTCTTG GCGAAATTCA AAGGATGGCC CCTGGTTCAT CCAGTCGCTT      720

TGTGCCATGC TGAAACAGTA TGCCGACAAG CTTGAATTTA TGCACATTCT TACCCGGGTT      780

AACCGAAAGG TGGCAACAGA ATTTGAGTCC TTTTCCTTTG ACGCTACTTT TCATGCAAAG      840

AAACAGATTC CATGTATTGT TTCCATGCTC ACAAAAGAAC TCTATTTTTA TCACTAAAGA      900

AATGGTTGGT TGGTGGTTTT TTTTAGTTTG TATGCCAAGT GAGAAGATGG TATATTTGGT      960

ACTGTATTTC CCTCTCATTT TGACCTACTC TCATGCTGCA G                          1001
```

(2) INFORMATION FOR SEQ ID NO:10:

(i) SEQUENCE CHARACTERISTICS:
        (A) LENGTH: 277 amino acids
        (B) TYPE: amino acid
        (C) STRANDEDNESS: single
        (D) TOPOLOGY: linear (ii) MOLECULE TYPE: peptide (xi) SEQUENCE DESCRIPTION: SEQ ID NO:10:

```
Met Glu Asn Thr Glu Asn Ser Val Asp Ser Lys Ser Ile Lys Asn Leu
 1               5                  10                  15

Glu Pro Lys Ile Ile His Gly Ser Glu Ser Met Asp Ser Gly Ile Ser
            20                  25                  30

Leu Asp Asn Ser Tyr Lys Met Asp Tyr Pro Glu Met Gly Leu Cys Ile
            35                  40                  45

Ile Ile Asn Asn Lys Asn Phe His Lys Ser Thr Gly Met Thr Ser Arg
 50                  55                  60

Ser Gly Thr Asp Val Asp Ala Ala Asn Leu Arg Glu Thr Phe Arg Asn
 65                  70                  75                  80

Leu Lys Tyr Glu Val Arg Asn Lys Asn Asp Leu Thr Arg Glu Glu Ile
            85                  90                  95

Val Glu Leu Met Arg Asp Val Ser Lys Glu Asp His Ser Lys Arg Ser
            100                 105                 110

Ser Phe Val Cys Val Leu Leu Ser His Gly Glu Glu Gly Ile Ile Phe
            115                 120                 125

Gly Thr Asn Gly Pro Val Asp Leu Lys Lys Ile Thr Asn Phe Phe Arg
 130                 135                 140

Gly Asp Arg Cys Arg Ser Leu Thr Gly Lys Pro Lys Leu Phe Ile Ile
 145                 150                 155                 160

Gln Ala Ser Arg Gly Thr Glu Leu Asp Cys Gly Ile Glu Thr Asp Ser
            165                 170                 175

Gly Val Asp Asp Asp Met Ala Cys His Lys Ile Pro Val Glu Ala Asp
            180                 185                 190

Phe Leu Tyr Ala Tyr Ser Thr Ala Pro Gly Tyr Tyr Ser Trp Arg Asn
            195                 200                 205

Ser Lys Asp Gly Ser Trp Phe Ile Gln Ser Leu Cys Ala Met Leu Lys
 210                 215                 220

Gln Tyr Ala Asp Lys Leu Glu Phe Met His Ile Leu Thr Arg Val Asn
 225                 230                 235                 240

Arg Lys Val Ala Thr Glu Phe Glu Ser Phe Ser Phe Asp Ala Thr Phe
            245                 250                 255

His Ala Lys Lys Gln Ile Pro Cys Ile Val Ser Met Leu Thr Lys Glu
            260                 265                 270
```

Leu Tyr Phe Tyr His
    275

(2) INFORMATION FOR SEQ ID NO:11:

(i) SEQUENCE CHARACTERISTICS:
        (A) LENGTH: 148 amino acids
        (B) TYPE: amino acid
        (C) STRANDEDNESS: single
        (D) TOPOLOGY: linear (ii) MOLECULE TYPE: peptide (xi) SEQUENCE DESCRIPTION: SEQ ID NO:11:

Met Ser Gly Ile Ser Leu Asp Asn Ser Tyr Lys Met Asp Tyr Pro Glu
1               5                  10                  15

Met Gly Leu Cys Ile Ile Ile Asn Asn Lys Asn Phe His Lys Ser Thr
            20                  25                  30

Gly Met Thr Ser Arg Ser Gly Thr Asp Val Asp Ala Ala Asn Leu Arg
        35                  40                  45

Glu Thr Phe Arg Asn Leu Lys Tyr Glu Val Arg Asn Lys Asn Asp Leu
    50                  55                  60

Thr Arg Glu Glu Ile Val Glu Leu Met Arg Asp Val Ser Lys Glu Asp
65                  70                  75                  80

His Ser Lys Arg Ser Ser Phe Val Cys Val Leu Leu Ser His Gly Glu
                85                  90                  95

Glu Gly Ile Ile Phe Gly Thr Asn Gly Pro Val Asp Leu Lys Lys Ile
            100                 105                 110

Thr Asn Phe Phe Arg Gly Asp Arg Cys Arg Ser Leu Thr Gly Lys Pro
        115                 120                 125

Lys Leu Phe Ile Ile Gln Ala Ser Arg Gly Thr Glu Leu Asp Cys Gly
    130                 135                 140

Ile Glu Thr Asp
145

(2) INFORMATION FOR SEQ ID NO:12:

(i) SEQUENCE CHARACTERISTICS:
        (A) LENGTH: 990 base pairs
        (B) TYPE: nucleic acid
        (C) STRANDEDNESS: single
        (D) TOPOLOGY: linear (ii) MOLECULE TYPE: cDNA (xi) SEQUENCE DESCRIPTION: SEQ ID NO:12:

ATGTGGGGGC TCAAGGTTCT GCTGCTACCT GTGGTGAGCT TTGCTCTGTA CCCTGAGGAG      60

ATACTGGACA CCCACTGGGA GCTATGGAAG AAGACCCACA GGAAGCAATA TAACAACAAG    120

GTGGATGAAA TCTCTCGGCG TTTAATTTGG GAAAAAAACC TGAAGTATAT TTCCATCCAT    180

AACCTTGAGG CTTCTCTTGG TGTCCATACA TATGAACTGG CTATGAACCA CCTGGGGGAC    240

ATGACCAGTG AAGAGGTGGT TCAGAAGATG ACTGGACTCA AAGTACCCCT GTCTCATTCC    300

CGCAGTAATG ACACCCTTTA TATCCCAGAA TGGGAAGGTA GAGCCCCAGA CTCTGTCGAC    360

TATCGAAAGA AAGGATATGT TACTCCTGTC AAAAATCAGG GTCAGTGTGG TTCCTCTTGG    420

GCTTTTAGCT CTGTGGGTGC CCTGGAGGGC CAACTCAAGA AGAAAACTGG CAAACTCTTA    480

AATCTGAGTC CCCAGAACCT AGTGGATTGT GTGTCTGAGA ATGATGGCTG TGGAGGGGGC    540

TACATGACCA ATGCCTTCCA ATATGTGCAG AAGAACCGGG GTATTGACTC TGAAGATGCC    600

-continued

```
TACCCATATG TGGGACAGGA AGAGAGTTGT ATGTACAACC CAACAGGCAA GGCAGCTAAA      660

TGCAGAGGGT ACAGAGAGAT CCCCGAGGGG AATGAGAAAG CCCTGAAGAG GGCAGTGGCC      720

CGAGTGGGAC CTGTCTCTGT GGCCATTGAT GCAAGCCTGA CCTCCTTCCA GTTTTACAGC      780

AAAGGTGTGT ATTATGATGA AAGCTGCAAT AGCGATAATC TGAACCATGC GGTTTTGGCA      840

GTGGGATATG GAATCCAGAA GGGAAACAAG CACTGGATAA TTAAAAACAG CTGGGGAGAA      900

AACTGGGGAA ACAAAGGATA TATCCTCATG GCTCGAAATA AGAACAACGC CTGTGGCATT      960

GCCAACCTGG CCAGCTTCCC CAAGATGTGA                                      990
```

(2) INFORMATION FOR SEQ ID NO:13:

(i) SEQUENCE CHARACTERISTICS:
        (A) LENGTH: 990 base pairs
        (B) TYPE: nucleic acid
        (C) STRANDEDNESS: single
        (D) TOPOLOGY: linear (ii) MOLECULE TYPE: cDNA (xi) SEQUENCE DESCRIPTION: SEQ ID NO:13:

```
ATGTGGGGC TCAAGGTTCT GCTGCTACCT GTGGTGAGCT TTGCTCTGTA CCCTGAGGAG        60

ATACTGGACA CCCACTGGGA GCTATGGAAG AAGACCCACA GGAAGCAATA TAACAACAAG      120

GTGGATGAAA TCTCTCGGCG TTTAATTTGG GAAAAAAACC TGAAGTATAT TTCCATCCAT      180

AACCTTGAGG CTTCTCTTGG TGTCCATACA TATGAACTGG CTATGAACCA CCTGGGGGAC      240

ATGACCAGTG AAGAGGTGGT TCAGAAGATG ACTGGACTCA AAGTACCCCT GTCTCATTCC      300

CGCAGTAATG ACACCCTTTA TATCCCAGAA TGGGAAGGTA GAGCCCCAGA CTCTGTCGAC      360

TATCGAAAGA AAGGATATGT TACTCCTGTC AAAAATCAGG GTCAGTGTGG TTCCGCTTGG      420

GCTTTTAGCT CTGTGGGTGC CCTGGAGGGC CAACTCAAGA AGAAAACTGG CAAACTCTTA      480

AATCTGAGTC CCCAGAACCT AGTGGATTGT GTGTCTGAGA ATGATGGCTG TGGAGGGGGC      540

TACATGACCA ATGCCTTCCA ATATGTGCAG AAGAACCGGG GTATTGACTC TGAAGATGCC      600

TACCCATATG TGGGACAGGA AGAGAGTTGT ATGTACAACC CAACAGGCAA GGCAGCTAAA      660

TGCAGAGGGT ACAGAGAGAT CCCCGAGGGG AATGAGAAAG CCCTGAAGAG GGCAGTGGCC      720

CGAGTGGGAC CTGTCTCTGT GGCCATTGAT GCAAGCCTGA CCTCCTTCCA GTTTTACAGC      780

AAAGGTGTGT ATTATGATGA AAGCTGCAAT AGCGATAATC TGAACCATGC GGTTTTGGCA      840

GTGGGATATG GAATCCAGAA GGGAAACAAG CACTGGATAA TTAAAAACAG CTGGGGAGAA      900

AACTGGGGAA ACAAAGGATA TATCCTCATG GCTCGAAATA AGAACAACGC CTGTGGCATT      960

GCCAACCTGG CCAGCTTCCC CAAGATGTGA                                      990
```

(2) INFORMATION FOR SEQ ID NO:14:

(i) SEQUENCE CHARACTERISTICS:
        (A) LENGTH: 329 amino acids
        (B) TYPE: amino acid
        (C) STRANDEDNESS: single
        (D) TOPOLOGY: linear (ii) MOLECULE TYPE: peptide (xi) SEQUENCE DESCRIPTION: SEQ ID NO:14:

```
Met Trp Gly Leu Lys Val Leu Leu Leu Pro Val Val Ser Phe Ala Leu
 1               5                  10                  15

Tyr Pro Glu Glu Ile Leu Asp Thr His Trp Glu Leu Trp Lys Lys Thr
            20                  25                  30
```

-continued

His Arg Lys Gln Tyr Asn Asn Lys Val Asp Glu Ile Ser Arg Arg Leu
            35                  40                  45

Ile Trp Glu Lys Asn Leu Lys Tyr Ile Ser Ile His Asn Leu Glu Ala
 50                  55                  60

Ser Leu Gly Val His Thr Tyr Glu Leu Ala Met Asn His Leu Gly Asp
 65                  70                  75                  80

Met Thr Ser Glu Glu Val Val Gln Lys Met Thr Gly Leu Lys Val Pro
                 85                  90                  95

Leu Ser His Ser Arg Ser Asn Asp Thr Leu Tyr Ile Pro Glu Trp Glu
                100                 105                 110

Gly Arg Ala Pro Asp Ser Val Asp Tyr Arg Lys Lys Gly Tyr Val Thr
            115                 120                 125

Pro Val Lys Asn Gln Gly Gln Cys Gly Ser Ser Trp Ala Phe Ser Ser
130                 135                 140

Val Gly Ala Leu Glu Gly Gln Leu Lys Lys Thr Gly Lys Leu Leu
145                 150                 155                 160

Asn Leu Ser Pro Gln Asn Leu Val Asp Cys Val Ser Glu Asn Asp Gly
                165                 170                 175

Cys Gly Gly Gly Tyr Met Thr Asn Ala Phe Gln Tyr Val Gln Lys Asn
            180                 185                 190

Arg Gly Ile Asp Ser Glu Asp Ala Tyr Pro Tyr Val Gly Gln Glu Glu
            195                 200                 205

Ser Cys Met Tyr Asn Pro Thr Gly Lys Ala Ala Lys Cys Arg Gly Tyr
 210                 215                 220

Arg Glu Ile Pro Glu Gly Asn Glu Lys Ala Leu Lys Arg Ala Val Ala
225                 230                 235                 240

Arg Val Gly Pro Val Ser Val Ala Ile Asp Ala Ser Leu Thr Ser Phe
            245                 250                 255

Gln Phe Tyr Ser Lys Gly Val Tyr Tyr Asp Glu Ser Cys Asn Ser Asp
                260                 265                 270

Asn Leu Asn His Ala Val Leu Ala Val Gly Tyr Gly Ile Gln Lys Gly
            275                 280                 285

Asn Lys His Trp Ile Ile Lys Asn Ser Trp Gly Glu Asn Trp Gly Asn
290                 295                 300

Lys Gly Tyr Ile Leu Met Ala Arg Asn Lys Asn Asn Ala Cys Gly Ile
305                 310                 315                 320

Ala Asn Leu Ala Ser Phe Pro Lys Met
                325

(2) INFORMATION FOR SEQ ID NO:15:

(i) SEQUENCE CHARACTERISTICS:
        (A) LENGTH: 329 amino acids
        (B) TYPE: amino acid
        (C) STRANDEDNESS: single
        (D) TOPOLOGY: linear (ii) MOLECULE TYPE: peptide (xi) SEQUENCE DESCRIPTION: SEQ ID NO:15:

Met Trp Gly Leu Lys Val Leu Leu Leu Pro Val Val Ser Phe Ala Leu
 1               5                  10                  15

Tyr Pro Glu Glu Ile Leu Asp Thr His Trp Glu Leu Trp Lys Lys Thr
                20                  25                  30

His Arg Lys Gln Tyr Asn Asn Lys Val Asp Glu Ile Ser Arg Arg Leu
            35                  40                  45

-continued

```
Ile Trp Glu Lys Asn Leu Lys Tyr Ile Ser Ile His Asn Leu Glu Ala
     50                  55                  60
Ser Leu Gly Val His Thr Tyr Glu Leu Ala Met Asn His Leu Gly Asp
 65              70                  75                      80
Met Thr Ser Glu Glu Val Val Gln Lys Met Thr Gly Leu Lys Val Pro
             85                  90                  95
Leu Ser His Ser Arg Ser Asn Asp Thr Leu Tyr Ile Pro Glu Trp Glu
             100             105                 110
Gly Arg Ala Pro Asp Ser Val Asp Tyr Arg Lys Lys Gly Tyr Val Thr
         115             120                 125
Pro Val Lys Asn Gln Gly Gln Cys Gly Ser Ala Trp Ala Phe Ser Ser
     130             135                 140
Val Gly Ala Leu Glu Gly Gln Leu Lys Lys Lys Thr Gly Lys Leu Leu
145             150                 155                 160
Asn Leu Ser Pro Gln Asn Leu Val Asp Cys Val Ser Glu Asn Asp Gly
                 165             170                 175
Cys Gly Gly Gly Tyr Met Thr Asn Ala Phe Gln Tyr Val Gln Lys Asn
             180                 185                 190
Arg Gly Ile Asp Ser Glu Asp Ala Tyr Pro Tyr Val Gly Gln Glu Glu
         195                 200                 205
Ser Cys Met Tyr Asn Pro Thr Gly Lys Ala Ala Lys Cys Arg Gly Tyr
    210                 215                 220
Arg Glu Ile Pro Glu Gly Asn Glu Lys Ala Leu Lys Arg Ala Val Ala
225                 230                 235                 240
Arg Val Gly Pro Val Ser Val Ala Ile Asp Ala Ser Leu Thr Ser Phe
                245                 250                 255
Gln Phe Tyr Ser Lys Gly Val Tyr Tyr Asp Glu Ser Cys Asn Ser Asp
                260                 265                 270
Asn Leu Asn His Ala Val Leu Ala Val Gly Tyr Gly Ile Gln Lys Gly
            275                 280                 285
Asn Lys His Trp Ile Ile Lys Asn Ser Trp Gly Glu Asn Trp Gly Asn
    290                 295                 300
Lys Gly Tyr Ile Leu Met Ala Arg Asn Lys Asn Asn Ala Cys Gly Ile
305                 310                 315                 320
Ala Asn Leu Ala Ser Phe Pro Lys Met
                325
```